US012363308B2

(12) United States Patent
Park et al.

(10) Patent No.: US 12,363,308 B2
(45) Date of Patent: Jul. 15, 2025

(54) VIDEO DECODING METHOD AND APPARATUS, AND VIDEO ENCODING METHOD AND APPARATUS FOR PERFORMING INTER PREDICTION ACCORDING TO AFFINE MODEL

(71) Applicant: SAMSUNG ELECTRONICS CO., LTD., Suwon-si (KR)

(72) Inventors: Minwoo Park, Suwon-si (KR); Minsoo Park, Suwon-si (KR); Narae Choi, Suwon-si (KR); Seungsoo Jeong, Suwon-si (KR); Anish Tamse, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/627,786

(22) Filed: Apr. 5, 2024

(65) Prior Publication Data

US 2024/0259563 A1    Aug. 1, 2024

Related U.S. Application Data

(63) Continuation of application No. 17/728,222, filed on Apr. 25, 2022, now Pat. No. 11,985,326, which is a (Continued)

(51) Int. Cl.
*H04N 19/137*   (2014.01)
*H04N 19/132*   (2014.01)
(Continued)

(52) U.S. Cl.
CPC ......... *H04N 19/137* (2014.11); *H04N 19/132* (2014.11); *H04N 19/159* (2014.11); *H04N 19/176* (2014.11)

(58) Field of Classification Search
CPC .. H04N 19/105; H04N 19/132; H04N 19/137; H04N 19/159; H04N 19/176;
(Continued)

(56) References Cited

U.S. PATENT DOCUMENTS 10,462,488 B1    10/2019   Li
10,701,390 B2    6/2020    Li et al.
(Continued)

FOREIGN PATENT DOCUMENTS

KR    10-2018-0004147 A    1/2018
KR    10-2018-0028513 A    3/2018
(Continued)

OTHER PUBLICATIONS

European Extended Search Report issued Nov. 16, 2023 issued by the European Patent Office for EP Patent Application No. 20880908.7.

(Continued)

*Primary Examiner* — Nathnael Aynalem
(74) *Attorney, Agent, or Firm* — Sughrue Mion, PLLC

(57) ABSTRACT

A video decoding method includes, determining a center motion vector of a current block by using a base motion vector of the current block based on affine model-based inter-prediction being performed in the current block, determining a reference range of an area to be referred to, with respect to the current block, based on a size of the current block, based on a reference area having a size of the reference range with respect to a point in a reference picture of the current block, the point being indicated by a central motion vector of the current block, deviating from or including a boundary of the reference picture, changing the reference area by parallelly translating the reference area into
(Continued)

a current picture, and determining prediction samples of sub-blocks of the current block in the changed reference area from the reference picture.

3 Claims, 40 Drawing Sheets

Related U.S. Application Data continuation of application No. PCT/KR2020/015146, filed on Nov. 2, 2020.

(60) Provisional application No. 62/928,604, filed on Oct. 31, 2019.

(51) Int. Cl.
*H04N 19/159* (2014.01)
*H04N 19/176* (2014.01)

(58) Field of Classification Search
CPC .... H04N 19/55; H04N 19/167; H04N 19/513; H04N 19/527; H04N 19/52; H04N 19/50; H04N 19/517; H04N 19/503
USPC ............................................ 375/240–240.29
See application file for complete search history.

(56) References Cited

U.S. PATENT DOCUMENTS

| | | | |
|---|---|---|---|
| 10,728,571 | B2 | 7/2020 | Son et al. |
| 2001/0008545 | A1* | 7/2001 | Takeda .................... G06T 7/238 375/E7.122 |
| 2016/0165241 | A1* | 6/2016 | Park ..................... H04N 19/136 375/240.08 |
| 2016/0337661 | A1 | 11/2016 | Pang et al. |
| 2016/0337662 | A1 | 11/2016 | Pang et al. |
| 2018/0359483 | A1 | 12/2018 | Chen et al. |
| 2019/0124332 | A1 | 4/2019 | Lim et al. |
| 2020/0045336 | A1* | 2/2020 | Xiu ....................... H04N 19/597 |
| 2020/0092578 | A1* | 3/2020 | Huang ................... H04N 19/52 |
| 2020/0145688 | A1* | 5/2020 | Zou ........................ H04N 19/52 |

FOREIGN PATENT DOCUMENTS

| | | | |
|---|---|---|---|
| KR | 10-2018-0128955 A | 12/2018 | |
| KR | 10-2019-0120389 A | 10/2019 | |
| WO | WO-2019147079 A1 * | 8/2019 | ........... H04N 19/105 |

OTHER PUBLICATIONS

Chernyak R et al: "[EVC] Suggested improvements for EVC specification and Test Model", 129. MPEG Meeting; Jan. 13, 2020-Jan. 17, 2020; Brussels; (Motion Picture Expert Group or ISO/IEC JTC1/SC29/WG11), No. m52223, Jan. 8, 2020 (Jan. 8, 2020), XP030224816.

Choi et al. "Text of ISO/IEC CD 23094-1, Essential Video Coding", ISO/IEC JTC1/SC29/WG11 N18568, Jul. 2019, Gothenburg, Sweden (provided by EPO along with European Extended Search Report issued Nov. 16, 2023 (cite No. 2; "ESSR") for following citation in ESSR: "Zhang Y et al: "[EVC] Suggested improvements for EVC CD Text and Test Model", 128. MPEG Meeting; Oct. 7, 2019-Oct. 11, 2019; Geneva; (Motion Picture Expert Group or ISO/IEC JTC1/SC29/WG11, No. m50662, Oct. 6, 2019 (Oct. 6, 2019), XP030221106".

Office Action issued on Jan. 23, 2024 by the Indian Patent Office in corresponding IN Patent Application No. 202247029033.

Communication dated Feb. 19, 2021, issued by the International Searching Authority in counterpart International Application No. PCT/KR2020/015146 (PCT/ISA/220, 210, 237).

Bross et al., "Versatile Video Coding (Draft 7)," Joint Video Experts Team (JVET) of ITU-T SG 16 WP 3 and ISO/IEC JTC 1/SC 29/WG 11, JVET-P2001-vA, 16th Meeting: Geneva, CH, Oct. 25, 2019, Total 486 pages.

Communication dated Nov. 26, 2024 issued by the Korean Intellectual Property Office in Korean Patent Application No. 10-2022-7008516.

* cited by examiner

FIG. 4
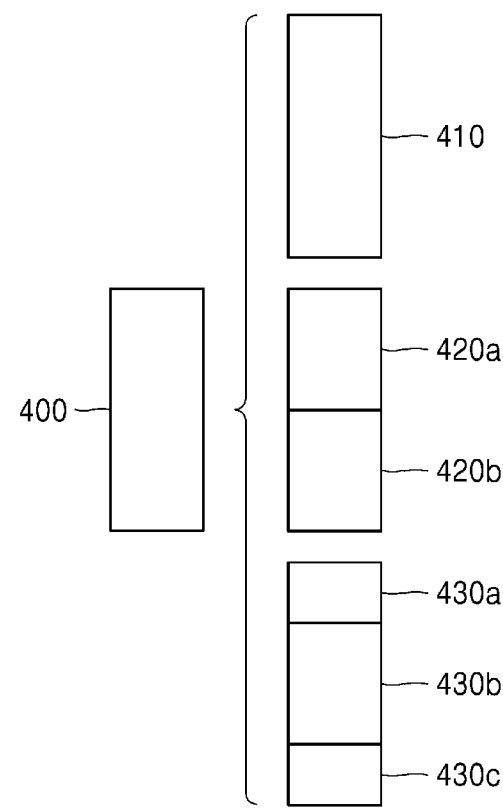
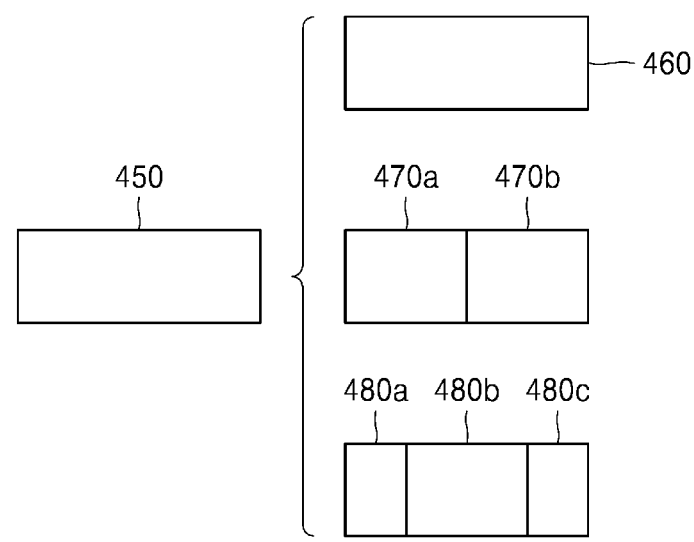

FIG. 13

| BLOCK SHAPE / DEPTH | 0: SQUARE | 1: NS_VER | 2: NS_HOR |
|---|---|---|---|
| DEPTH D | 1300 | 1310 | 1320 |
| DEPTH D+1 | 1302 | 1312 | 1322 |
| DEPTH D+2 | 1304 | 1314 | 1324 |
| ... | ... | ... | ... |

FIG. 22
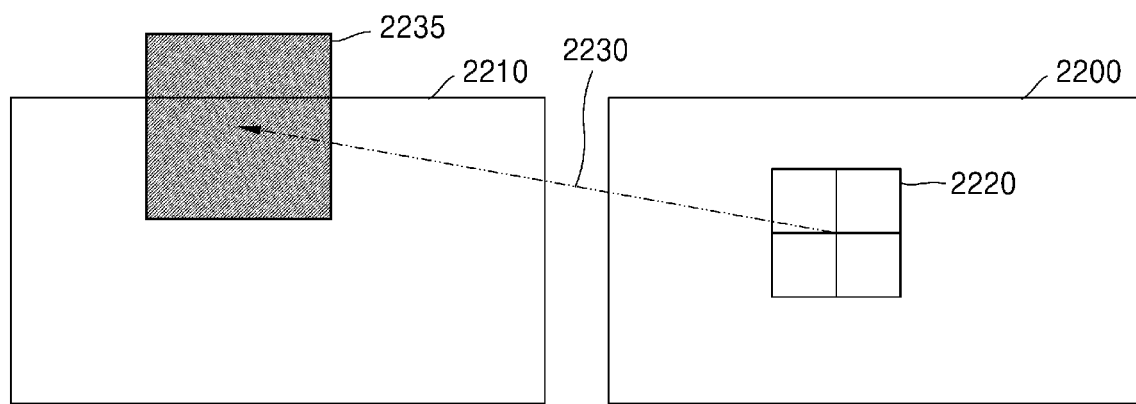
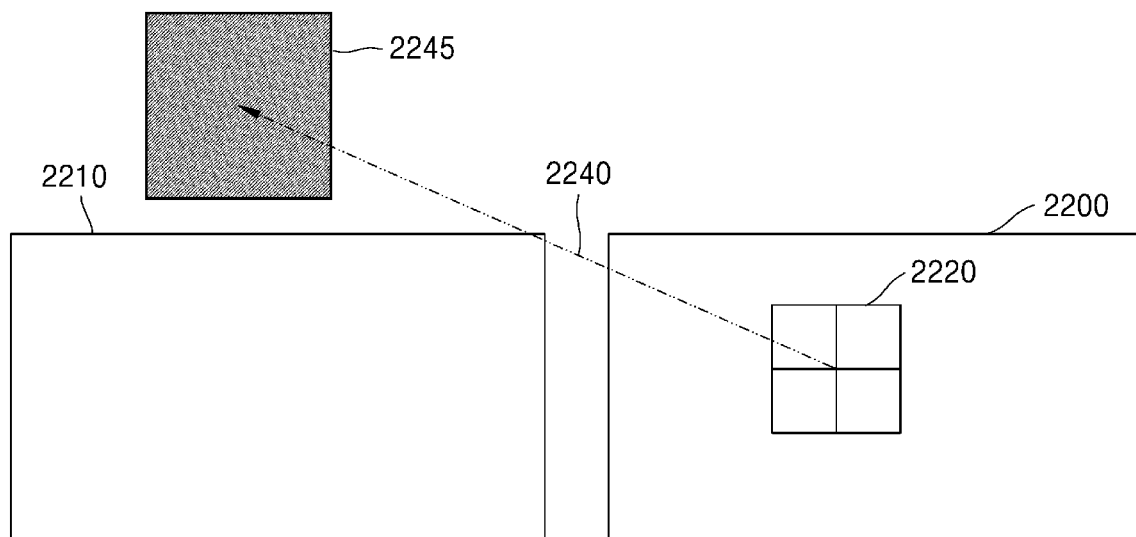

FIG. 29
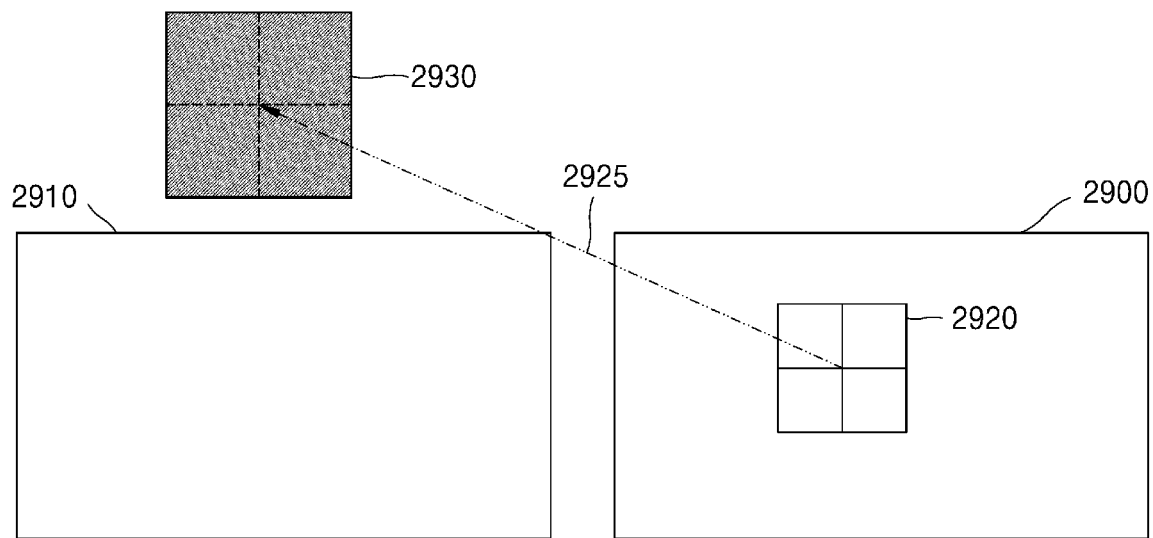
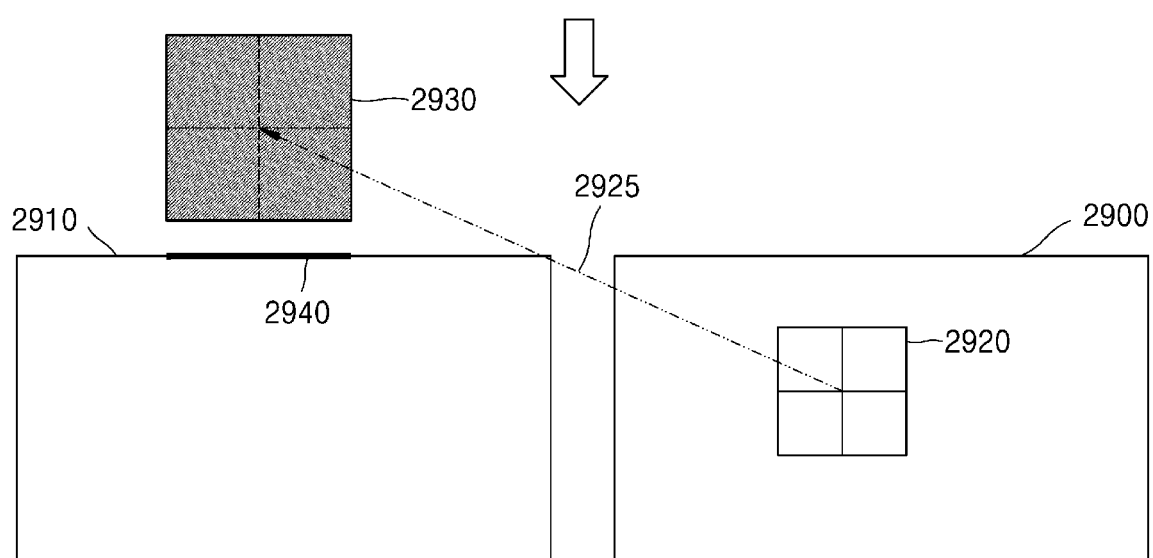

VIDEO DECODING METHOD AND APPARATUS, AND VIDEO ENCODING METHOD AND APPARATUS FOR PERFORMING INTER PREDICTION ACCORDING TO AFFINE MODEL

CROSS-REFERENCE TO RELATED APPLICATION(S)

This application is a continuation application of U.S. patent application Ser. No. 17/728,222, filed Apr. 25, 2022, in the U.S. Patent and Trademark Office, which application is a bypass continuation application of International Application No. PCT/KR2020/015146, filed on Nov. 2, 2020, in the Korean Intellectual Property Receiving Office, which claims priority to U.S. Provisional Patent Application No. 62/928,604, filed on Oct. 31, 2019 in the United States Patent and Trademark Office, the disclosures of which are incorporated by reference in their entireties herein.

BACKGROUND

1. Field

The disclosure relates generally to the fields of image encoding and decoding, and, in particular, to methods and apparatuses for encoding and decoding a video by performing inter prediction according to an affine model.

2. Description of Related Art

In a compression method according to the related art, in a process of determining a size of a coding unit included in a picture, it is determined whether to split the coding unit, and then square coding units are determined through a recursive splitting process of uniformly splitting the coding unit into four coding units having the same size. However, recently, quality degradation of a reconstructed image caused by the use of uniform square coding units for a high-resolution image has been a problem. Accordingly, methods and apparatuses for splitting a high-resolution image into coding units of various shapes are proposed.

SUMMARY

Provided is a method of performing motion compensation when a reference area indicated by a motion vector deviates from a boundary of a reference picture when inter prediction is performed in an affine mode.

Additional aspects will be set forth in part in the description which follows and, in part, will be apparent from the description, or may be learned by practice of the presented embodiments.

According to an aspect of an example embodiment, a video decoding method may include determining a center motion vector of a current block by using a base motion vector of the current block based on affine model-based inter-prediction being performed in the current block, determining a reference range of an area to be referred to, with respect to the current block, based on a size of the current block, based on a reference area having a size of the reference range with respect to a point in a reference picture of the current block, the point being indicated by a central motion vector of the current block, deviating from or including a boundary of the reference picture, changing the reference area by parallelly translating the reference area into a current picture, determining prediction samples of sub-blocks of the current block in the changed reference area from the reference picture, and determining reconstruction samples of the current block by using the prediction samples of the current block.

According to an aspect of an example embodiment, a video decoding apparatus may include an affine model inter predictor configured to obtain a base motion vector of a current block, based on affine model-based inter-prediction being performed in the current block, an inter-prediction sample determiner configured to determine a central motion vector of the current block by using the base motion vector, determine a reference range of an area to be referred to, with respect to the current block, based on a size of the current block, based on a reference area having a size of the reference range with respect to a point in a reference picture of the current block, the point being indicated by the central motion vector of the current block, deviating from or including a boundary of the reference picture, change the reference area by parallelly translating the reference area into a current picture, and determine prediction samples of sub-blocks of the current block in the changed reference area from the reference picture, and a reconstructor configured to determine reconstruction samples of the current block by using the prediction samples of the current block.

According to an aspect of an example embodiment, a video coding method may include determining a central motion vector of a current block by using a base motion vector of the current block based on affine model-based inter-prediction being performed in the current block, determining a reference range of an area to be referred to, with respect to the current block, based on a size of the current block, based on a reference area having a size of the reference range with respect to a point in a reference picture of the current block, the point being indicated by the central motion vector of the current block, deviating from or including a boundary of the reference picture, changing the reference area by parallelly translating the reference area into a current picture, determining prediction samples of sub-blocks of the current block in the changed reference area from the reference picture, and encoding residual samples of the current block by using the prediction samples of the current block.

BRIEF DESCRIPTION OF DRAWINGS

The above and other aspects, features, and advantages of certain embodiments of the present disclosure will be more apparent from the following description taken in conjunction with the accompanying drawings, in which.

FIG. 4 is a diagram of a process by which an image decoding apparatus determines at least one coding unit by splitting a non-square coding unit, according to an embodiment.

FIG. 13 is a diagram of a process of determining a depth of a coding unit when a shape and size of the coding unit change, when the coding unit is recursively split such that a plurality of coding units are determined, according to an embodiment.

FIG. 22 is a diagram of a case in which a reference area according to a motion vector of a current block in affine model-based inter prediction deviates from or includes a boundary of a reference picture.

FIGS. 29 and 30 are diagrams of a method, performed by a video decoding apparatus, of translating a reference area onto a boundary or a point of a reference picture, when the reference area according to a motion vector of a current block in affine model-based inter prediction deviates from the reference picture, according to an embodiment.

DETAILED DESCRIPTION

Figure 1:
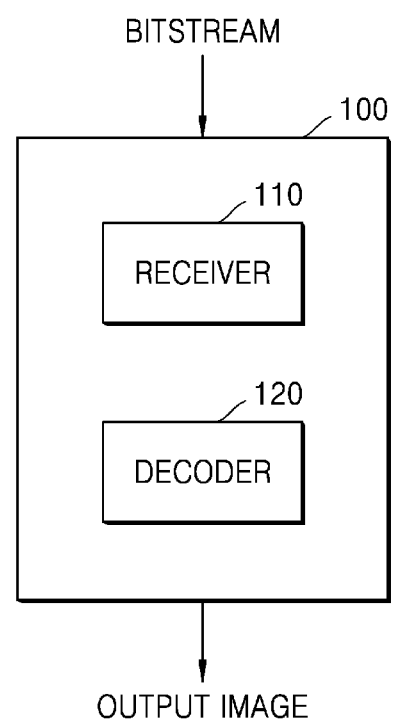
FIG. 1 is a block diagram of an image decoding apparatus according to an embodiment.

A video decoding method according to an embodiment of the present disclosure includes: based on affine model-based inter-prediction being performed in a current block, determining a central motion vector of the current block by using a base motion vector of the current block; determining a reference range of an area to be referred to, with respect to the current block, based on a size of the current block; based on a reference area having a size of the reference range with respect to a point in a reference picture of the current block, the point being indicated by the central motion vector of the current block, deviating from or including a boundary of the reference picture, changing the reference area by parallelly translating the reference area into a current picture; determining prediction samples of sub-blocks of the current block in the changed reference area from the reference picture; and determining reconstruction samples of the current block by using the prediction samples of the current block.

The changing of the reference area may include, based on an x-axis coordinate of a left boundary of the reference area indicated by the central motion vector of the current block being less than an x-axis coordinate of a left boundary of the current picture, changing the x-axis coordinate of the left boundary of the reference area to the x-axis coordinate of the left boundary of the current picture and changing an x-axis coordinate of a right boundary of the reference area to a value obtained by adding the reference range to the x-axis coordinate of the left boundary of the current picture.

The changing of the reference area may include, based on an x-axis coordinate of a right boundary of the reference area indicated by the central motion vector of the current block being greater than an x-axis coordinate of a right boundary of the current picture, changing the x-axis coordinate of the right boundary of the reference area to the x-axis coordinate of the right boundary of the current picture and changing an x-axis coordinate of a left boundary of the reference area to a value obtained by subtracting the reference range from the x-axis coordinate of the right boundary of the current picture.

The changing of the reference area may include, based on a y-axis coordinate of an upper boundary of the reference area indicated by the central motion vector of the current block being less than a y-axis coordinate of an upper boundary of the current picture, changing the y-axis coordinate of the upper boundary of the reference area to the y-axis coordinate of the upper boundary of the current picture and changing a y-axis coordinate of a lower boundary of the reference area to a value obtained by adding the reference range to the y-axis coordinate of the upper boundary of the current picture.

The changing of the reference area may include, based on a y-axis coordinate of a lower boundary of the reference area indicated by the central motion vector of the current block being greater than a y-axis coordinate of a lower boundary of the current picture, changing the y-axis coordinate of the lower boundary of the reference area to the y-axis coordinate of the lower boundary of the current picture and changing a y-axis coordinate of an upper boundary of the reference area to a value obtained by subtracting the reference range from the y-axis coordinate of the lower boundary of the current picture.

The changing of the reference area may include, based on an x-axis coordinate of a right boundary of the reference area indicated by the central motion vector of the current block being less than an x-axis coordinate of a left boundary of the current picture, changing an x-axis coordinate of a left boundary of the reference area to the x-axis coordinate of the left boundary of the current picture and changing the x-axis coordinate of the right boundary of the reference area to a value obtained by adding the reference range to the x-axis coordinate of the left boundary of the current picture.

The changing of the reference area may include, based on an x-axis coordinate of a left boundary of the reference area indicated by the central motion vector of the current block being greater than an x-axis coordinate of a right boundary of the current picture, changing the x-axis coordinate of the left boundary of the reference area to the x-axis coordinate of the right boundary of the current picture and changing an x-axis coordinate of a right boundary of the reference area to a value obtained by subtracting the reference range from the x-axis coordinate of the right boundary of the current picture.

The changing of the reference area may include, based on a y-axis coordinate of a lower boundary of the reference area indicated by the central motion vector of the current block being less than a y-axis coordinate of an upper boundary of the current picture, changing a y-axis coordinate of an upper boundary of the reference area to the y-axis coordinate of the upper boundary of the current picture and changing the y-axis coordinate of the lower boundary of the reference area to a value obtained by adding the reference range to the y-axis coordinate of the upper boundary of the current picture.

The changing of the reference area may include, based on a y-axis coordinate of an upper boundary of the reference area indicated by the central motion vector of the current block being greater than a y-axis coordinate of a lower boundary of the current picture, changing the y-axis coordinate of the upper boundary of the reference area to the y-axis coordinate of the lower boundary of the current picture and changing a y-axis coordinate of a lower boundary of the reference area to a value obtained by subtracting the reference range from the y-axis coordinate of the lower boundary of the current picture.

A video decoding apparatus according to an embodiment of the present disclosure includes: an affine model inter predictor configured to obtain a base motion vector of a current block, based on affine model-based inter-prediction being performed in the current block; an inter-prediction sample determiner configured to: determine a central motion vector of the current block by using the base motion vector; determine a reference range of an area to be referred to, with respect to a current block, based on a size of the current block; based on a reference area having a size of the reference range with respect to a point in a reference picture of the current block, the point being indicated by the central motion vector of the current block, deviating from or including a boundary of the reference picture, change the reference area by parallelly translating the reference area into a current picture; and determine prediction samples of sub-blocks of the current block in the changed reference area from the reference picture; and a reconstructor configured to determine reconstruction samples of the current block by using the prediction samples of the current block.

A video encoding method according to an embodiment of the present disclosure includes: based on affine model-based inter-prediction being performed in a current block, determining a central motion vector of the current block by using a base motion vector of the current block; determining a reference range of an area to be referred to, with respect to the current block, based on a size of the current block; based on a reference area having a size of the reference range with respect to a point in a reference picture of the current block, the point being indicated by the central motion vector of the current block, deviating from or including a boundary of the reference picture, changing the reference area by parallelly translating the reference area into a current picture; determining prediction samples of sub-blocks of the current block in the changed reference area from the reference picture; and encoding residual samples of the current block by using the prediction samples of the current block.

The changing of the reference area may include, based on an x-axis coordinate of a left boundary of the reference area indicated by the central motion vector of the current block being less than an x-axis coordinate of a left boundary of the current picture, changing the x-axis coordinate of the left boundary of the reference area to the x-axis coordinate of the left boundary of the current picture and changing an x-axis coordinate of a right boundary of the reference area to a value obtained by adding the reference range to the x-axis coordinate of the left boundary of the current picture.

The changing of the reference area may include, based on a y-axis coordinate of an upper boundary of the reference area indicated by the central motion vector of the current block being less than a y-axis coordinate of an upper boundary of the current picture, changing the y-axis coordinate of the upper boundary of the reference area to the y-axis coordinate of the upper boundary of the current picture and changing a y-axis coordinate of a lower boundary of the reference area to a value obtained by adding the reference range to the y-axis coordinate of the upper boundary of the current picture.

The changing of the reference area may include, based on an x-axis coordinate of a right boundary of the reference area indicated by the central motion vector of the current block being less than an x-axis coordinate of a left boundary of the current picture, changing an x-axis coordinate of a left boundary of the reference area to the x-axis coordinate of the left boundary of the current picture and changing the x-axis coordinate of the right boundary of the reference area to a value obtained by adding the reference range to the x-axis coordinate of the left boundary of the current picture.

The changing of the reference area may include, based on a y-axis coordinate of a lower boundary of the reference area indicated by the central motion vector of the current block being less than a y-axis coordinate of an upper boundary of the current picture, changing a y-axis coordinate of an upper boundary of the reference area to the y-axis coordinate of the upper boundary of the current picture and changing the y-axis coordinate of the lower boundary of the reference area to a value obtained by adding the reference range to the y-axis coordinate of the upper boundary of the current picture.

A computer-readable recording medium according to an embodiment of the present disclosure may have recorded thereon a program for causing a computer to implement a video decoding method.

A computer-readable recording medium according to an embodiment of the present disclosure may have recorded thereon a program for causing a computer to implement a video encoding method.

As the present disclosure allows for various changes and numerous examples, particular embodiments will be illustrated in the drawings and described in detail in the written description. However, this is not intended to limit the present disclosure to particular modes of practice, and it will be understood that all changes, equivalents, and substitutes that do not depart from the spirit and technical scope of various embodiments are encompassed in the present disclosure.

In the description of embodiments, certain detailed explanations of related art are omitted when it is deemed that they may unnecessarily obscure the essence of the present disclosure. Also, numbers (for example, a first, a second, and the like) used in the description of the specification are merely identifier codes for distinguishing one element from another.

Also, in the present specification, it will be understood that when elements are "connected" or "coupled" to each other, the elements may be directly connected or coupled to each other, but may alternatively be connected or coupled to each other with an intervening element therebetween, unless specified otherwise.

In the present specification, regarding an element represented as a "unit" or a "module," two or more elements may be combined into one element or one element may be divided into two or more elements according to subdivided functions. In addition, each element described hereinafter may additionally perform some or all of functions performed by another element, in addition to main functions of itself, and some of the main functions of each element may be performed entirely by another component.

Also, in the present specification, an "image" or a "picture" may denote a still image of a video or a moving image, i.e., the video itself.

Also, in the present specification, a "sample" may denote data assigned to a sampling position of an image, i.e., data to be processed. For example, pixel values of an image in a spatial domain and transform coefficients on a transform region may be samples. A unit including at least one such sample may be defined as a block.

Also, in the present specification, a "current block" may denote a block of a largest coding unit, coding unit, prediction unit, or transform unit of a current image to be encoded or decoded.

Also, in the present specification, a motion vector in a list 0 direction may denote a motion vector used to indicate a block in a reference picture included in a list 0, and a motion vector in a list 1 direction may denote a motion vector used to indicate a block in a reference picture included in a list 1. Also, a motion vector in a unidirection may denote a motion vector used to indicate a block in a reference picture included in a list 0 or list 1, and a motion vector in a bidirection may denote that the motion vector includes a motion vector in a list 0 direction and a motion vector in a list 1 direction.

Also, in the present specification, the term "binary splitting" may refer to splitting a block into two sub-blocks whose width or height is half that of the block. In detail, when "binary vertical splitting" is performed on a current block, because splitting is performed in a vertical direction at a point corresponding to half a width of the current block, two sub-blocks with a width that is half the width of the current block and a height that is equal to a height of the current block may be generated. When "binary horizontal splitting" is performed on a current block, because splitting is performed in a horizontal direction at a point corresponding to half a height of the current block, two sub-blocks with a height that is half the height of the current block and a width that is equal to a width of the current block may be generated.

Also, in the present specification, the term "ternary splitting" may refer to splitting a width or a height of a block in a 1:2:1 ratio to generate three sub-blocks. In detail, when "ternary vertical splitting" is performed on a current block, because splitting is performed in a vertical direction at a point corresponding to a 1:2:1 ratio of a width of the current block, two sub-blocks with a width that is $¼$ of the width of the current block and a height that is equal to a height of the current block and one sub-block with a width that is $¾$ of the width of the current block and a height that is equal to the height of the current block may be generated. When "ternary horizontal splitting" is performed on a current block, because splitting is performed in a horizontal direction at a point corresponding to a 1:2:1 ratio of a height of the current block, two sub-blocks with a height that is $¼$ of the height of the current block and a width that is equal to a width of the current block and one sub-block with a height that is $¾$ of the height of the current block and a width that is equal to the width of the current block may be generated.

Also, in the present specification, the term "quad-splitting" may refer to splitting a width and a height of a block in a 1:1 ratio to generate four sub-blocks. In detail, when "quad-splitting" is performed on a current block, because splitting is performed in a vertical direction at a point corresponding to half a width of the current block and is performed in a horizontal direction at a point corresponding to half a height of the current block, four sub-blocks with a width that is ½ of the width of the current block and a height that is ½ of the height of the current block may be generated.

Hereinafter, an image encoding apparatus and an image decoding apparatus, and an image encoding method and an image decoding method according to an embodiment will be described in detail with reference to FIGS. 1 through 16. A method of determining a data unit of an image according to an embodiment will be described with reference to FIGS. 3 through 16, and a video encoding/decoding method using the determined data unit, according to an embodiment, will be described with reference to FIGS. 17 through 40.

Hereinafter, a method and apparatus for adaptive selection based on coding units of various shapes according to an embodiment of the present disclosure will be described in detail with reference to FIGS. 1 and 2.

FIG. 1 is a block diagram of an image decoding apparatus according to an embodiment.

An image decoding apparatus 100 may include a receiver 110 and a decoder 120. The receiver 110 and the decoder 120 may include at least one processor. Also, the receiver 110 and the decoder 120 may include a memory storing instructions to be performed by the at least one processor.

The receiver 110 may receive a bitstream. The bitstream includes information of an image encoded by an image encoding apparatus 2200 described later. Also, the bitstream may be transmitted from the image encoding apparatus 2200. The image encoding apparatus 2200 and the image decoding apparatus 100 may be connected by wire or wirelessly, and the receiver 110 may receive the bitstream by wire or wirelessly. The receiver 110 may receive the bitstream from a storage medium, such as an optical medium or a hard disk. The decoder 120 may reconstruct an image based on information obtained from the received bitstream. The decoder 120 may obtain, from the bitstream, a syntax element for reconstructing the image. The decoder 120 may reconstruct the image based on the syntax element.

Operations of the image decoding apparatus 100 will be described in detail with reference to FIG. 2.

Figure 2:
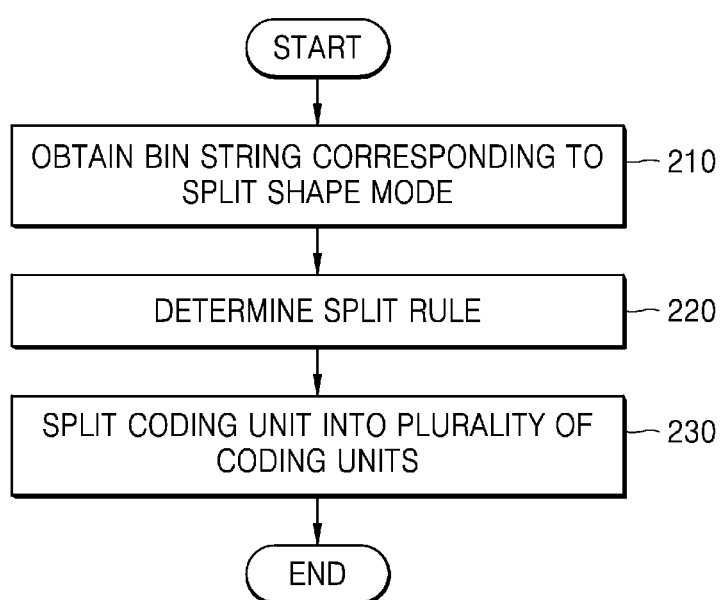
FIG. 2 is a flowchart of an image decoding method according to an embodiment.

FIG. 2 is a flowchart of an image decoding method according to an embodiment.

According to an embodiment of the present disclosure, the receiver 110 receives a bitstream.

The image decoding apparatus 100 obtains, from a bitstream, a bin string corresponding to a split shape mode of a coding unit, in operation 210. The image decoding apparatus 100 determines a split rule of the coding unit, in operation 220. Also, the image decoding apparatus 100 splits the coding unit into a plurality of coding units, based on at least one of the bin string corresponding to the split shape mode and the split rule, in operation 230. The image decoding apparatus 100 may determine an allowable first range of a size of the coding unit, according to a ratio of the width and the height of the coding unit, so as to determine the split rule. The image decoding apparatus 100 may determine an allowable second range of the size of the coding unit, according to the split shape mode of the coding unit, so as to determine the split rule.

Hereinafter, splitting of a coding unit will be described in detail according to an embodiment of the present disclosure.

First, one picture may be split into one or more slices or one or more tiles. One slice or one tile may be a sequence of one or more largest coding units (e.g., coding tree units (CTUs)). There is a largest coding block (coding tree block (CTB)) conceptually compared to a largest coding unit (CTU).

The largest coding unit (e.g., CTB) denotes N×N blocks including N×N samples (N is an integer). Each color component may be split into one or more largest coding blocks.

When a picture has three sample arrays (sample arrays for Y, Cr, and Cb components), a largest coding unit (e.g., CTU) includes a largest coding block of a luma sample, two corresponding largest coding blocks of chroma samples, and syntax structures used to encode the luma sample and the chroma samples. When a picture is a monochrome picture, a largest coding unit includes a largest coding block of a monochrome sample and syntax structures used to encode the monochrome samples. When a picture is a picture encoded in color planes separated according to color components, a largest coding unit includes syntax structures used to encode the picture and samples of the picture.

One largest coding block (e.g., CTB) may be split into M×N coding blocks including M×N samples (M and N are integers).

When a picture has sample arrays for Y, Cr, and Cb components, a coding unit (CU) includes a coding block of a luma sample, two corresponding coding blocks of chroma samples, and syntax structures used to encode the luma sample and the chroma samples. When a picture is a monochrome picture, a coding unit includes a coding block of a monochrome sample and syntax structures used to encode the monochrome samples. When a picture is a picture encoded in color planes separated according to color components, a coding unit includes syntax structures used to encode the picture and samples of the picture.

As described above, a largest coding block and a largest coding unit are conceptually distinguished from each other, and a coding block and a coding unit are conceptually distinguished from each other. That is, a (largest) coding unit refers to a data structure including a (largest) coding block including a corresponding sample and a syntax structure corresponding to the (largest) coding block. However, because it is understood by one of ordinary skill in the art that a (largest) coding unit or a (largest) coding block refers to a block of a certain size including a certain number of samples, a largest coding block and a largest coding unit, or a coding block and a coding unit are mentioned in the following specification without being distinguished unless otherwise described.

An image may be split into largest coding units (e.g., CTUs). A size of each largest coding unit may be determined based on information obtained from a bitstream. A shape of each largest coding unit may be a square shape of the same size. However, an embodiment is not limited thereto.

For example, information on a maximum size of a luma coding block may be obtained from a bitstream. For example, the maximum size of the luma coding block indicated by the information on the maximum size of the luma coding block may be one of 4×4, 8×8, 16×16, 32×32, 64×64, 128×128, and 256×256.

For example, information on a luma block size difference and a maximum size of a luma coding block that may be split into two may be obtained from a bitstream. The information on the luma block size difference may refer to a size difference between a luma largest coding unit and a largest luma coding block that may be split into two. Accordingly, when the information on the maximum size of the luma coding block that may be split into two and the information on the luma block size difference obtained from the bitstream are combined with each other, a size of the luma largest coding unit may be determined. A size of a chroma largest coding unit may also be determined by using the size of the luma largest coding unit. For example, when a Y:Cb:Cr ratio is 4:2:0 according to a color format, a size of a chroma block may be half a size of a luma block, and a size of a chroma largest coding unit may be half a size of a luma largest coding unit.

According to an embodiment, because information on a maximum size of a luma coding block that is binary splittable is obtained from a bitstream, the maximum size of the luma coding block that is binary splittable may be variably determined. In contrast, a maximum size of a luma coding block that is ternary splittable may be fixed. For example, the maximum size of the luma coding block that is ternary splittable in an I-picture may be 32×32, and the maximum size of the luma coding block that is ternary splittable in a P-picture or a B-picture may be 64×64.

Also, a largest coding unit may be hierarchically split into coding units based on split shape mode information obtained from a bitstream. At least one of information indicating whether quad-splitting is performed, information indicating whether multi-splitting is performed, split direction information, and split type information may be obtained as the split shape mode information from the bitstream.

For example, the information indicating whether quad-splitting is performed may indicate whether a current coding unit is quad-split (QUAD_SPLIT) or not.

When the current coding unit is not quad-split, the information indicating whether multi-splitting is performed may indicate whether the current coding unit is no longer split (NO_SPLIT) or binary/ternary split.

When the current coding unit is binary split or ternary split, the split direction information indicates that the current coding unit is split in one of a horizontal direction and a vertical direction.

When the current coding unit is split in the horizontal direction or the vertical direction, the split type information indicates that the current coding unit is binary split or ternary split.

A split mode of the current coding unit may be determined according to the split direction information and the split type information. A split mode when the current coding unit is binary split in the horizontal direction may be determined to be a binary horizontal split mode (SPLIT_BT_HOR), a split mode when the current coding unit is ternary split in the horizontal direction may be determined to be a ternary horizontal split mode (SPLIT_TT_HOR), a split mode when the current coding unit is binary split in the vertical direction may be determined to be a binary vertical split mode (SPLIT_BT_VER), and a split mode when the current coding unit is ternary split in the vertical direction may be determined to be a ternary vertical split mode (SPLIT_BT_VERT).

The image decoding apparatus 100 may obtain, from the bitstream, the split shape mode information from one bin string. A form of the bitstream received by the image decoding apparatus 100 may include fixed length binary code, unary code, truncated unary code, pre-determined binary code, or the like. The bin string is information in a binary number. The bin string may include at least one bit. The image decoding apparatus 100 may obtain the split shape mode information corresponding to the bin string, based on the split rule. The image decoding apparatus 100 may determine whether to quad-split a coding unit, whether not to split a coding unit, a split direction, and a split type, based on one bin string.

The coding unit may be smaller than or the same as the largest coding unit. For example, because a largest coding unit is a coding unit having a maximum size, the largest coding unit is one of coding units. When split shape mode information on a largest coding unit indicates that splitting is not performed, a coding unit determined in the largest coding unit has the same size as that of the largest coding unit. When split shape code information on a largest coding unit indicates that splitting is performed, the largest coding unit may be split into coding units. Also, when split shape mode information on a coding unit indicates that splitting is performed, the coding unit may be split into smaller coding units. However, the splitting of the image is not limited thereto, and the largest coding unit and the coding unit may not be distinguished. The splitting of the coding unit will be described in more detail with reference to FIGS. 3 through 16.

Also, one or more prediction blocks for prediction may be determined from a coding unit. The prediction block may be the same as or smaller than the coding unit. Also, one or more transform blocks for transformation may be determined from a coding unit. The transform block may be the same as or smaller than the coding unit.

Shapes and sizes of the transform block and prediction block may not be related to each other.

In another embodiment, prediction may be performed by using a coding unit as a prediction block. Also, transformation may be performed by using a coding unit as a transform block.

The splitting of the coding unit will be described in more detail with reference to FIGS. 3 through 16. A current block and a neighboring block of the present disclosure may indicate one of the largest coding unit, the coding unit, the prediction block, and the transform block. Also, the current block or the current coding unit is a block that is currently being decoded or encoded or a block that is currently being split. The neighboring block may be a block reconstructed before the current block. The neighboring block may be adjacent to the current block spatially or temporally. The neighboring block may be located at one of the lower left, left, upper left, top, upper right, right, lower right of the current block.

Figure 3:
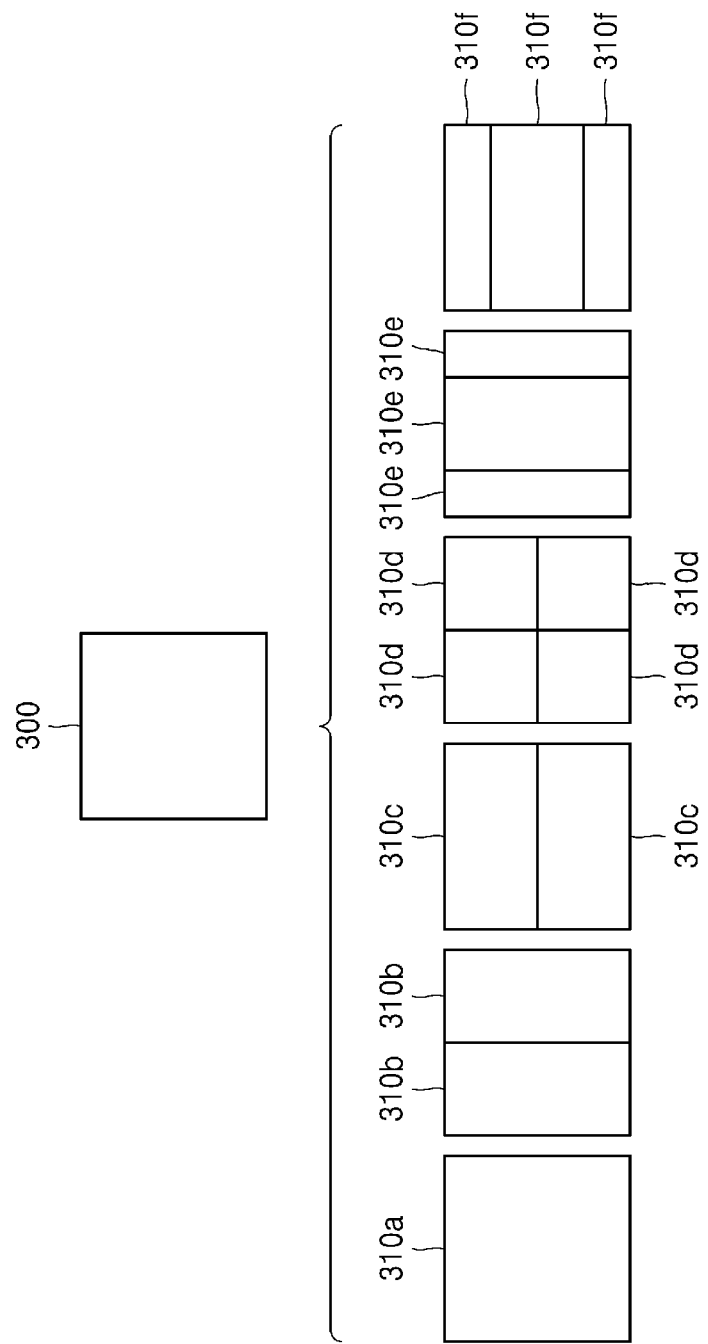
FIG. 3 is a diagram of a process by which an image decoding apparatus determines at least one coding unit by splitting a current coding unit, according to an embodiment.

FIG. 3 is a diagram of a process by which an image decoding apparatus determines at least one coding unit by splitting a current coding unit, according to an embodiment.

A block shape may include 4N×4N, 4N×2N, 2N×4N, 4N×N, N×4N, 32N×N, N×32N, 16N×N, N×16N, 8N×N, or N×8N. Here, N may be a positive integer. Block shape information is information indicating at least one of a shape, direction, a ratio of width and height, or a size of a coding unit.

The shape of the coding unit may include a square and a non-square. When the lengths of the width and height of the coding unit are the same (i.e., when the block shape of the coding unit is 4N×4N), the image decoding apparatus 100 may determine the block shape information of the coding unit as a square. The image decoding apparatus 100 may determine the shape of the coding unit to be a non-square.

When the lengths of the width and the height of the coding unit are different from each other (i.e., when the block shape of the coding unit is 4N×2N, 2N×4N, 4N×N, N×4N, 32N×N, N×32N, 16N×N, N×16N, 8N×N, or N×8N), the image decoding apparatus 100 may determine the block shape information of the coding unit as a non-square. When the shape of the coding unit is a non-square, the image decoding apparatus 100 may determine the ratio of the width and height among the block shape information of the coding unit to be at least one of 1:2, 2:1, 1:4, 4:1, 1:8, 8:1, 1:16, 16:1, 1:32, and 32:1. Also, the image decoding apparatus 100 may determine whether the coding unit is in a horizontal direction or a vertical direction, based on the length of the width and the length of the height of the coding unit. Also, the image decoding apparatus 100 may determine the size of the coding unit, based on at least one of the length of the width, the length of the height, or the area of the coding unit.

According to an embodiment, the image decoding apparatus 100 may determine the shape of the coding unit by using the block shape information, and may determine a splitting method of the coding unit by using the split shape mode information. That is, a coding unit splitting method indicated by the split shape mode information may be determined based on a block shape indicated by the block shape information used by the image decoding apparatus 100.

The image decoding apparatus 100 may obtain the split shape mode information from a bitstream. However, an embodiment is not limited thereto, and the image decoding apparatus 100 and the image encoding apparatus 2200 may determine pre-agreed split shape mode information, based on the block shape information. The image decoding apparatus 100 may determine the pre-agreed split shape mode information with respect to a largest coding unit or a smallest coding unit. For example, the image decoding apparatus 100 may determine split shape mode information with respect to the largest coding unit to be a quad-split. Also, the image decoding apparatus 100 may determine split shape mode information with respect to the smallest coding unit to be "not to perform splitting". In particular, the image decoding apparatus 100 may determine the size of the largest coding unit to be 256×256. The image decoding apparatus 100 may determine the pre-agreed split shape mode information to be a quad-split. The quad-split is a split shape mode in which the width and the height of the coding unit are both bisected. The image decoding apparatus 100 may obtain a coding unit of a 128×128 size from the largest coding unit of a 256×256 size, based on the split shape mode information. Also, the image decoding apparatus 100 may determine the size of the smallest coding unit to be 4×4. The image decoding apparatus 100 may obtain split shape mode information indicating "not to perform splitting" with respect to the smallest coding unit.

According to an embodiment, the image decoding apparatus 100 may use the block shape information indicating that the current coding unit has a square shape. For example, the image decoding apparatus 100 may determine whether not to split a square coding unit, whether to vertically split the square coding unit, whether to horizontally split the square coding unit, or whether to split the square coding unit into four coding units, based on the split shape mode information. Referring to FIG. 3, when the block shape information of a current coding unit 300 indicates a square shape, the decoder 120 may not split a coding unit 310a having the same size as the current coding unit 300, based on the split shape mode information indicating not to perform splitting, or may determine coding units 310b, 310c, 310d, 310e, or 310f split based on the split shape mode information indicating a certain splitting method.

Referring to FIG. 3, according to an embodiment, the image decoding apparatus 100 may determine two coding units 310b obtained by splitting the current coding unit 300 in a vertical direction, based on the split shape mode information indicating to perform splitting in a vertical direction. The image decoding apparatus 100 may determine two coding units 310c obtained by splitting the current coding unit 300 in a horizontal direction, based on the split shape mode information indicating to perform splitting in a horizontal direction. The image decoding apparatus 100 may determine four coding units 310d obtained by splitting the current coding unit 300 in vertical and horizontal directions, based on the split shape mode information indicating to perform splitting in vertical and horizontal directions. According to an embodiment, the image decoding apparatus 100 may determine three coding units 310e obtained by splitting the current coding unit 300 in a vertical direction, based on the split shape mode information indicating to perform ternary-splitting in a vertical direction. The image decoding apparatus 100 may determine three coding units 310f obtained by splitting the current coding unit 300 in a horizontal direction, based on the split shape mode information indicating to perform ternary-splitting in a horizontal direction. However, splitting methods of the square coding unit are not limited to the above-described methods, and the split shape mode information may indicate various methods. Certain splitting methods of splitting the square coding unit will be described in detail below in relation to various embodiments.

FIG. 4 is a diagram of a process by which an image decoding apparatus determines at least one coding unit by splitting a non-square coding unit, according to an embodiment.

According to an embodiment, the image decoding apparatus 100 may use block shape information indicating that a current coding unit has a non-square shape. The image decoding apparatus 100 may determine whether not to split the non-square current coding unit or whether to split the non-square current coding unit by using a certain splitting method, based on split shape mode information. Referring to FIG. 4, when the block shape information of a current coding unit 400 or 450 indicates a non-square shape, the image decoding apparatus 100 may determine a coding unit 410 or 460 having the same size as the current coding unit 400 or 450, based on the split shape mode information indicating not to perform splitting, or determine coding units 420a and 420b, 430a to 430c, 470a and 470b, or 480a to 480c split based on the split shape mode information indicating a certain splitting method. Certain splitting methods of splitting a non-square coding unit will be described in detail below in relation to various embodiments.

According to an embodiment, the image decoding apparatus 100 may determine a splitting method of a coding unit by using the split shape mode information and, in this case, the split shape mode information may indicate the number of one or more coding units generated by splitting a coding unit. Referring to FIG. 4, when the split shape mode information indicates to split the current coding unit 400 or 450 into two coding units, the image decoding apparatus 100 may determine two coding units 420a and 420b, or 470a and 470b included in the current coding unit 400 or 450, by splitting the current coding unit 400 or 450 based on the split shape mode information.

According to an embodiment, when the image decoding apparatus 100 splits the non-square current coding unit 400 or 450 based on the split shape mode information, the image decoding apparatus 100 may consider the location of a long side of the non-square current coding unit 400 or 450 to split a current coding unit. For example, the image decoding apparatus 100 may determine a plurality of coding units by splitting a long side of the current coding unit 400 or 450, in consideration of the shape of the current coding unit 400 or 450.

According to an embodiment, when the split shape mode information indicates to split (ternary-split) a coding unit into an odd number of blocks, the image decoding apparatus 100 may determine an odd number of coding units included in the current coding unit 400 or 450. For example, when the split shape mode information indicates to split the current coding unit 400 or 450 into three coding units, the image decoding apparatus 100 may split the current coding unit 400 or 450 into three coding units 430a, 430b, and 430c, or 480a, 480b, and 480c.

According to an embodiment, a ratio of the width and height of the current coding unit 400 or 450 may be 4:1 or 1:4. When the ratio of the width and height is 4:1, the block shape information may be a horizontal direction because the length of the width is longer than the length of the height. When the ratio of the width and height is 1:4, the block shape information may be a vertical direction because the length of the width is shorter than the length of the height. The image decoding apparatus 100 may determine to split a current coding unit into the odd number of blocks, based on the split shape mode information. Also, the image decoding apparatus 100 may determine a split direction of the current coding unit 400 or 450, based on the block shape information of the current coding unit 400 or 450. For example, when the current coding unit 400 is in the vertical direction, the image decoding apparatus 100 may determine the coding units 430a to 430c by splitting the current coding unit 400 in the horizontal direction. Also, when the current coding unit 450 is in the horizontal direction, the image decoding apparatus 100 may determine the coding units 480a to 480c by splitting the current coding unit 450 in the vertical direction.

According to an embodiment, the image decoding apparatus 100 may determine the odd number of coding units included in the current coding unit 400 or 450, and not all the determined coding units may have the same size. For example, a certain coding unit 430b or 480b from among the determined odd number of coding units 430a, 430b, and 430c, or 480a, 480b, and 480c may have a size different from the size of the other coding units 430a and 430c, or 480a and 480c. That is, coding units which may be determined by splitting the current coding unit 400 or 450 may have multiple sizes and, in some cases, all of the odd number of coding units 430a, 430b, and 430c, or 480a, 480b, and 480c may have different sizes.

According to an embodiment, when the split shape mode information indicates to split a coding unit into the odd number of blocks, the image decoding apparatus 100 may determine the odd number of coding units included in the current coding unit 400 or 450, and in addition, may put a certain restriction on at least one coding unit from among the odd number of coding units generated by splitting the current coding unit 400 or 450. Referring to FIG. 4, the image decoding apparatus 100 may set a decoding process regarding the coding unit 430b or 480b located at the center among the three coding units 430a, 430b, and 430c or 480a, 480b, and 480c generated as the current coding unit 400 or 450 is split to be different from that of the other coding units 430a and 430c, or 480a or 480c. For example, the image decoding apparatus 100 may restrict the coding unit 430b or 480b at the center location to be no longer split or to be split only a certain number of times, unlike the other coding units 430a and 430c, or 480a and 480c.

Figure 5:
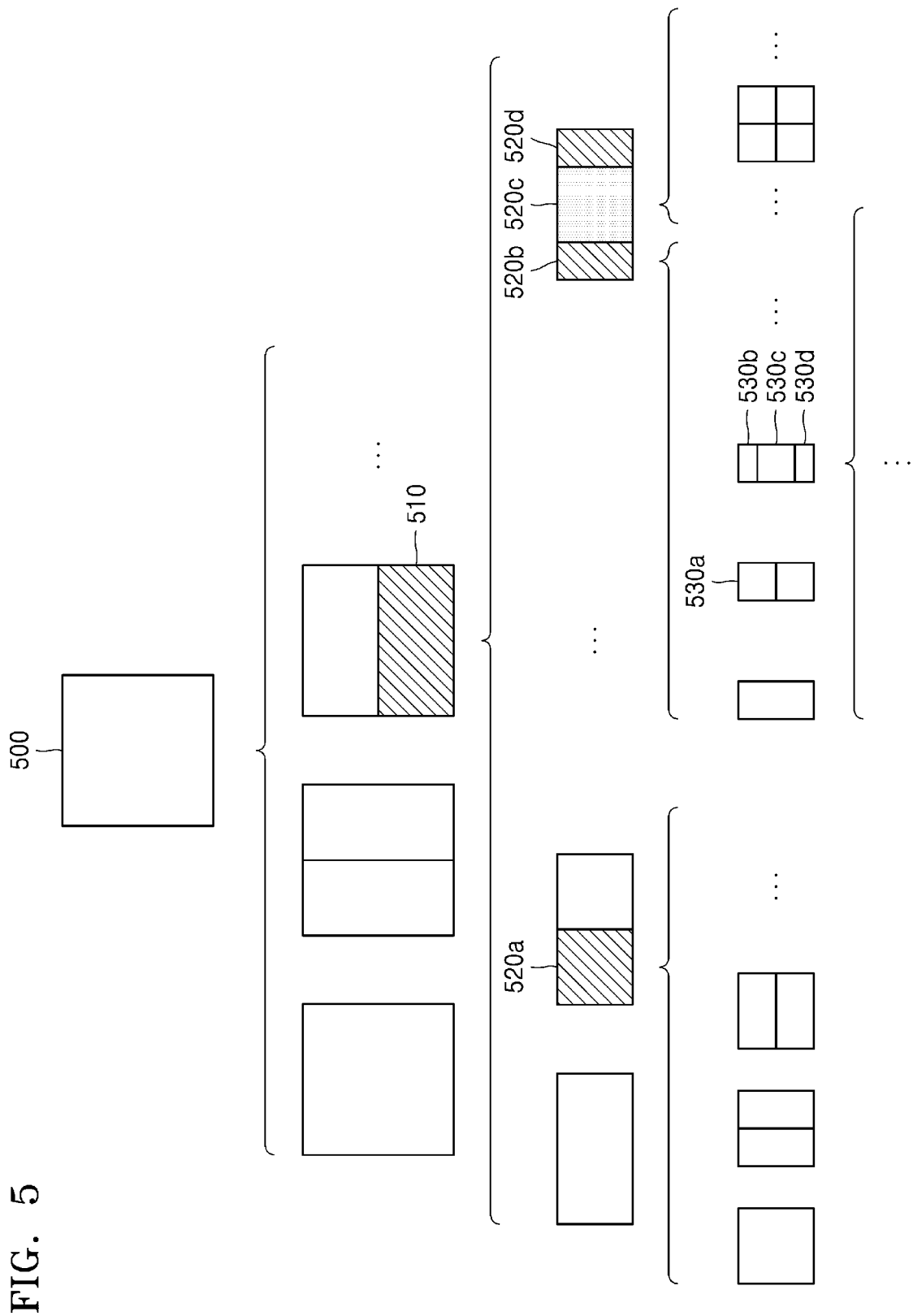
FIG. 5 is a diagram of a process by which an image decoding apparatus splits a coding unit based on at least one of block shape information and split shape mode information, according to an embodiment.

FIG. 5 is a diagram of a process by which an image decoding apparatus splits a coding unit based on at least one of block shape information and split shape mode information, according to an embodiment.

According to an embodiment, the image decoding apparatus 100 may determine to split or not to split a square first coding unit 500 into coding units, based on at least one of the block shape information and the split shape mode information. According to an embodiment, when the split shape mode information indicates to split the first coding unit 500 in a horizontal direction, the image decoding apparatus 100 may determine a second coding unit 510 by splitting the first coding unit 500 in a horizontal direction. A first coding unit, a second coding unit, and a third coding unit used according to an embodiment are terms used to understand a relation before and after splitting a coding unit. For example, a second coding unit may be determined by splitting a first coding unit, and a third coding unit may be determined by splitting the second coding unit. It will be understood that the structure of the first coding unit, the second coding unit, and the third coding unit follows the above descriptions.

According to an embodiment, the image decoding apparatus 100 may determine to split or not to split the determined second coding unit 510 into coding units, based on the split shape mode information. Referring to FIG. 5, the image decoding apparatus 100 may or may not split the non-square second coding unit 510, which is determined by splitting the first coding unit 500, into one or more third coding units 520a, or 520b, 520c, and 520d based on the split shape mode information. The image decoding apparatus 100 may obtain the split shape mode information, and may obtain a plurality of various-shaped second coding units (e.g., 510) by splitting the first coding unit 500, based on the obtained split shape mode information, and the second coding unit 510 may be split by using a splitting method of the first coding unit 500 based on the split shape mode information. According to an embodiment, when the first coding unit 500 is split into the second coding units 510 based on the split shape mode information of the first coding unit 500, the second coding unit 510 may also be split into the third coding units 520a, or 520b, 520c, and 520d based on the split shape mode information of the second coding unit 510. That is, a coding unit may be recursively split based on the split shape mode information of each coding unit. Accordingly, a square coding unit may be determined by splitting a non-square coding unit, and a non-square coding unit may be determined by recursively splitting the square coding unit.

Referring to FIG. 5, a certain coding unit from among the odd number of third coding units 520b, 520c, and 520d determined by splitting the non-square second coding unit 510 (e.g., a coding unit at a center location or a square coding unit) may be recursively split. According to an embodiment, the square third coding unit 520b from among the odd number of third coding units 520b, 520c, and 520d may be split in a horizontal direction into a plurality of fourth coding units. A non-square fourth coding unit 530b or 530d from among a plurality of fourth coding units 530a, 530b, 530c, and 530d may be split into a plurality of coding units again. For example, the non-square fourth coding unit 530b or 530d may be split into the odd number of coding units again. A method that may be used to recursively split a coding unit will be described below in relation to various embodiments.

According to an embodiment, the image decoding apparatus 100 may split each of the third coding units 520a, or 520b, 520c, and 520d into coding units, based on the split shape mode information. Also, the image decoding apparatus 100 may determine not to split the second coding unit 510 based on the split shape mode information. According to an embodiment, the image decoding apparatus 100 may split the non-square second coding unit 510 into the odd number of third coding units 520b, 520c, and 520d. The image decoding apparatus 100 may put a certain restriction on a certain third coding unit from among the odd number of third coding units 520*b*, 520*c*, and 520*d*. For example, the image decoding apparatus 100 may restrict the third coding unit 520*c* at a center location from among the odd number of third coding units 520*b*, 520*c*, and 520*d* to be no longer split or to be split a settable number of times.

Referring to FIG. 5, the image decoding apparatus 100 may restrict the third coding unit 520*c*, which is at the center location from among the odd number of third coding units 520*b*, 520*c*, and 520*d* included in the non-square second coding unit 510, to be no longer split, to be split by using a certain splitting method (e.g., split into only four coding units or split by using a splitting method of the second coding unit 510), or to be split only a certain number of times (e.g., split only n times (where n>0)). However, the restrictions on the third coding unit 520*c* at the center location are not limited to the above-described examples, and may include various restrictions for decoding the third coding unit 520*c* at the center location differently from the other third coding units 520*b* and 520*d*.

According to an embodiment, the image decoding apparatus 100 may obtain the split shape mode information, which is used to split a current coding unit, from a certain location in the current coding unit.

Figure 6:
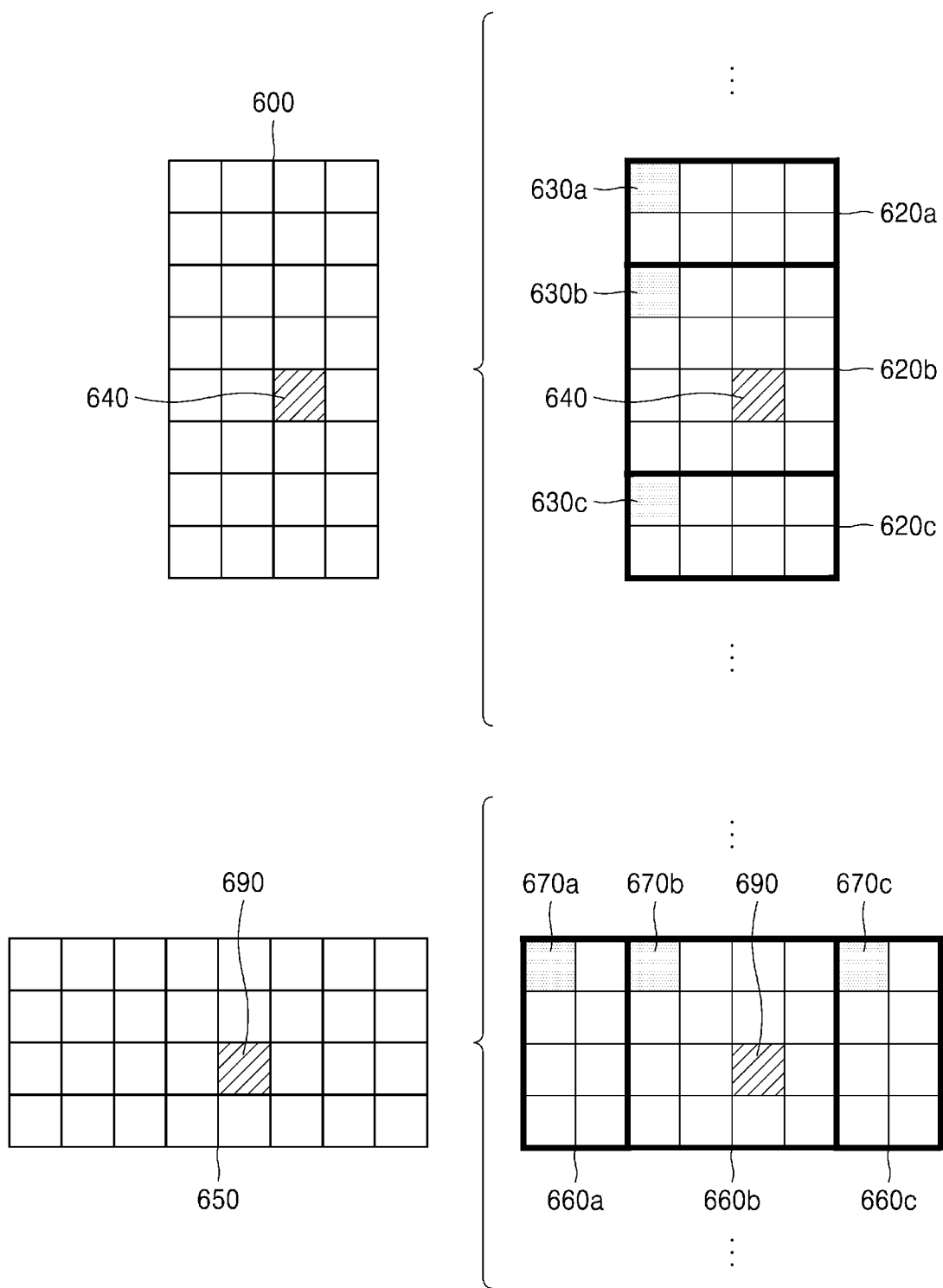
FIG. 6 is a diagram of a method by which an image decoding apparatus determines a certain coding unit from among an odd number of coding units, according to an embodiment.

FIG. 6 is a diagram of a method by which an image decoding apparatus determines a certain coding unit from among an odd number of coding units, according to an embodiment.

Referring to FIG. 6, split shape mode information of a current coding unit 600 or 650 may be obtained from a sample of a certain location (e.g., a sample 640 or 690 of a center location) from among a plurality of samples included in the current coding unit 600 or 650. However, the certain location in the current coding unit 600, from which at least one piece of the split shape mode information may be obtained, is not limited to the center location in FIG. 6, and may include various locations included in the current coding unit 600 (e.g., top, bottom, left, right, upper left, lower left, upper right, and lower right locations). The image decoding apparatus 100 may obtain the split shape mode information from the certain location and may determine to split or not to split the current coding unit into various-shaped and various-sized coding units.

According to an embodiment, when the current coding unit is split into a certain number of coding units, the image decoding apparatus 100 may select one of the coding units. Various methods may be used to select one of a plurality of coding units, as will be described below in relation to various embodiments.

According to an embodiment, the image decoding apparatus 100 may split the current coding unit into a plurality of coding units, and may determine a coding unit at a certain location.

According to an embodiment, image decoding apparatus 100 may use information indicating locations of the odd number of coding units, to determine a coding unit at a center location from among the odd number of coding units. Referring to FIG. 6, the image decoding apparatus 100 may determine the odd number of coding units 620*a*, 620*b*, and 620*c* or the odd number of coding units 660*a*, 660*b*, and 660*c* by splitting the current coding unit 600 or the current coding unit 650. The image decoding apparatus 100 may determine the middle coding unit 620*b* or the middle coding unit 660*b* by using information on the locations of the odd number of coding units 620*a*, 620*b*, and 620*c* or the odd number of coding units 660*a*, 660*b*, and 660*c*. For example, the image decoding apparatus 100 may determine the coding unit 620*b* of the center location by determining the locations of the coding units 620*a*, 620*b*, and 620*c* based on information indicating locations of certain samples included in the coding units 620*a*, 620*b*, and 620*c*. In detail, the image decoding apparatus 100 may determine the coding unit 620*b* at the center location by determining the locations of the coding units 620*a*, 620*b*, and 620*c* based on information indicating locations of upper left samples 630*a*, 630*b*, and 630*c* of the coding units 620*a*, 620*b*, and 620*c*.

According to an embodiment, the information indicating the locations of the upper left samples 630*a*, 630*b*, and 630*c*, which are included in the coding units 620*a*, 620*b*, and 620*c*, respectively, may include information on locations or coordinates of the coding units 620*a*, 620*b*, and 620*c* in a picture. According to an embodiment, the information indicating the locations of the upper left samples 630*a*, 630*b*, and 630*c*, which are included in the coding units 620*a*, 620*b*, and 620*c*, respectively, may include information indicating widths or heights of the coding units 620*a*, 620*b*, and 620*c* included in the current coding unit 600, and the widths or heights may correspond to information indicating differences between the coordinates of the coding units 620*a*, 620*b*, and 620*c* in the picture. That is, the image decoding apparatus 100 may determine the coding unit 620*b* at the center location by directly using the information on the locations or coordinates of the coding units 620*a*, 620*b*, and 620*c* in the picture, or by using the information on the widths or heights of the coding units, which correspond to the difference values between the coordinates.

According to an embodiment, information indicating the location of the upper left sample 630*a* of the upper coding unit 620*a* may include coordinates (xa, ya), information indicating the location of the upper left sample 630*b* of the middle coding unit 620*b* may include coordinates (xb, yb), and information indicating the location of the upper left sample 630*c* of the lower coding unit 620*c* may include coordinates (xc, yc). The image decoding apparatus 100 may determine the middle coding unit 620*b* by using the coordinates of the upper left samples 630*a*, 630*b*, and 630*c* which are included in the coding units 620*a*, 620*b*, and 620*c*, respectively. For example, when the coordinates of the upper left samples 630*a*, 630*b*, and 630*c* are sorted in an ascending or descending order, the coding unit 620*b* including the coordinates (xb, yb) of the sample 630*b* at a center location may be determined as a coding unit at a center location from among the coding units 620*a*, 620*b*, and 620*c* determined by splitting the current coding unit 600. However, the coordinates indicating the locations of the upper left samples 630*a*, 630*b*, and 630*c* may include coordinates indicating absolute locations in the picture, or may use coordinates (dxb, dyb) indicating a relative location of the upper left sample 630*b* of the middle coding unit 620*b* and coordinates (dxc, dyc) indicating a relative location of the upper left sample 630*c* of the lower coding unit 620*c* with reference to the location of the upper left sample 630*a* of the upper coding unit 620*a*. A method of determining a coding unit at a certain location by using coordinates of a sample included in the coding unit, as information indicating a location of the sample, is not limited to the above-described method, and may include various arithmetic methods capable of using the coordinates of the sample.

According to an embodiment, the image decoding apparatus 100 may split the current coding unit 600 into a plurality of coding units 620*a*, 620*b*, and 620*c*, and may select one of the coding units 620*a*, 620*b*, and 620*c* based on a certain criterion. For example, the image decoding apparatus 100 may select the coding unit 620*b*, which has a size different from that of the others, from among the coding units 620*a*, 620*b*, and 620*c*.

According to an embodiment, the image decoding apparatus 100 may determine the width or height of each of the coding units 620*a*, 620*b*, and 620*c* by using the coordinates (xa, ya) that is the information indicating the location of the upper left sample 630*a* of the upper coding unit 620*a*, the coordinates (xb, yb) that is the information indicating the location of the upper left sample 630*b* of the middle coding unit 620*b*, and the coordinates (xc, yc) that is the information indicating the location of the upper left sample 630*c* of the lower coding unit 620*c*. The image decoding apparatus 100 may determine the respective sizes of the coding units 620*a*, 620*b*, and 620*c* by using the coordinates (xa, ya), (xb, yb), and (xc, yc) indicating the locations of the coding units 620*a*, 620*b*, and 620*c*. According to an embodiment, the image decoding apparatus 100 may determine the width of the upper coding unit 620*a* to be the width of the current coding unit 600. The image decoding apparatus 100 may determine the height of the upper coding unit 620*a* to be yb−ya. According to an embodiment, the image decoding apparatus 100 may determine the width of the middle coding unit 620*b* to be the width of the current coding unit 600. The image decoding apparatus 100 may determine the height of the middle coding unit 620*b* to be yc−yb. According to an embodiment, the image decoding apparatus 100 may determine the width or height of the lower coding unit 620*c* by using the width or height of the current coding unit 600 or the widths or heights of the upper and middle coding units 620*a* and 620*b*. The image decoding apparatus 100 may determine a coding unit, which has a size different from that of the others, based on the determined widths and heights of the coding units 620*a* to 620*c*. Referring to FIG. 6, the image decoding apparatus 100 may determine the middle coding unit 620*b*, which has a size different from the size of the upper and lower coding units 620*a* and 620*c*, as the coding unit of the certain location. However, the above-described method by which the image decoding apparatus 100 determines a coding unit having a size different from the size of the other coding units merely corresponds to an example of determining a coding unit at a certain location by using the sizes of coding units, which are determined based on coordinates of samples, and thus various methods of determining a coding unit at a certain location by comparing the sizes of coding units, which are determined based on coordinates of certain samples, may be used.

The image decoding apparatus 100 may determine the width or height of each of the coding units 660*a*, 660*b*, and 660*c* by using coordinates (xd, yd) that is information indicating the location of an upper left sample 670*a* of the left coding unit 660*a*, coordinates (xe, ye) that is information indicating the location of an upper left sample 670*b* of the middle coding unit 660*b*, and coordinates (xf, yf) that is information indicating the location of an upper left sample 670*c* of the right coding unit 660*c*. The image decoding apparatus 100 may determine the respective sizes of the coding units 660*a*, 660*b*, and 660*c* by using the coordinates (xd, yd), (xe, ye), and (xf, yf) indicating the locations of the coding units 660*a*, 660*b*, and 660*c*.

According to an embodiment, the image decoding apparatus 100 may determine the width of the left coding unit 660*a* to be xe−xd. The image decoding apparatus 100 may determine the height of the left coding unit 660*a* to be the height of the current coding unit 650. According to an embodiment, the image decoding apparatus 100 may determine the width of the middle coding unit 660*b* to be xf−xe. The image decoding apparatus 100 may determine the height of the middle coding unit 660*b* to be the height of the current coding unit 600. According to an embodiment, the image decoding apparatus 100 may determine the width or height of the right coding unit 660*c* by using the width or height of the current coding unit 650 or the widths or heights of the left and middle coding units 660*a* and 660*b*. The image decoding apparatus 100 may determine a coding unit, which has a size different from that of the others, based on the determined widths and heights of the coding units 660*a* to 660*c*. Referring to FIG. 6, the image decoding apparatus 100 may determine the middle coding unit 660*b*, which has a size different from the sizes of the left and right coding units 660*a* and 660*c*, as the coding unit of the certain location. However, the above-described method by which the image decoding apparatus 100 determines a coding unit having a size different from the size of the other coding units merely corresponds to an example of determining a coding unit at a certain location by using the sizes of coding units, which are determined based on coordinates of samples, and thus various methods of determining a coding unit at a certain location by comparing the sizes of coding units, which are determined based on coordinates of certain samples, may be used.

However, locations of samples considered to determine locations of coding units are not limited to the above-described upper left locations, and information on arbitrary locations of samples included in the coding units may be used.

According to an embodiment, the image decoding apparatus 100 may select a coding unit at a certain location from among an odd number of coding units determined by splitting the current coding unit, considering a shape of the current coding unit. For example, when the current coding unit has a non-square shape, a width of which is longer than a height, the image decoding apparatus 100 may determine the coding unit at the certain location in a horizontal direction. That is, the image decoding apparatus 100 may determine one of coding units at different locations in a horizontal direction and put a restriction on the coding unit. When the current coding unit has a non-square shape, a height of which is longer than a width, the image decoding apparatus 100 may determine the coding unit at the certain location in a vertical direction. That is, the image decoding apparatus 100 may determine one of coding units at different locations in a vertical direction and may put a restriction on the coding unit.

According to an embodiment, the image decoding apparatus 100 may use information indicating respective locations of an even number of coding units, to determine the coding unit at the certain location from among the even number of coding units. The image decoding apparatus 100 may determine an even number of coding units by splitting (binary-splitting) the current coding unit, and may determine the coding unit at the certain location by using the information on the locations of the even number of coding units. An operation related thereto may correspond to the operation of determining a coding unit at a certain location (e.g., a center location) from among an odd number of coding units, which has been described in detail above in relation to FIG. 6, and thus detailed descriptions thereof are not provided here.

According to an embodiment, when a non-square current coding unit is split into a plurality of coding units, certain information on a coding unit at a certain location may be used in a splitting operation to determine the coding unit at the certain location from among the plurality of coding units. For example, the image decoding apparatus 100 may use at least one of block shape information and split shape mode information, which is stored in a sample included in a middle coding unit, in a splitting operation to determine a coding unit at a center location from among the plurality of coding units determined by splitting the current coding unit.

Referring to FIG. 6, the image decoding apparatus 100 may split the current coding unit 600 into the plurality of coding units 620a, 620b, and 620c based on the split shape mode information, and may determine the coding unit 620b at a center location from among the plurality of the coding units 620a, 620b, and 620c. Furthermore, the image decoding apparatus 100 may determine the coding unit 620b at the center location, in consideration of a location from which the split shape mode information is obtained. That is, the split shape mode information of the current coding unit 600 may be obtained from the sample 640 at a center location of the current coding unit 600 and, when the current coding unit 600 is split into the plurality of coding units 620a, 620b, and 620c based on the split shape mode information, the coding unit 620b including the sample 640 may be determined as the coding unit at the center location. However, information used to determine the coding unit at the center location is not limited to the split shape mode information, and various types of information may be used to determine the coding unit at the center location.

According to an embodiment, certain information for identifying the coding unit at the certain location may be obtained from a certain sample included in a coding unit to be determined. Referring to FIG. 6, the image decoding apparatus 100 may use the split shape mode information, which is obtained from a sample at a certain location in the current coding unit 600 (e.g., a sample at a center location of the current coding unit 600) to determine a coding unit at a certain location from among the plurality of the coding units 620a, 620b, and 620c determined by splitting the current coding unit 600 (e.g., a coding unit at a center location from among a plurality of split coding units). That is, the image decoding apparatus 100 may determine the sample at the certain location by considering a block shape of the current coding unit 600, may determine the coding unit 620b including a sample, from which certain information (e.g., the split shape mode information) may be obtained, from among the plurality of coding units 620a, 620b, and 620c determined by splitting the current coding unit 600, and may put a certain restriction on the coding unit 620b. Referring to FIG. 6, according to an embodiment, the image decoding apparatus 100 may determine the sample 640 at the center location of the current coding unit 600 as the sample from which the certain information may be obtained, and may put a certain restriction on the coding unit 620b including the sample 640, in a decoding operation. However, the location of the sample from which the certain information may be obtained is not limited to the above-described location, and may include arbitrary locations of samples included in the coding unit 620b to be determined for a restriction.

According to an embodiment, the location of the sample from which the certain information may be obtained may be determined based on the shape of the current coding unit 600. According to an embodiment, the block shape information may indicate whether the current coding unit has a square or non-square shape, and the location of the sample from which the certain information may be obtained may be determined based on the shape. For example, the image decoding apparatus 100 may determine a sample located on a boundary for splitting at least one of a width and height of the current coding unit in half, as the sample from which the certain information may be obtained, by using at least one of information on the width of the current coding unit and information on the height of the current coding unit. In another example, when the block shape information of the current coding unit indicates a non-square shape, the image decoding apparatus 100 may determine one of samples including a boundary for splitting a long side of the current coding unit in half, as the sample from which the preset information may be obtained.

According to an embodiment, when the current coding unit is split into a plurality of coding units, the image decoding apparatus 100 may use the split shape mode information to determine a coding unit at a certain location from among the plurality of coding units. According to an embodiment, the image decoding apparatus 100 may obtain the split shape mode information from a sample at a certain location in a coding unit, and may split the plurality of coding units, which are generated by splitting the current coding unit, by using the split shape mode information, which is obtained from the sample of the certain location in each of the plurality of coding units. That is, a coding unit may be recursively split based on the split shape mode information, which is obtained from the sample at the certain location in each coding unit. An operation of recursively splitting a coding unit has been described above in relation to FIG. 5, and thus detailed descriptions thereof will not be provided here.

According to an embodiment, the image decoding apparatus 100 may determine one or more coding units by splitting the current coding unit, and may determine an order of decoding the one or more coding units, based on a certain block (e.g., the current coding unit).

Figure 7:
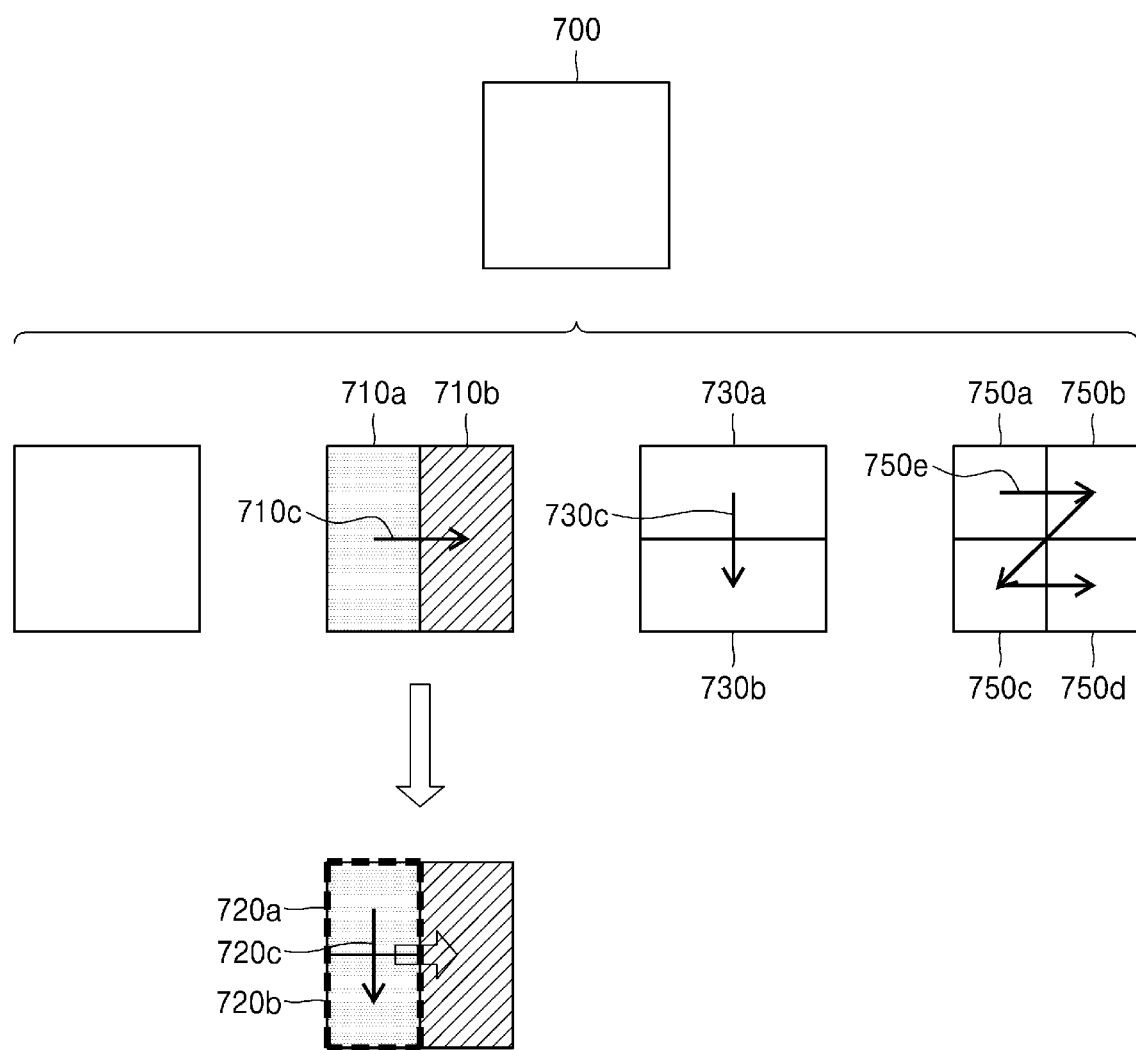
FIG. 7 is a diagram of an order of processing a plurality of coding units when an image decoding apparatus determines the plurality of coding units by splitting a current coding unit, according to an embodiment.

FIG. 7 is a diagram of an order of processing a plurality of coding units when an image decoding apparatus determines the plurality of coding units by splitting a current coding unit, according to an embodiment.

According to an embodiment, the image decoding apparatus 100 may determine second coding units 710a and 710b by splitting a first coding unit 700 in a vertical direction, determine second coding units 730a and 730b by splitting the first coding unit 700 in a horizontal direction, or determine second coding units 750a to 750d by splitting the first coding unit 700 in vertical and horizontal directions, based on split shape mode information.

Referring to FIG. 7, the image decoding apparatus 100 may determine to process the second coding units 710a and 710b, which are determined by splitting the first coding unit 700 in a vertical direction, in a horizontal direction order 710c. The image decoding apparatus 100 may determine to process the second coding units 730a and 730b, which are determined by splitting the first coding unit 700 in a horizontal direction, in a vertical direction order 730c. The image decoding apparatus 100 may determine to process the second coding units 750a to 750d, which are determined by splitting the first coding unit 700 in vertical and horizontal directions, in a certain order for processing coding units in a row and then processing coding units in a next row (e.g., in a raster scan order or Z-scan order 750e).

According to an embodiment, the image decoding apparatus 100 may recursively split coding units. Referring to FIG. 7, the image decoding apparatus 100 may determine the plurality of coding units 710a and 710b, 730a and 730b, or 750a to 750d by splitting the first coding unit 700, and recursively split each of the determined plurality of coding units 710a and 710b, 730a and 730b, or 750a to 750d. A splitting method of the plurality of coding units 710a and 710b, 730a and 730b, or 750a to 750d may correspond to a splitting method of the first coding unit 700. As such, each of the plurality of coding units 710a and 710b, 730a and 730b, or 750a to 750d may be independently split into a plurality of coding units. Referring to FIG. 7, the image decoding apparatus 100 may determine the second coding units 710a and 710b by splitting the first coding unit 700 in a vertical direction, and may determine to independently split or not to split each of the second coding units 710a and 710b.

According to an embodiment, the image decoding apparatus 100 may determine third coding units 720a and 720b by splitting the left second coding unit 710a in a horizontal direction, and may not split the right second coding unit 710b.

According to an embodiment, a processing order of coding units may be determined based on an operation of splitting a coding unit. In other words, a processing order of split coding units may be determined based on a processing order of coding units immediately before being split. The image decoding apparatus 100 may determine a processing order of the third coding units 720a and 720b determined by splitting the left second coding unit 710a, independently of the right second coding unit 710b. Because the third coding units 720a and 720b are determined by splitting the left second coding unit 710a in a horizontal direction, the third coding units 720a and 720b may be processed in a vertical direction order 720c. Because the left and right second coding units 710a and 710b are processed in the horizontal direction order 710c, the right second coding unit 710b may be processed after the third coding units 720a and 720b included in the left second coding unit 710a are processed in the vertical direction order 720c. An operation of determining a processing order of coding units based on a coding unit before being split is not limited to the above-described example, and various methods may be used to independently process coding units, which are split and determined to have various shapes, in a certain order.

Figure 8:
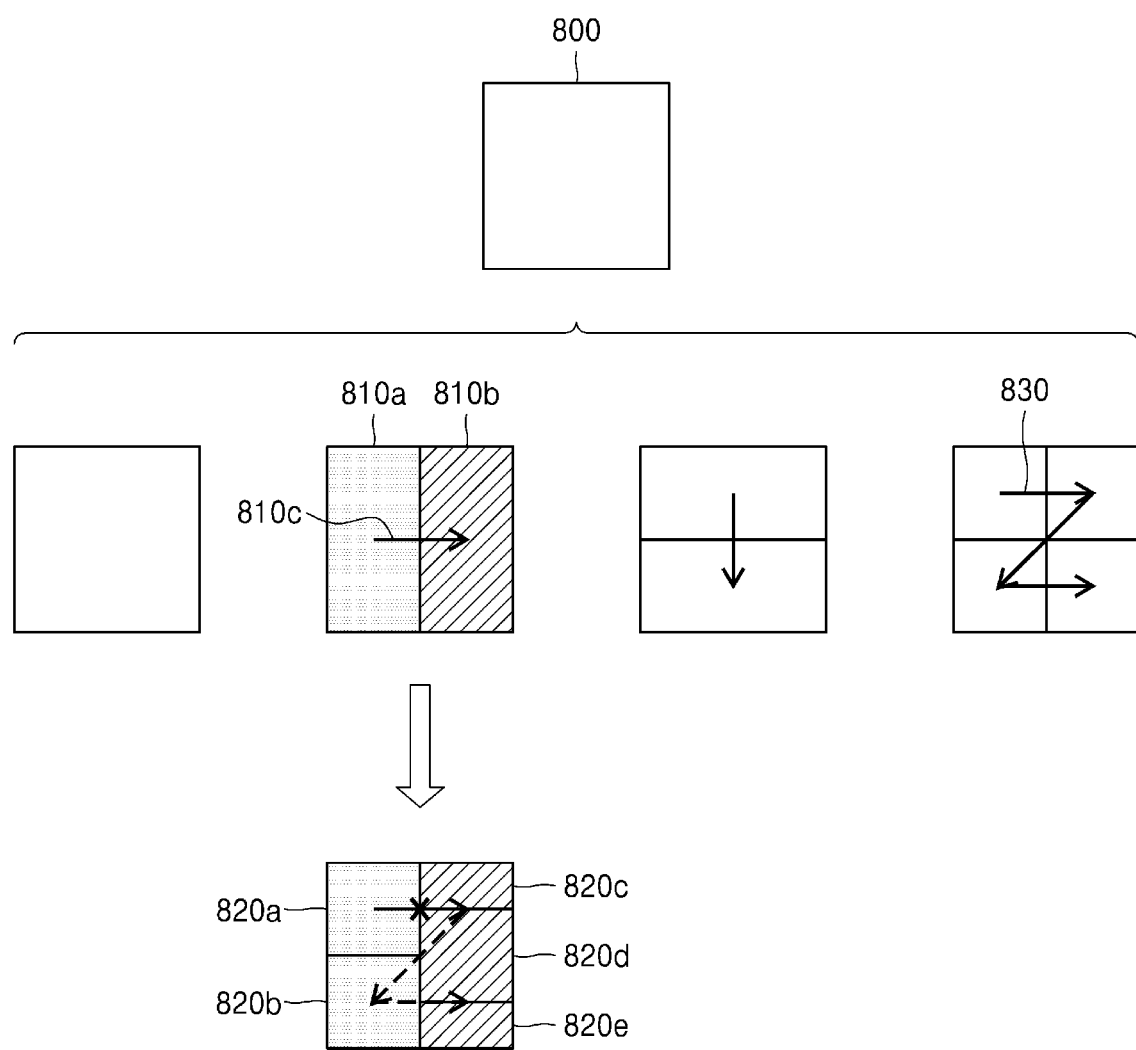
FIG. 8 is a diagram of a process by which an image decoding apparatus determines that a current coding unit is to be split into an odd number of coding units, when the coding units are not processable in a certain order, according to an embodiment.

FIG. 8 is a diagram of a process by which an image decoding apparatus determines that a current coding unit is to be split into an odd number of coding units, when the coding units are not processable in a certain order, according to an embodiment.

According to an embodiment, the image decoding apparatus 100 may determine that the current coding unit is split into an odd number of coding units, based on obtained split shape mode information. Referring to FIG. 8, a square first coding unit 800 may be split into non-square second coding units 810a and 810b, and the second coding units 810a and 810b may be independently split into third coding units 820a and 820b, and 820c to 820e. According to an embodiment, the image decoding apparatus 100 may determine the plurality of third coding units 820a and 820b by splitting the left second coding unit 810a in a horizontal direction, and may split the right second coding unit 810b into the odd number of third coding units 820c to 820e.

According to an embodiment, the image decoding apparatus 100 may determine whether any coding unit is split into an odd number of coding units, by determining whether the third coding units 820a and 820b, and 820c to 820e are processable in a certain order. Referring to FIG. 8, the image decoding apparatus 100 may determine the third coding units 820a and 820b, and 820c to 820e by recursively splitting the first coding unit 800. The image decoding apparatus 100 may determine whether any of the first coding unit 800, the second coding units 810a and 810b, and the third coding units 820a and 820b, and 820c to 820e are split into an odd number of coding units, based on at least one of block shape information and the split shape mode information. For example, the right second coding unit 810b among the second coding units 810a and 810b may be split into an odd number of third coding units 820c, 820d, and 820e. A processing order of a plurality of coding units included in the first coding unit 800 may be a certain order (e.g., a Z-scan order 830), and the image decoding apparatus 100 may determine whether the third coding units 820c, 820d, and 820e, which are determined by splitting the right second coding unit 810b into an odd number of coding units, satisfy a condition for processing in the certain order.

According to an embodiment, the image decoding apparatus 100 may determine whether the third coding units 820a and 820b, and 820c to 820e included in the first coding unit 800 satisfy the condition for processing in the certain order, and the condition relates to whether at least one of a width and height of the second coding units 810a and 810b is split in half along a boundary of the third coding units 820a and 820b, and 820c to 820e. For example, the third coding units 820a and 820b determined when the height of the left second coding unit 810a of the non-square shape is split in half may satisfy the condition. It may be determined that the third coding units 820c to 820e do not satisfy the condition because the boundaries of the third coding units 820c to 820e determined when the right second coding unit 810b is split into three coding units are unable to split the width or height of the right second coding unit 810b in half. When the condition is not satisfied as described above, the image decoding apparatus 100 may determine disconnection of a scan order, and may determine that the right second coding unit 810b is split into an odd number of coding units, based on a result of the determination. According to an embodiment, when a coding unit is split into an odd number of coding units, the image decoding apparatus 100 may put a certain restriction on a coding unit at a certain location from among the split coding units. The restriction or the certain location has been described above in relation to various embodiments, and thus detailed descriptions thereof will not be provided herein.

Figure 9:
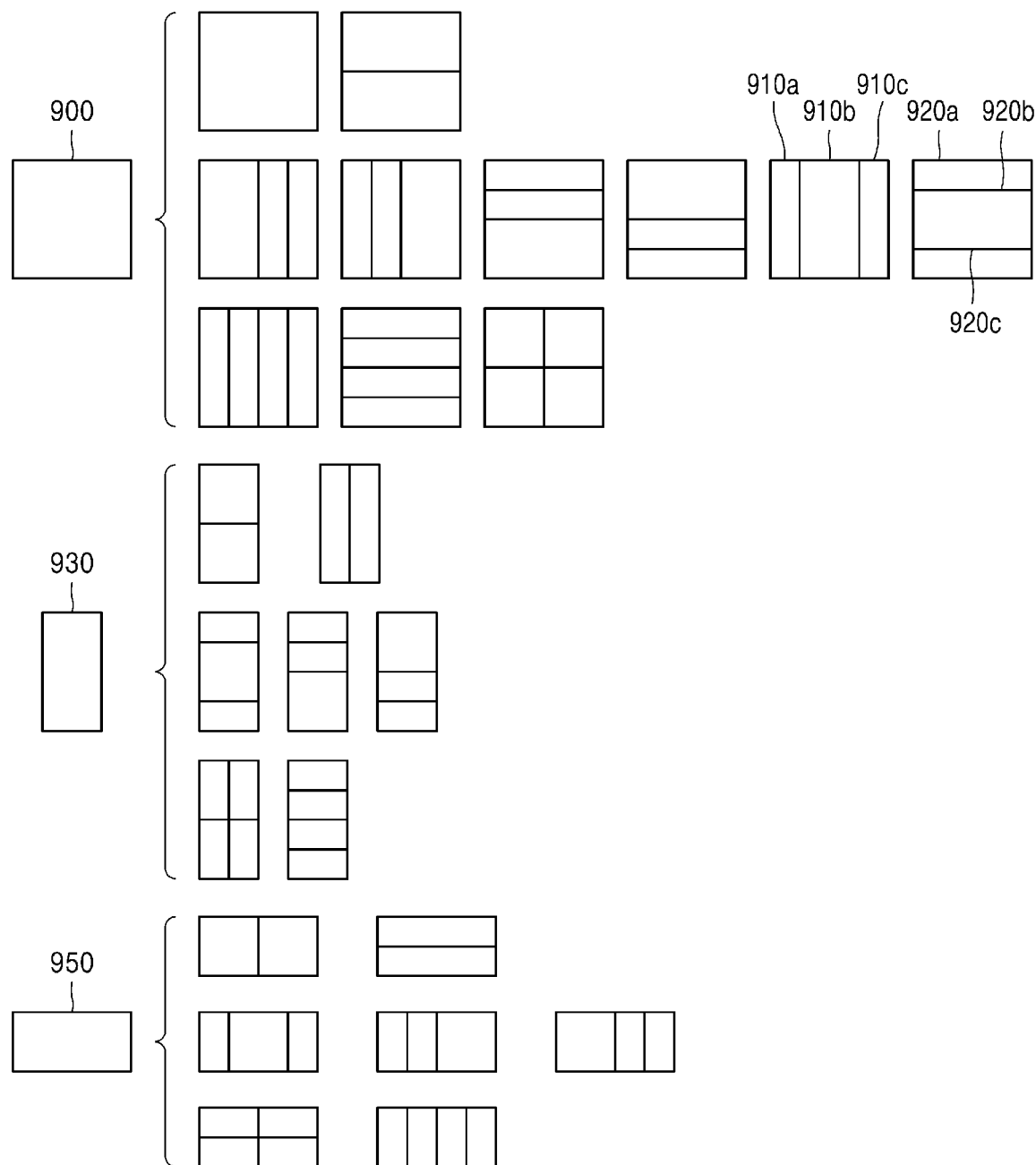
FIG. 9 is a diagram of a process by which an image decoding apparatus determines at least one coding unit by splitting a first coding unit, according to an embodiment.

FIG. 9 is a diagram of a process by which an image decoding apparatus determines at least one coding unit by splitting a first coding unit, according to an embodiment.

According to an embodiment, the image decoding apparatus 100 may split a first coding unit 900, based on split shape mode information, which is obtained through the receiver 110. The square first coding unit 900 may be split into four square coding units, or may be split into a plurality of non-square coding units. For example, referring to FIG. 9, when the split shape mode information indicates to split the first coding unit 900 into non-square coding units, the image decoding apparatus 100 may split the first coding unit 900 into a plurality of non-square coding units. In detail, when the split shape mode information indicates to determine an odd number of coding units by splitting the first coding unit 900 in a horizontal direction or a vertical direction, the image decoding apparatus 100 may split the square first coding unit 900 into an odd number of coding units, e.g., second coding units 910a, 910b, and 910c determined by splitting the square first coding unit 900 in a vertical direction or second coding units 920a, 920b, and 920c determined by splitting the square first coding unit 900 in a horizontal direction.

According to an embodiment, the image decoding apparatus 100 may determine whether the second coding units 910a, 910b, 910c, 920a, 920b, and 920c included in the first coding unit 900 satisfy a condition for processing in a certain order, and the condition relates to whether at least one of a width and height of the first coding unit 900 is split in half along a boundary of the second coding units 910a, 910b, 910c, 920a, 920b, and 920c. Referring to FIG. 9, because boundaries of the second coding units 910a, 910b, and 910c determined by splitting the square first coding unit 900 in a vertical direction do not split the width of the first coding unit 900 in half, it may be determined that the first coding unit 900 does not satisfy the condition for processing in the certain order. Also, because boundaries of the second coding units 920a, 920b, and 920c determined by splitting the square first coding unit 900 in a horizontal direction do not split the width of the first coding unit 900 in half, it may be determined that the first coding unit 900 does not satisfy the condition for processing in the certain order. When the condition is not satisfied as described above, the image decoding apparatus 100 may determine disconnection of a scan order, and may determine that the first coding unit 900 is split into an odd number of coding units, based on a result of the determination. According to an embodiment, when a coding unit is split into an odd number of coding units, the image decoding apparatus 100 may put a certain restriction on a coding unit at a certain location from among the split coding units. The restriction or the certain location has been described above in relation to various embodiments, and thus detailed descriptions thereof will not be provided herein.

According to an embodiment, the image decoding apparatus 100 may determine various-shaped coding units by splitting a first coding unit.

Referring to FIG. 9, the image decoding apparatus 100 may split the square first coding unit 900 or a non-square first coding unit 930 or 950 into various-shaped coding units.

Figure 10:
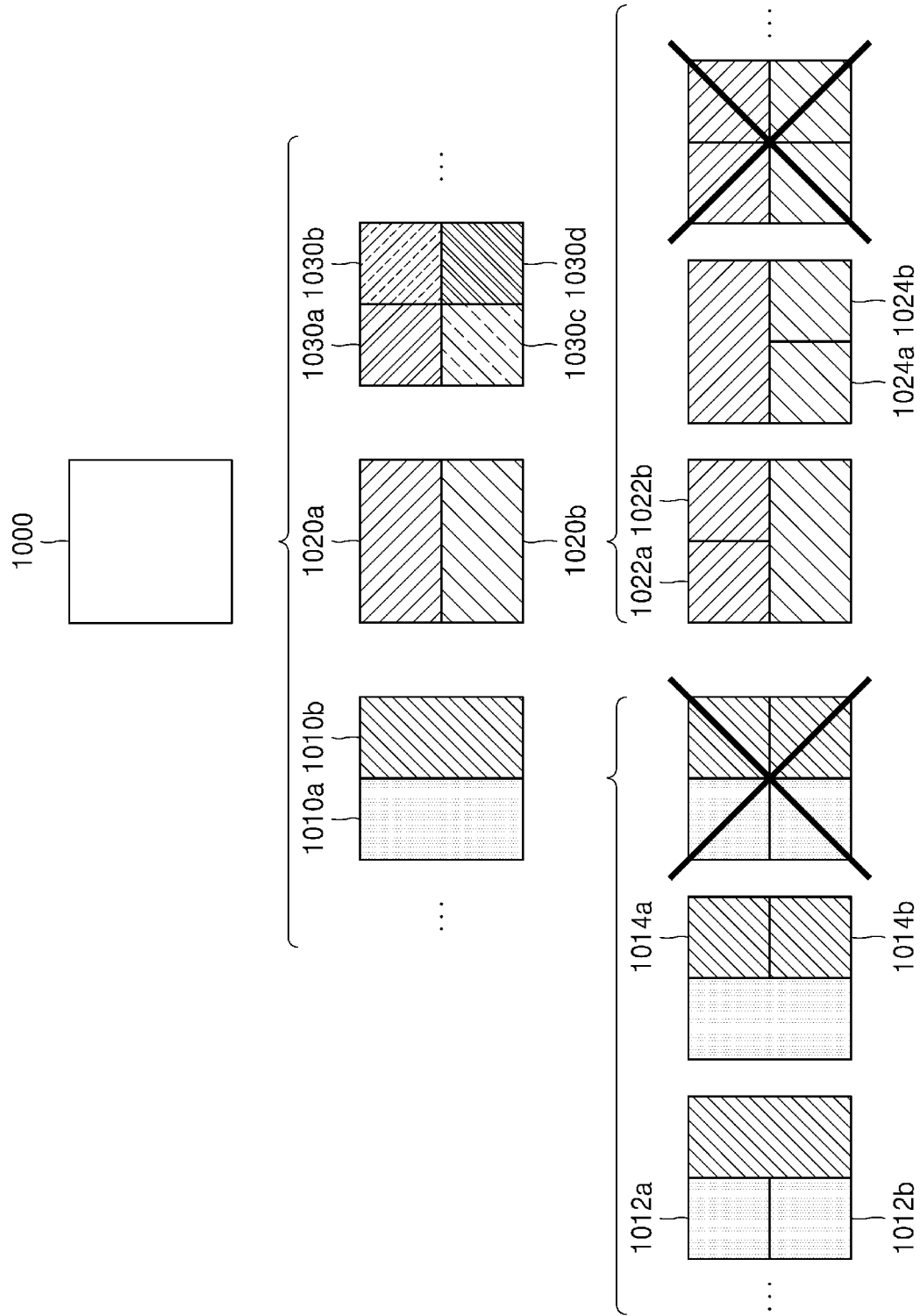
FIG. 10 is a diagram of a shape into which a second coding unit is splittable is restricted when the second coding unit having a non-square shape, which is determined when an image decoding apparatus splits a first coding unit, satisfies a certain condition, according to an embodiment.

FIG. 10 is a diagram of a shape into which a second coding unit is splittable is restricted when the second coding unit having a non-square shape, which is determined when an image decoding apparatus splits a first coding unit, satisfies a certain condition, according to an embodiment.

According to an embodiment, the image decoding apparatus 100 may determine to split a square first coding unit 1000 into non-square second coding units 1010a, and 1010b or 1020a and 1020b, based on split shape mode information, which is obtained by the receiver 110. The second coding units 1010a and 1010b or 1020a and 1020b may be independently split. As such, the image decoding apparatus 100 may determine to split or not to split each of the second coding units 1010a and 1010b or 1020a and 1020b into a plurality of coding units, based on the split shape mode information of each of the second coding units 1010a and 1010b or 1020a and 1020b. According to an embodiment, the image decoding apparatus 100 may determine third coding units 1012a and 1012b by splitting the non-square left second coding unit 1010a, which is determined by splitting the first coding unit 1000 in a vertical direction, in a horizontal direction. However, when the left second coding unit 1010a is split in a horizontal direction, the image decoding apparatus 100 may restrict the right second coding unit 1010b not to be split in a horizontal direction in which the left second coding unit 1010a is split. When third coding units 1014a and 1014b are determined by splitting the right second coding unit 1010b in the same direction, because the left and right second coding units 1010a and 1010b are independently split in a horizontal direction, the third coding units 1012a and 1012b or 1014a and 1014b may be determined. However, this case serves equally as a case in which the image decoding apparatus 100 splits the first coding unit 1000 into four square second coding units 1030a, 1030b, 1030c, and 1030d, based on the split shape mode information, and may be inefficient in terms of image decoding.

According to an embodiment, the image decoding apparatus 100 may determine third coding units 1022a and 1022b or 1024a and 1024b by splitting the non-square second coding unit 1020a or 1020b, which is determined by splitting the first coding unit 1000 in a horizontal direction, in a vertical direction. However, when a second coding unit (e.g., the upper second coding unit 1020a) is split in a vertical direction, for the above-described reason, the image decoding apparatus 100 may restrict the other second coding unit (e.g., the lower second coding unit 1020b) not to be split in a vertical direction in which the upper second coding unit 1020a is split.

Figure 11:
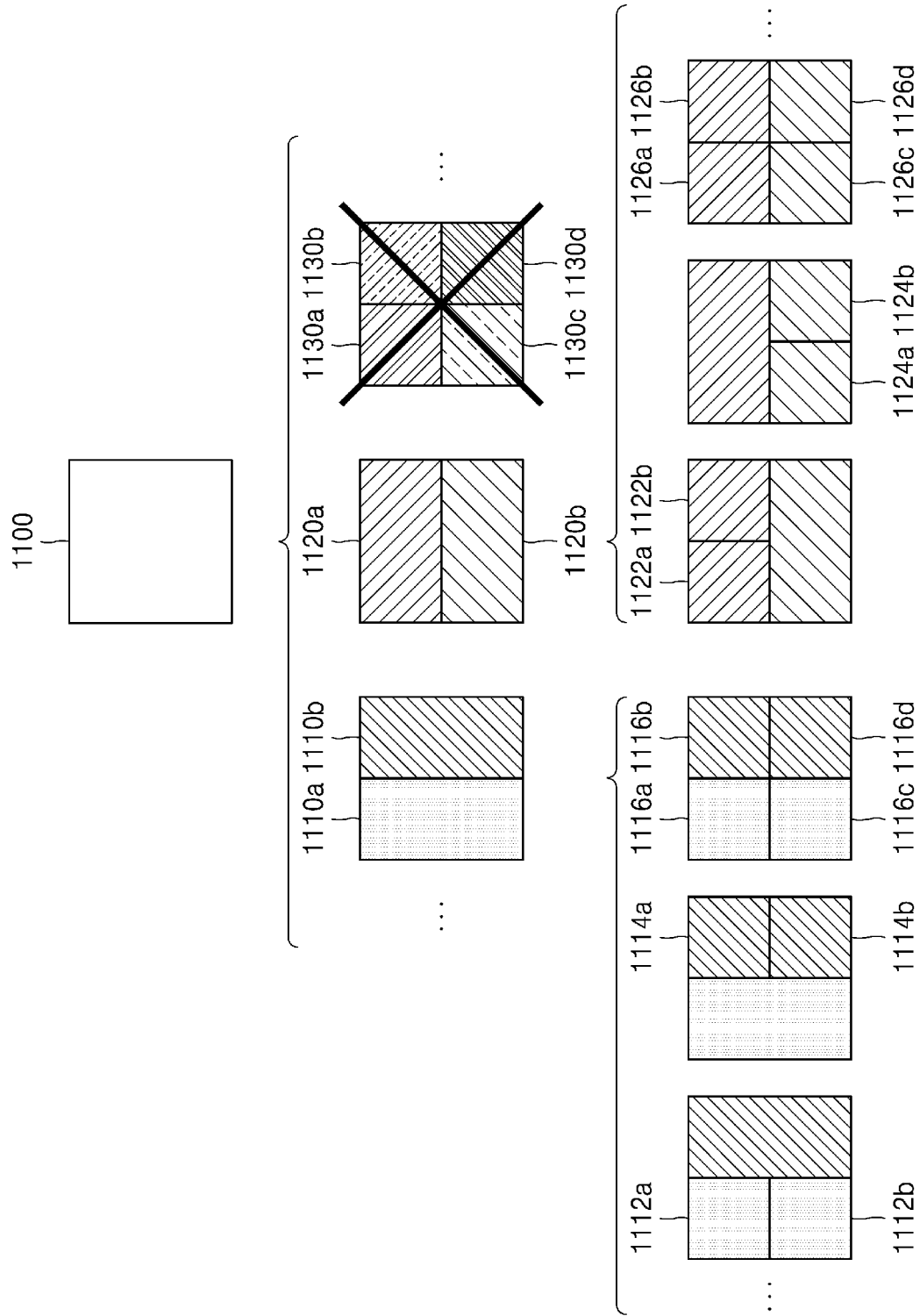
FIG. 11 is a diagram of a process by which an image decoding apparatus splits a square coding unit when split shape mode information is unable to indicate that the square coding unit is split into four square coding units, according to an embodiment.

FIG. 11 is a diagram of a process by which an image decoding apparatus splits a square coding unit when split shape mode information is unable to indicate that the square coding unit is split into four square coding units, according to an embodiment.

According to an embodiment, the image decoding apparatus 100 may determine second coding units 1110a and 1110b or 1120a and 1120b, etc. by splitting a first coding unit 1100, based on split shape mode information. The split shape mode information may include information on various methods of splitting a coding unit but, the information on various splitting methods may not include information for splitting a coding unit into four square coding units. According to such split shape mode information, the image decoding apparatus 100 may not split the square first coding unit 1100 into four square second coding units 1130a, 1130b, 1130c, and 1130d. The image decoding apparatus 100 may determine the non-square second coding units 1110a and 1110b or 1120a and 1120b, etc., based on the split shape mode information.

According to an embodiment, the image decoding apparatus 100 may independently split the non-square second coding units 1110a and 1110b or 1120a and 1120b, etc. Each of the second coding units 1110a and 1110b or 1120a and 1120b, etc. may be recursively split in a certain order, and this splitting method may correspond to a method of splitting the first coding unit 1100, based on the split shape mode information.

For example, the image decoding apparatus 100 may determine square third coding units 1112a and 1112b by splitting the left second coding unit 1110a in a horizontal direction, and may determine square third coding units 1114a and 1114b by splitting the right second coding unit 1110b in a horizontal direction. Furthermore, the image decoding apparatus 100 may determine square third coding units 1116a, 1116b, 1116c, and 1116d by splitting both the left and right second coding units 1110a and 1110b in a horizontal direction. In this case, coding units having the same shape as the four square second coding units 1130a, 1130b, 1130c, and 1130d split from the first coding unit 1100 may be determined.

In another example, the image decoding apparatus 100 may determine square third coding units 1122a and 1122b by splitting the upper second coding unit 1120a in a vertical direction, and may determine square third coding units 1124a and 1124b by splitting the lower second coding unit 1120b in a vertical direction. Furthermore, the image decoding apparatus 100 may determine square third coding units 1126a, 1126b, 1126c, and 1126d by splitting both the upper and lower second coding units 1120a and 1120b in a vertical direction. In this case, coding units having the same shape as the four square second coding units 1130*a*, 1130*b*, 1130*c*, and 1130*d* split from the first coding unit 1100 may be determined.

Figure 12:
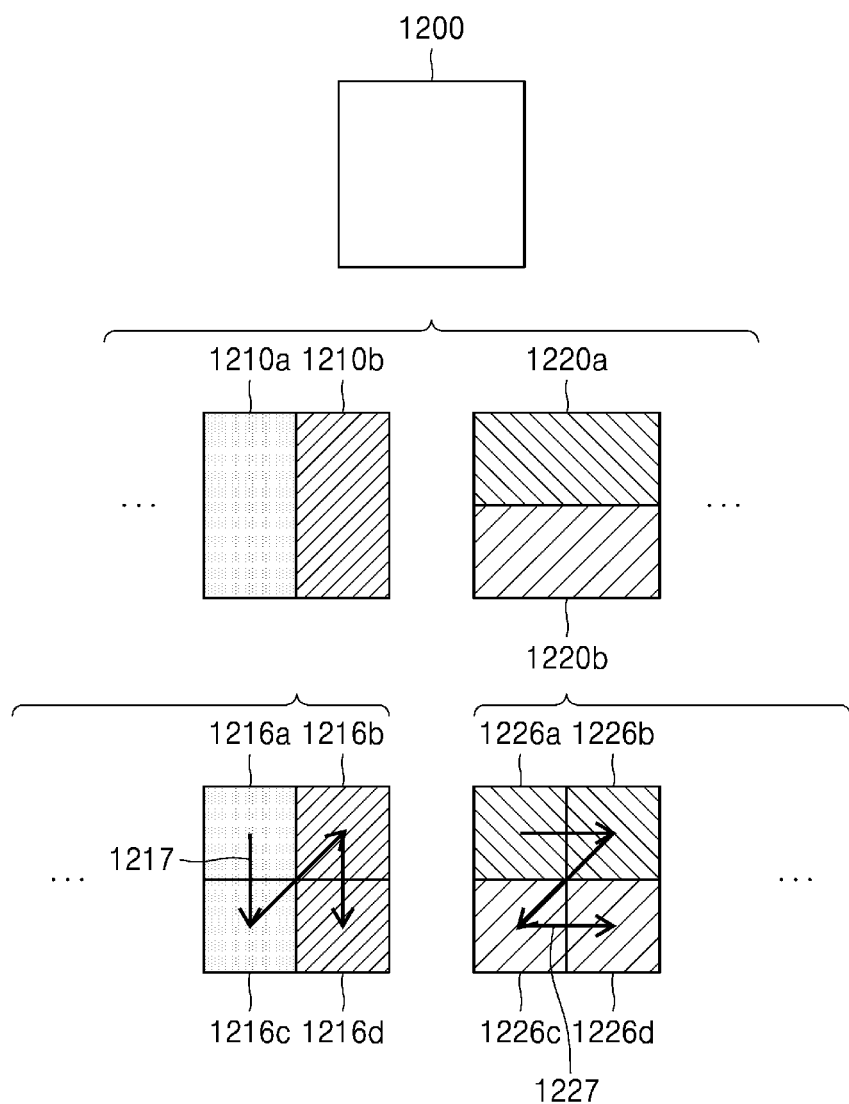
FIG. 12 is a diagram of that a processing order between a plurality of coding units may be changed depending on a process of splitting a coding unit, according to an embodiment.

FIG. 12 is a diagram of that a processing order between a plurality of coding units may be changed depending on a process of splitting a coding unit, according to an embodiment.

According to an embodiment, the image decoding apparatus 100 may split a first coding unit 1200, based on split shape mode information. When a block shape is a square shape and the split shape mode information indicates to split the first coding unit 1200 in at least one of horizontal and vertical directions, the image decoding apparatus 100 may determine second coding units 1210*a* and 1210*b* or 1220*a* and 1220*b*, etc. by splitting the first coding unit 1200. Referring to FIG. 12, the non-square second coding units 1210*a* and 1210*b* or 1220*a* and 1220*b* determined by splitting the first coding unit 1200 in only a horizontal direction or vertical direction may be independently split based on the split shape mode information of each coding unit. For example, the image decoding apparatus 100 may determine third coding units 1216*a*, 1216*b*, 1216*c*, and 1216*d* by splitting the second coding units 1210*a* and 1210*b*, which are generated by splitting the first coding unit 1200 in a vertical direction, in a horizontal direction, and may determine third coding units 1226*a*, 1226*b*, 1226*c*, and 1226*d* by splitting the second coding units 1220*a* and 1220*b*, which are generated by splitting the first coding unit 1200 in a horizontal direction, in a horizontal direction. An operation of splitting the second coding units 1210*a* and 1210*b* or 1220*a* and 1220*b* has been described above in relation to FIG. 11, and thus detailed descriptions thereof will not be provided herein.

According to an embodiment, the image decoding apparatus 100 may process coding units in a certain order. An operation of processing coding units in a certain order has been described above in relation to FIG. 7, and thus detailed descriptions thereof will not be provided herein. Referring to FIG. 12, the image decoding apparatus 100 may determine four square third coding units 1216*a*, 1216*b*, 1216*c*, and 1216*d*, and 1226*a*, 1226*b*, 1226*c*, and 1226*d* by splitting the square first coding unit 1200. According to an embodiment, the image decoding apparatus 100 may determine processing orders of the third coding units 1216*a*, 1216*b*, 1216*c*, and 1216*d*, and 1226*a*, 1226*b*, 1226*c*, and 1226*d* based on a splitting method of the first coding unit 1200.

According to an embodiment, the image decoding apparatus 100 may determine the third coding units 1216*a*, 1216*b*, 1216*c*, and 1216*d* by splitting the second coding units 1210*a* and 1210*b* generated by splitting the first coding unit 1200 in a vertical direction, in a horizontal direction, and may process the third coding units 1216*a*, 1216*b*, 1216*c*, and 1216*d* in a processing order 1217 for initially processing the third coding units 1216*a* and 1216*c*, which are included in the left second coding unit 1210*a*, in a vertical direction and then processing the third coding unit 1216*b* and 1216*d*, which are included in the right second coding unit 1210*b*, in a vertical direction.

According to an embodiment, the image decoding apparatus 100 may determine the third coding units 1226*a*, 1226*b*, 1226*c*, and 1226*d* by splitting the second coding units 1220*a* and 1220*b* generated by splitting the first coding unit 1200 in a horizontal direction, in a vertical direction, and may process the third coding units 1226*a*, 1226*b*, 1226*c*, and 1226*d* in a processing order 1227 for initially processing the third coding units 1226*a* and 1226*b*, which are included in the upper second coding unit 1220*a*, in a horizontal direction and then processing the third coding unit 1226*c* and 1226*d*, which are included in the lower second coding unit 1220*b*, in a horizontal direction.

Referring to FIG. 12, the square third coding units 1216*a*, 1216*b*, 1216*c*, and 1216*d*, and 1226*a*, 1226*b*, 1226*c*, and 1226*d* may be determined by splitting the second coding units 1210*a* and 1210*b*, and 1220*a* and 1920*b*, respectively. Although the second coding units 1210*a* and 1210*b* are determined by splitting the first coding unit 1200 in a vertical direction differently from the second coding units 1220*a* and 1220*b* which are determined by splitting the first coding unit 1200 in a horizontal direction, the third coding units 1216*a*, 1216*b*, 1216*c*, and 1216*d*, and 1226*a*, 1226*b*, 1226*c*, and 1226*d* split therefrom eventually show same-shaped coding units split from the first coding unit 1200. As such, by recursively splitting a coding unit in different manners based on the split shape mode information, the image decoding apparatus 100 may process a plurality of coding units in different orders even when the coding units are eventually determined to be the same shape.

FIG. 13 is a diagram of a process of determining a depth of a coding unit when a shape and size of the coding unit change, when the coding unit is recursively split such that a plurality of coding units are determined, according to an embodiment.

According to an embodiment, the image decoding apparatus 100 may determine the depth of the coding unit, based on a certain criterion. For example, the certain criterion may be the length of a long side of the coding unit. When the length of a long side of a coding unit before being split is 2n times (n>0) the length of a long side of a split current coding unit, the image decoding apparatus 100 may determine that a depth of the current coding unit is increased from a depth of the coding unit before being split, by n. In the following description, a coding unit having an increased depth is expressed as a coding unit of a lower depth.

Referring to FIG. 13, according to an embodiment, the image decoding apparatus 100 may determine a second coding unit 1302 and a third coding unit 1304 of lower depths by splitting a square first coding unit 1300 based on block shape information indicating a square shape (e.g., the block shape information may be expressed as '0: SQUARE'). Assuming that a size of the square first coding unit 1300 is 2N×2N, the second coding unit 1302 determined by splitting a width and height of the first coding unit 1300 in ½ may have a size of N×N. Furthermore, the third coding unit 1304 determined by splitting a width and height of the second coding unit 1302 in ½ may have a size of N/2×N/2. In this case, a width and height of the third coding unit 1304 are ¼ times those of the first coding unit 1300. When a depth of the first coding unit 1300 is D, a depth of the second coding unit 1302, the width and height of which are ½ times those of the first coding unit 1300, may be D+1, and a depth of the third coding unit 1304, the width and height of which are ¼ times those of the first coding unit 1300, may be D+2.

According to an embodiment, the image decoding apparatus 100 may determine a second coding unit 1312 or 1322 and a third coding unit 1314 or 1324 of lower depths by splitting a non-square first coding unit 1310 or 1320 based on block shape information indicating a non-square shape (e.g., the block shape information may be expressed as '1: NS_VER' indicating a non-square shape, a height of which is longer than a width, or as '2: NS_HOR' indicating a non-square shape, a width of which is longer than a height).

The image decoding apparatus 100 may determine the second coding unit 1302, 1312, or 1322 by splitting at least one of a width and height of the first coding unit 1310 having a size of N×2N. That is, the image decoding apparatus 100 may determine the second coding unit 1302 having a size of N×N or the second coding unit 1322 having a size of N×N/2 by splitting the first coding unit 1310 in a horizontal direction, or may determine the second coding unit 1312 having a size of N/2×N by splitting the first coding unit 1310 in horizontal and vertical directions.

According to an embodiment, the image decoding apparatus 100 may determine the second coding unit 1302, 1312, or 1322 by splitting at least one of a width and height of the first coding unit 1320 having a size of 2N×N. That is, the image decoding apparatus 100 may determine the second coding unit 1302 having a size of N×N or the second coding unit 1312 having a size of N/2×N by splitting the first coding unit 1320 in a vertical direction, or may determine the second coding unit 1322 having a size of N×N/2 by splitting the first coding unit 1320 in horizontal and vertical directions.

According to an embodiment, the image decoding apparatus 100 may determine the third coding unit 1304, 1314, or 1324 by splitting at least one of a width and height of the second coding unit 1302 having a size of N×N. That is, the image decoding apparatus 100 may determine the third coding unit 1304 having a size of N/2×N/2, the third coding unit 1314 having a size of N/4×N/2, or the third coding unit 1324 having a size of N/2×N/4 by splitting the second coding unit 1302 in vertical and horizontal directions.

According to an embodiment, the image decoding apparatus 100 may determine the third coding unit 1304, 1314, or 1324 by splitting at least one of a width and height of the second coding unit 1312 having a size of N/2×N. That is, the image decoding apparatus 100 may determine the third coding unit 1304 having a size of N/2×N/2 or the third coding unit 1324 having a size of N/2×N/4 by splitting the second coding unit 1312 in a horizontal direction, or may determine the third coding unit 1314 having a size of N/4×N/2 by splitting the second coding unit 1312 in vertical and horizontal directions.

According to an embodiment, the image decoding apparatus 100 may determine the third coding unit 1304, 1314, or 1324 by splitting at least one of a width and height of the second coding unit 1322 having a size of N×N/2. That is, the image decoding apparatus 100 may determine the third coding unit 1304 having a size of N/2×N/2 or the third coding unit 1314 having a size of N/4×N/2 by splitting the second coding unit 1322 in a vertical direction, or may determine the third coding unit 1324 having a size of N/2×N/4 by splitting the second coding unit 1322 in vertical and horizontal directions.

According to an embodiment, the image decoding apparatus 100 may split the square coding unit 1300, 1302, or 1304 in a horizontal or vertical direction. For example, the image decoding apparatus 100 may determine the first coding unit 1310 having a size of N×2N by splitting the first coding unit 1300 having a size of 2N×2N in a vertical direction, or may determine the first coding unit 1320 having a size of 2N×N by splitting the first coding unit 1300 in a horizontal direction. According to an embodiment, when a depth is determined based on the length of the longest side of a coding unit, a depth of a coding unit determined by splitting the first coding unit 1300 having a size of 2N×2N in a horizontal or vertical direction may be the same as the depth of the first coding unit 1300.

According to an embodiment, a width and height of the third coding unit 1314 or 1324 may be ¼ times those of the first coding unit 1310 or 1320. When a depth of the first coding unit 1310 or 1320 is D, a depth of the second coding unit 1312 or 1322, the width and height of which are ½ times those of the first coding unit 1310 or 1320, may be D+1, and a depth of the third coding unit 1314 or 1324, the width and height of which are ¼ times those of the first coding unit 1310 or 1320, may be D+2.

Figure 14:
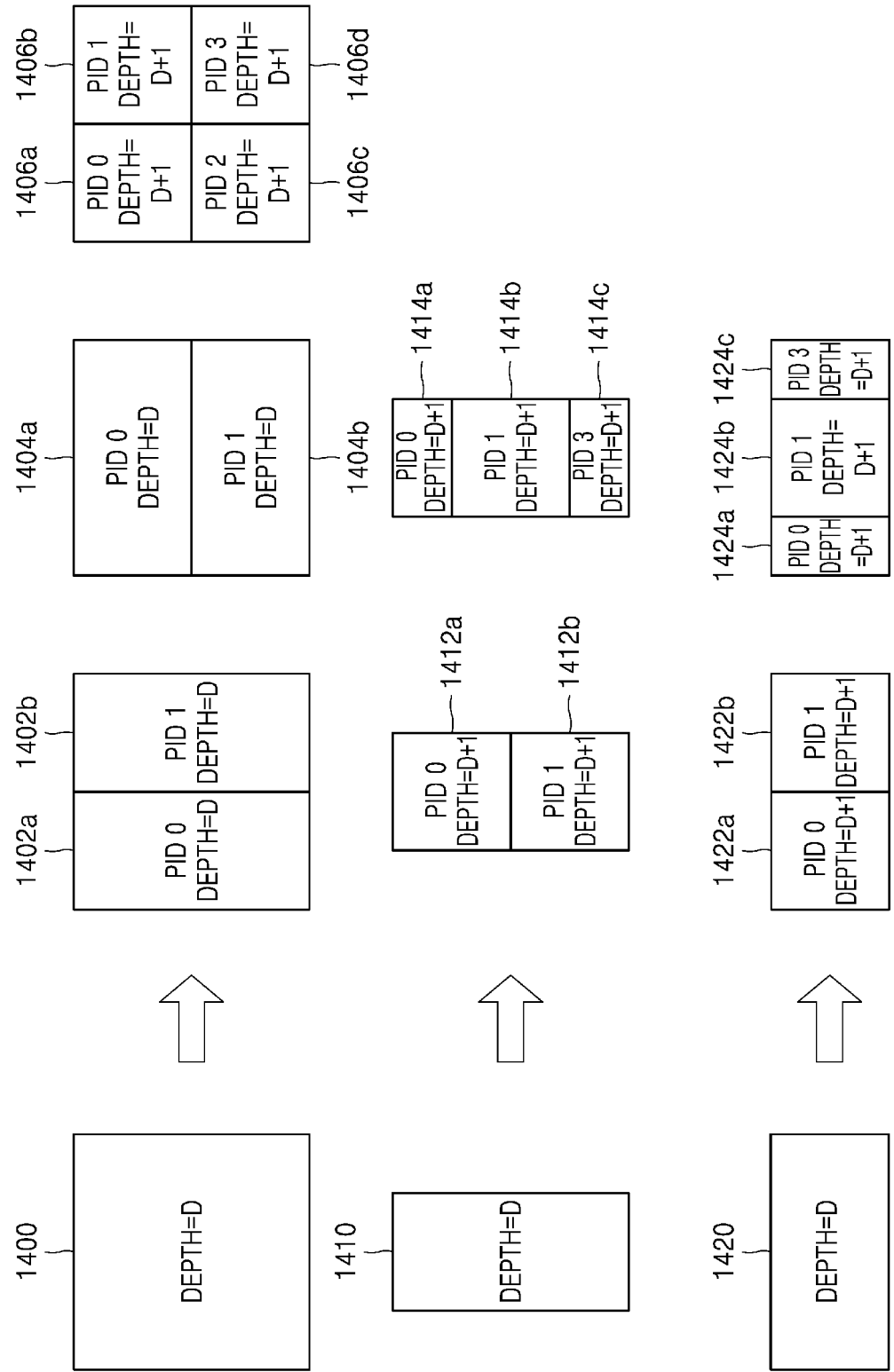
FIG. 14 is a diagram of depths that are determinable based on shapes and sizes of coding units, and part indexes (PIDs) for distinguishing the coding units, according to an embodiment.

FIG. 14 is a diagram of depths that are determinable based on shapes and sizes of coding units, and part indexes (PIDs) for distinguishing the coding units, according to an embodiment.

According to an embodiment, the image decoding apparatus 100 may determine various-shape second coding units by splitting a square first coding unit 1400. Referring to FIG. 14, the image decoding apparatus 100 may determine second coding units 1402a and 1402b, 1404a and 1404b, and 1406a, 1406b, 1406c, and 1406d by splitting the first coding unit 1400 in at least one of vertical and horizontal directions based on split shape mode information. That is, the image decoding apparatus 100 may determine the second coding units 1402a and 1402b, 1404a and 1404b, and 1406a, 1406b, 1406c, and 1406d, based on the split shape mode information of the first coding unit 1400.

According to an embodiment, a depth of the second coding units 1402a and 1402b, 1404a and 1404b, and 1406a, 1406b, 1406c, and 1406d, which are determined based on the split shape mode information of the square first coding unit 1400, may be determined based on the length of a long side thereof. For example, because the length of a side of the square first coding unit 1400 equals the length of a long side of the non-square second coding units 1402a and 1402b, and 1404a and 1404b, the first coding unit 2100 and the non-square second coding units 1402a and 1402b, and 1404a and 1404b may have the same depth, e.g., D. However, when the image decoding apparatus 100 splits the first coding unit 1400 into the four square second coding units 1406a, 1406b, 1406c, and 1406d based on the split shape mode information, because the length of a side of the square second coding units 1406a, 1406b, 1406c, and 1406d is ½ times the length of a side of the first coding unit 1400, a depth of the second coding units 1406a, 1406b, 1406c, and 1406d may be D+1 which is deeper than the depth D of the first coding unit 1400 by 1.

According to an embodiment, the image decoding apparatus 100 may determine a plurality of second coding units 1412a and 1412b, and 1414a, 1414b, and 1414c by splitting a first coding unit 1410, a height of which is longer than a width, in a horizontal direction based on the split shape mode information. According to an embodiment, the image decoding apparatus 100 may determine a plurality of second coding units 1422a and 1422b, and 1424a, 1424b, and 1424c by splitting a first coding unit 1420, a width of which is longer than a height, in a vertical direction based on the split shape mode information.

According to an embodiment, a depth of the second coding units 1412a and 1412b, and 1414a, 1414b, and 1414c, or 1422a and 1422b, and 1424a, 1424b, and 1424c, which are determined based on the split shape mode information of the non-square first coding unit 1410 or 1420, may be determined based on the length of a long side thereof. For example, because the length of a side of the square second coding units 1412a and 1412b is ½ times the length of a long side of the first coding unit 1410 having a non-square shape, a height of which is longer than a width, a depth of the square second coding units 1412a and 1412b is D+1 which is deeper than the depth D of the non-square first coding unit 1410 by 1.

Furthermore, the image decoding apparatus 100 may split the non-square first coding unit 1410 into an odd number of second coding units 1414a, 1414b, and 1414c based on the split shape mode information. The odd number of second coding units 1414a, 1414b, and 1414c may include the non-square second coding units 1414a and 1414c and the square second coding unit 1414b. In this case, because the length of a long side of the non-square second coding units 1414a and 1414c and the length of a side of the square second coding unit 1414b are ½ times the length of a long side of the first coding unit 1410, a depth of the second coding units 1414a, 1414b, and 1414c may be D+1 which is deeper than the depth D of the non-square first coding unit 1410 by 1. The image decoding apparatus 100 may determine depths of coding units split from the first coding unit 1420 having a non-square shape, a width of which is longer than a height, by using the above-described method of determining depths of coding units split from the first coding unit 1410.

According to an embodiment, the image decoding apparatus 100 may determine PIDs for identifying split coding units, based on a size ratio between the coding units when an odd number of split coding units do not have equal sizes. Referring to FIG. 14, the coding unit 1414b of a center location among the odd number of split coding units 1414a, 1414b, and 1414c may have a width equal to that of the other coding units 1414a and 1414c and a height which is two times that of the other coding units 1414a and 1414c. That is, in this case, the coding unit 1414b at the center location may include two of the other coding unit 1414a or 1414c. Accordingly, when a PID of the coding unit 1414b at the center location is 1 based on a scan order, a PID of the coding unit 1414c located next to the coding unit 1414b may be increased by 2 and thus may be 3. That is, discontinuity in PIDs may be present. According to an embodiment, the image decoding apparatus 100 may determine whether an odd number of split coding units do not have equal sizes, based on whether discontinuity is present in PIDs for identifying the split coding units.

According to an embodiment, the image decoding apparatus 100 may determine whether to use a specific splitting method, based on PIDs for identifying a plurality of coding units determined by splitting a current coding unit. Referring to FIG. 14, the image decoding apparatus 100 may determine an even number of coding units 1412a and 1412b or an odd number of coding units 1414a, 1414b, and 1414c by splitting the first coding unit 1410 having a rectangular shape, a height of which is longer than a width. The image decoding apparatus 100 may use PIDs indicating respective coding units so as to identify respective coding units. According to an embodiment, the PID may be obtained from a sample of a certain location of each coding unit (e.g., an upper left sample).

According to an embodiment, the image decoding apparatus 100 may determine a coding unit at a certain location from among the split coding units, by using the PIDs for distinguishing the coding units. According to an embodiment, when the split shape mode information of the first coding unit 1410 having a rectangular shape, a height of which is longer than a width, indicates to split a coding unit into three coding units, the image decoding apparatus 100 may split the first coding unit 1410 into three coding units 1414a, 1414b, and 1414c. The image decoding apparatus 100 may assign a PID to each of the three coding units 1414a, 1414b, and 1414c. The image decoding apparatus 100 may compare PIDs of an odd number of split coding units to determine a coding unit at a center location from among the coding units. The image decoding apparatus 100 may determine the coding unit 1414b having a PID corresponding to a middle value among the PIDs of the coding units, as the coding unit at the center location from among the coding units determined by splitting the first coding unit 1410. According to an embodiment, the image decoding apparatus 100 may determine PIDs for distinguishing split coding units, based on a size ratio between the coding units when the split coding units do not have equal sizes. Referring to FIG. 14, the coding unit 1414b generated by splitting the first coding unit 1410 may have a width equal to that of the other coding units 1414a and 1414c and a height which is two times that of the other coding units 1414a and 1414c. In this case, when the PID of the coding unit 1414b at the center location is 1, the PID of the coding unit 1414c located next to the coding unit 1414b may be increased by 2 and thus may be 3. When the PID is not uniformly increased as described above, the image decoding apparatus 100 may determine that a coding unit is split into a plurality of coding units including a coding unit having a size different from that of the other coding units. According to an embodiment, when the split shape mode information indicates to split a coding unit into an odd number of coding units, the image decoding apparatus 100 may split a current coding unit in such a manner that a coding unit of a certain location among an odd number of coding units (e.g., a coding unit of a center location) has a size different from that of the other coding units. In this case, the image decoding apparatus 100 may determine the coding unit of the center location, which has a different size, by using PIDs of the coding units. However, the PIDs and the size or location of the coding unit of the certain location are not limited to the above-described examples, and various PIDs and various locations and sizes of coding units may be used.

According to an embodiment, the image decoding apparatus 100 may use a certain data unit where a coding unit starts to be recursively split.

Figure 15:
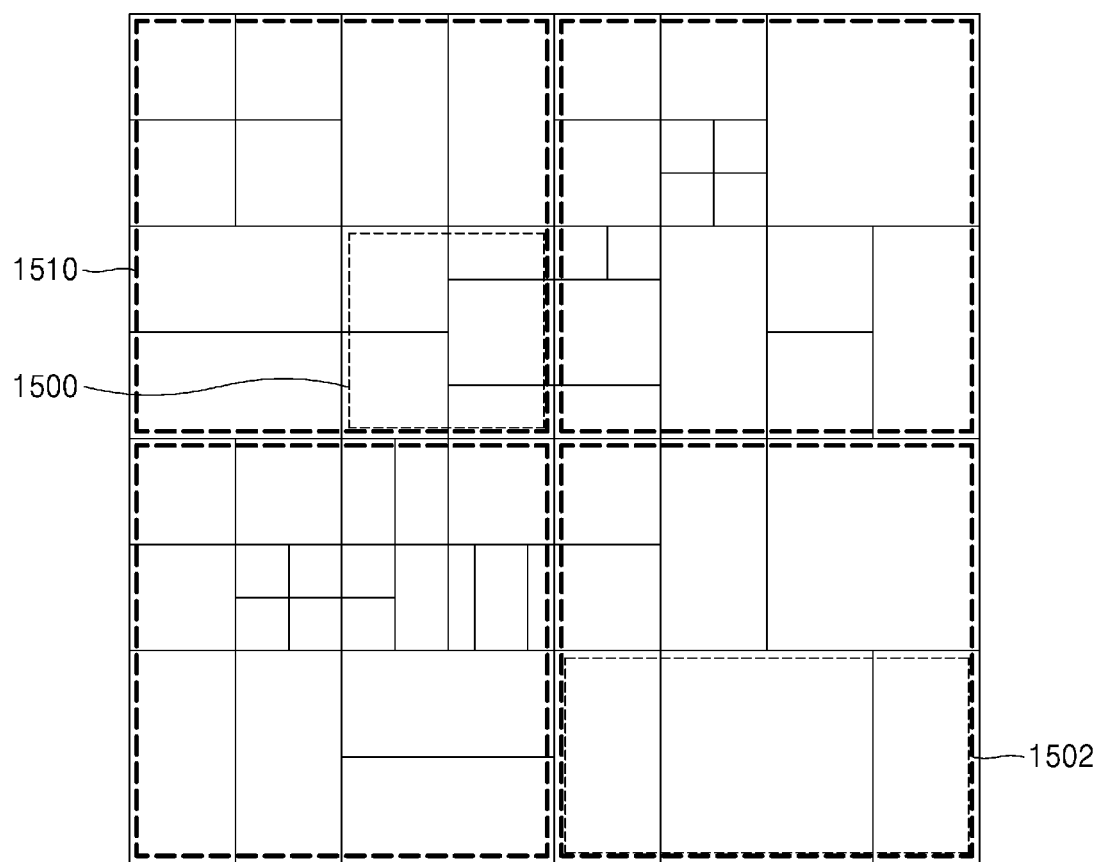
FIG. 15 is a diagram of that a plurality of coding units are determined based on a plurality of certain data units included in a picture, according to an embodiment.

FIG. 15 is a diagram of that a plurality of coding units are determined based on a plurality of certain data units included in a picture, according to an embodiment.

According to an embodiment, a certain data unit may be defined as a data unit where a coding unit starts to be recursively split by using split shape mode information. That is, the certain data unit may correspond to a coding unit of an uppermost depth, which is used to determine a plurality of coding units split from a current picture. In the following descriptions, for convenience of description, the certain data unit is referred to as a reference data unit.

According to an embodiment, the reference data unit may have a certain size and a certain shape. According to an embodiment, the reference data unit may include M×N samples. Herein, M and N may be equal to each other, and may be integers expressed as powers of 2. That is, the reference data unit may have a square or non-square shape, and may be split into an integer number of coding units.

According to an embodiment, the image decoding apparatus 100 may split the current picture into a plurality of reference data units. According to an embodiment, the image decoding apparatus 100 may split the plurality of reference data units, which are split from the current picture, by using the split shape mode information of each reference data unit. The operation of splitting the reference data unit may correspond to a splitting operation using a quad-tree structure.

According to an embodiment, the image decoding apparatus 100 may previously determine a minimum size allowed for the reference data units included in the current picture. Accordingly, the image decoding apparatus 100 may determine various reference data units having sizes equal to or greater than the minimum size, and may determine one or more coding units by using the split shape mode information with reference to the determined reference data unit.

Referring to FIG. 15, the image decoding apparatus 100 may use a square reference coding unit 1500 or a non-square reference coding unit 1502. According to an embodiment, the shape and size of reference coding units may be determined based on various data units capable of including one or more reference coding units (e.g., sequences, pictures, slices, slice segments, tiles, tile groups, largest coding units, or the like).

According to an embodiment, the receiver 110 of the image decoding apparatus 100 may obtain, from a bitstream, at least one of reference coding unit shape information and reference coding unit size information with respect to each of the various data units. An operation of splitting the square reference coding unit 1500 into one or more coding units has been described above in relation to the operation of splitting the current coding unit 300 of FIG. 3, and an operation of splitting the non-square reference coding unit 1502 into one or more coding units has been described above in relation to the operation of splitting the current coding unit 400 or 450 of FIG. 4. Thus, detailed descriptions thereof will not be provided herein.

According to an embodiment, the image decoding apparatus 100 may use a PID for identifying the size and shape of reference coding units, to determine the size and shape of reference coding units according to some data units previously determined based on a certain condition. That is, the receiver 110 may obtain, from the bitstream, only the PID for identifying the size and shape of reference coding units with respect to each slice, slice segment, tile, tile group, or largest coding unit which is a data unit satisfying a certain condition (e.g., a data unit having a size equal to or smaller than a slice) among the various data units (e.g., sequences, pictures, slices, slice segments, tiles, tile groups, largest coding units, or the like). The image decoding apparatus 100 may determine the size and shape of reference data units with respect to each data unit, which satisfies the certain condition, by using the PID. When the reference coding unit shape information and the reference coding unit size information are obtained and used from the bitstream according to each data unit having a relatively small size, efficiency of using the bitstream may not be high, and therefore, only the PID may be obtained and used instead of directly obtaining the reference coding unit shape information and the reference coding unit size information. In this case, at least one of the size and shape of reference coding units corresponding to the PID for identifying the size and shape of reference coding units may be previously determined. That is, the image decoding apparatus 100 may determine at least one of the size and shape of reference coding units included in a data unit serving as a unit for obtaining the PID, by selecting the previously determined at least one of the size and shape of reference coding units based on the PID.

According to an embodiment, the image decoding apparatus 100 may use one or more reference coding units included in a largest coding unit. That is, a largest coding unit split from a picture may include one or more reference coding units, and coding units may be determined by recursively splitting each reference coding unit. According to an embodiment, at least one of a width and height of the largest coding unit may be integer times at least one of the width and height of the reference coding units. According to an embodiment, the size of reference coding units may be obtained by splitting the largest coding unit n times based on a quad-tree structure. That is, the image decoding apparatus 100 may determine the reference coding units by splitting the largest coding unit n times based on a quad-tree structure, and may split the reference coding unit based on at least one of block shape information and split shape mode information according to various embodiments.

According to an embodiment, the image decoding apparatus 100 may obtain block shape information indicating the shape of a current coding unit or split shape mode information indicating a splitting method of the current coding unit, from the bitstream, and may use the obtained information. The split shape mode information may be included in the bitstream related to various data units. For example, the image decoding apparatus 100 may use the split shape mode information included in a sequence parameter set, a picture parameter set, a video parameter set, a slice header, a slice segment header, a tile header, or a tile group header. Furthermore, the image decoding apparatus 100 may obtain, from the bitstream, a syntax element corresponding to the block shape information or the split shape mode information according to each largest coding unit, each reference coding unit, or each processing block, and may use the obtained syntax element.

Hereinafter, a method of determining a split rule according to an embodiment of the present disclosure will be described in detail.

The image decoding apparatus 100 may determine a split rule of an image. The split rule may be pre-determined between the image decoding apparatus 100 and the image encoding apparatus 2200. The image decoding apparatus 100 may determine the split rule of the image, based on information obtained from a bitstream. The image decoding apparatus 100 may determine the split rule based on the information obtained from at least one of a sequence parameter set, a picture parameter set, a video parameter set, a slice header, a slice segment header, a tile header, or a tile group header. The image decoding apparatus 100 may determine the split rule differently according to frames, slices, tiles, temporal layers, largest coding units, or coding units.

The image decoding apparatus 100 may determine the split rule based on a block shape of a coding unit. The block shape may include a size, shape, a ratio of width and height, and a direction of the coding unit. The image decoding apparatus 100 may pre-determine to determine the split rule based on the block shape of the coding unit. However, an embodiment is not limited thereto. The image decoding apparatus 100 may determine the split rule of the image, based on information obtained from a received bitstream.

The shape of the coding unit may include a square and a non-square. When the lengths of the width and height of the coding unit are the same, the image decoding apparatus 100 may determine the shape of the coding unit to be a square. Also, when the lengths of the width and height of the coding unit are not the same, the image decoding apparatus 100 may determine the shape of the coding unit to be a non-square.

The size of the coding unit may include various sizes, such as 4×4, 8×4, 4×8, 8×8, 16×4, 16×8, . . . , and 256×256. The size of the coding unit may be classified based on the length of a long side of the coding unit, the length of a short side, or the area. The image decoding apparatus 100 may apply the same split rule to coding units classified as the same group. For example, the image decoding apparatus 100 may classify coding units having the same lengths of the long sides as having the same size. Also, the image decoding apparatus 100 may apply the same split rule to coding units having the same lengths of long sides.

The ratio of the width and height of the coding unit may include 1:2, 2:1, 1:4, 4:1, 1:8, 8:1, 1:16, 16:1, 32:1, 1:32, or the like. Also, the direction of the coding unit may include a horizontal direction and a vertical direction. The horizontal direction may indicate a case in which the length of the width of the coding unit is longer than the length of the height thereof. The vertical direction may indicate a case in which the length of the width of the coding unit is shorter than the length of the height thereof.

The image decoding apparatus 100 may adaptively determine the split rule based on the size of the coding unit. The image decoding apparatus 100 may differently determine an allowable split shape mode based on the size of the coding unit. For example, the image decoding apparatus 100 may determine whether splitting is allowed based on the size of the coding unit. The image decoding apparatus 100 may determine a split direction according to the size of the coding unit. The image decoding apparatus 100 may determine an allowable split type according to the size of the coding unit.

The split rule determined based on the size of the coding unit may be a split rule pre-determined in the image decoding apparatus 100. Also, the image decoding apparatus 100 may determine the split rule based on the information obtained from the bitstream.

The image decoding apparatus 100 may adaptively determine the split rule based on a location of the coding unit. The image decoding apparatus 100 may adaptively determine the split rule based on the location of the coding unit in the image.

Also, the image decoding apparatus 100 may determine the split rule such that coding units generated via different splitting paths do not have the same block shape. However, an embodiment is not limited thereto, and the coding units generated via different splitting paths have the same block shape. The coding units generated via the different splitting paths may have different decoding process orders. Because the decoding process orders have been described above with reference to FIG. 12, detailed descriptions thereof are not provided again.

Figure 16:
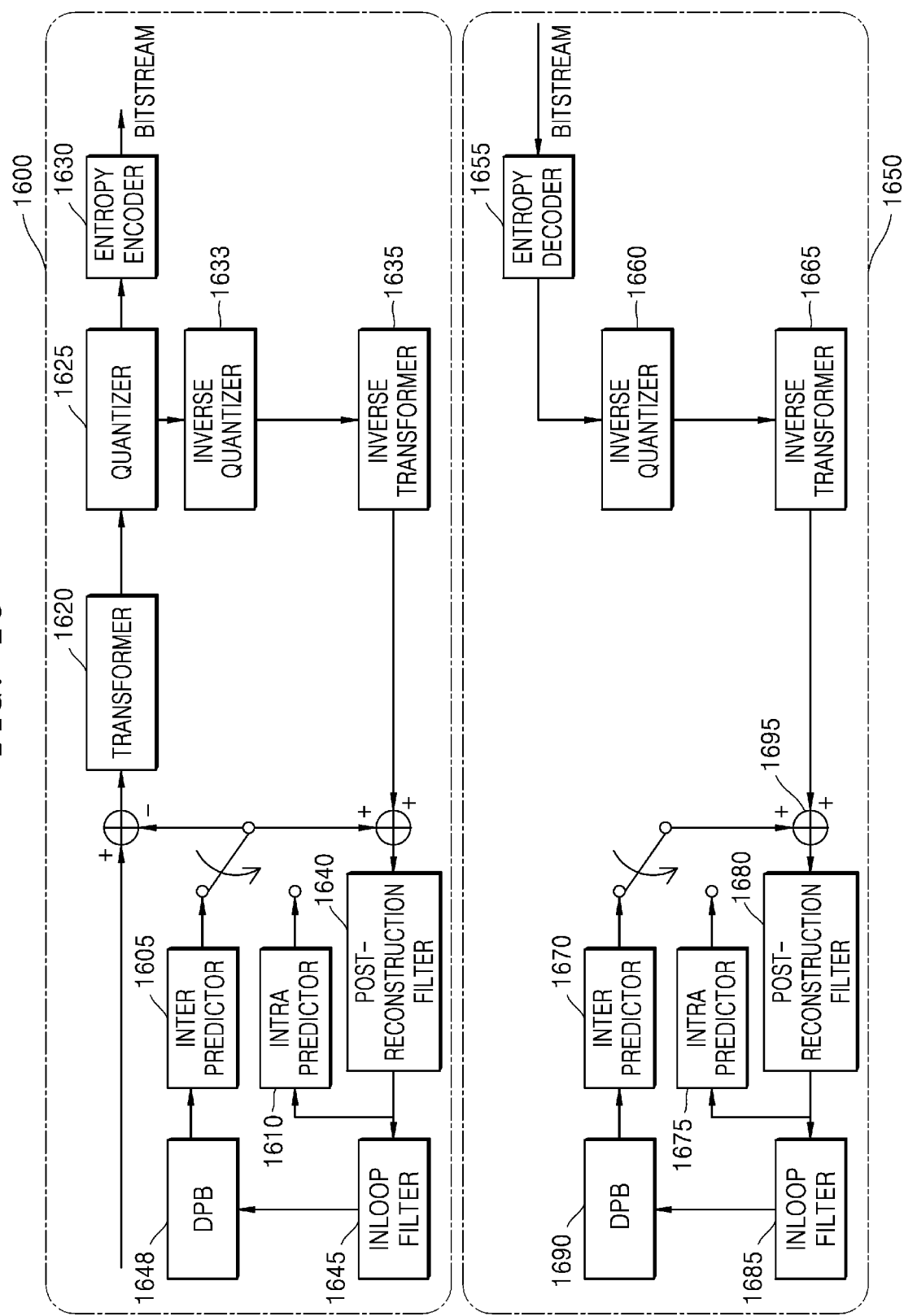
FIG. 16 is a block diagram of an image encoding and decoding system.

FIG. 16 is a block diagram of an image encoding and decoding system.

An encoder 1610 of an image encoding and decoding system 1600 transmits an encoded bitstream of an image, and a decoder 1650 receives and decodes the bitstream and outputs a reconstructed image. The decoder 1650 may have a configuration similar to that of the image decoding apparatus 100.

In the encoder 1610, when a prediction mode of a current block is an inter prediction mode, an inter predictor 1605 generates motion information of the current block indicating reference blocks of a reference picture temporally adjacent to a current picture. The inter predictor 1605 may generate prediction samples of the current block by using samples of the reference blocks. An intra predictor 1610 may determine intra prediction information indicating a direction in which neighboring samples similar to the current block are located or a method of determining prediction samples, so that the prediction samples of the current block are determined by using neighboring samples spatially adjacent to the current block. The inter predictor 1605 may determine reference samples to be used for prediction of the current block, from among previously reconstructed samples stored in a decoded picture buffer (DPB) 1648.

A transformer 1620 outputs transform coefficients, by performing transformation on residual sample values obtained by subtracting the prediction samples generated by the inter predictor 1605 or the intra predictor 1610 from an original sample of the current block. A quantizer 1625 outputs quantized transform coefficients by quantizing the transform coefficients output from the transformer 1620. An entropy encoder 1630 may output a bitstream by encoding the quantized transform coefficients into residual syntax elements including a level value.

An inverse quantizer 1633 and an inverse transformer 1635 may inverse quantize and inverse transformation the quantized transform coefficients output from the quantizer 1625 and may generate residual sample values again.

An adder 1615 outputs a reconstructed sample value obtained by adding the residual sample values to prediction sample values. A post-reconstruction filter 1640 may perform post-reconstruction filtering on reconstructed samples, and reconstructed sample values updated through the post-reconstruction filtering may be used as reference sample values for intra prediction to be performed by the intra predictor 1610. The post-reconstruction filter 1640 may perform Hadamard transform domain filtering or bilateral filtering on the reconstructed sample values.

An inloop filter 1645 may perform at least one of deblocking filtering and adaptive loop filtering on the reconstructed samples updated through the post-reconstruction filtering. The reconstructed sample values updated through filtering of the inloop filter 1645 may be stored in a DPB 1648, and may be used as reference sample values for inter prediction to be performed by the inter predictor 1605.

An entropy decoder 1655 of the decoder 1650 may perform entropy decoding on a received bitstream and may parse residual syntax elements including a level value. The entropy decoder 1655 may reconstruct quantized transform coefficients from the residual syntax elements. An inverse quantizer 1660 may output transform coefficients by performing inverse quantization on the quantized transform coefficients, and an inverse transformer 1665 may output residual sample values by performing inverse transformation on the transform coefficients.

An inter predictor 1670 of the decoder 1650 may determine a reference picture temporally adjacent to a current picture by using motion information of a current block parsed by the entropy decoder 1655, and may determine reference blocks in the reference picture. The inter predictor 1670 may determine prediction samples of the current block by using samples of the reference blocks. An intra predictor 1675 of the decoder 1650 may determine reference samples spatially adjacent to the current block by using intra prediction information by using the motion information of the current block parsed by the entropy decoder 1655, and may determine prediction samples of the current block by using determined neighboring samples. The inter predictor 1670 may determine reference samples to be used for prediction of the current block, from among previously reconstructed samples stored in a DPB 1690.

An adder 1695 of the decoder 1650 outputs a reconstructed sample value obtained by adding the residual sample values to prediction sample values. A post-reconstruction filter 1680 of the decoder 1650 may perform Hadamard transform domain filtering or bilateral filtering on reconstructed sample values. Reconstructed sample values updated through filtering of the post-reconstruction filter 1680 may be used as reference sample values for intra prediction to be performed by the intra predictor 1675.

An inloop filter 1685 of the decoder 1650 may perform at least one of deblocking filtering and adaptive loop filtering on the reconstructed samples updated through the post-reconstruction filtering. The reconstructed sample values updated through filtering of the inloop filter 1685 may be stored in the DPB 1690, and may be used as reference sample values for inter prediction to be performed by the inter predictor 1670.

A video encoding method and decoding method, and a video encoding apparatus and decoding apparatus according to an embodiment propose a method of performing affine model-based prediction, based on a data unit determined by the video encoding apparatus and video decoding apparatus described above with reference to FIGS. 1 through 16. Hereinafter, a video encoding method and apparatus or a video decoding method and apparatus for performing affine model-based inter-prediction according to an embodiment disclosed in this specification will be described in detail with reference to FIGS. 17 through 40.

Hereinafter, the term "availability of a block" refers to whether the block is already encoded or decoded and information of the block is obtainable. In detail, when a current block is already encoded in an encoding process, a neighboring block may be encoded by using encoding information of the current block, and thus the current block may be marked as available. When a current block is not encoded, the current block may be marked as unavailable. Likewise, when a current block is already decoded in a decoding process, because a neighboring block may be decoded by using encoding information of the current block, the current block may be marked as available. When the current block is not decoded, the current block may be marked as unavailable.

Hereinafter, the term "availability of motion information of a block" refers to whether motion prediction (prediction other than prediction according to an intra mode or an intra block copy mode) is performed on the block and motion information (a motion vector, a prediction direction (L0-pred, L1-pred or Bi-pred), and a reference picture index) of the block is obtainable. In detail, when motion prediction is already performed on a current block in an encoding process and there is motion information of the current block, motion prediction of a neighboring block may be performed by using the motion information of the current block, and thus the motion information of the current block may be marked as available. When motion prediction is not performed on a current block in an encoding process, motion information of the current block may be marked as unavailable. Likewise, when motion prediction is already performed on a current block in a decoding process and there is motion information of the current block, motion prediction of a neighboring block may be performed by using the motion information of the current block, and thus the motion information of the current block may be marked as available. When motion prediction is not performed on a current block in a decoding process, motion information of the current block may be marked as unavailable.

Hereinafter, the term "affine merge candidate" may correspond to control point vectors corresponding to a neighboring block of a current block or a block group. Because control point vectors are determined from a motion vector of a neighboring block or control point vectors are determined based on motion vectors of neighboring blocks belonging to a block group, each control point vector may correspond to the neighboring block or the block group. Accordingly, in the present specification, for convenience of description, the term "affine merge candidate" may correspond to control point vectors determined from a neighboring block or a block group, or may correspond to a neighboring block or a block group, and there is no difference in the meaning of the two expressions.

Figure 17:
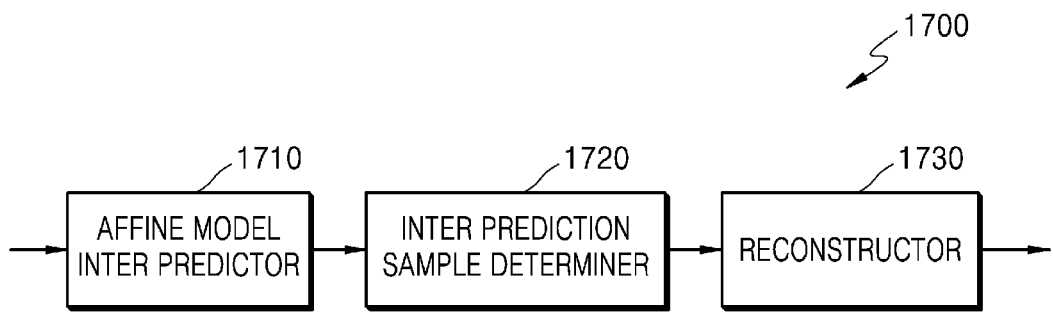
FIG. 17 is a diagram of a block diagram of a video decoding apparatus according to an embodiment.

FIG. 17 is a diagram of a block diagram of a video decoding apparatus according to an embodiment. First, a method of performing affine model-based inter prediction, via the video decoding apparatus 1700, is described in detail with reference to FIGS. 34 through 40.

Figure 34:
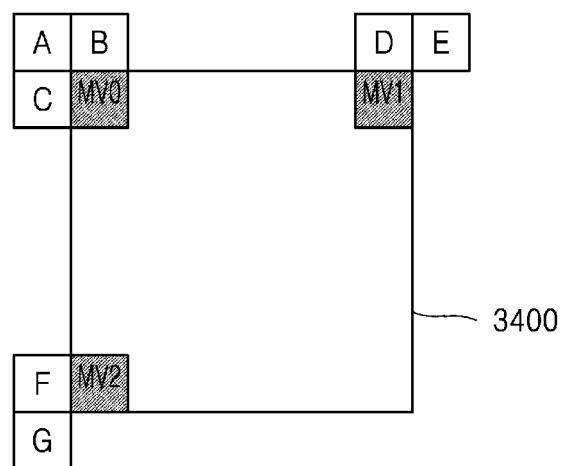
FIG. 34 is a diagram of a method of deriving a motion vector for determining an affine parameter, when a video decoding apparatus performs affine inter prediction based on a 4-parameter model or a 6-parameter model.

FIG. 34 is a diagram of a method of deriving a motion vector for determining an affine parameter, when a video decoding apparatus 1700 performs affine inter prediction based on a 4-parameter model or a 6-parameter model.

According to the previous video coding standards, motion compensation is performed by considering only parallel translation of a block, and thus, motions occurring in reality, such as zooming in/out, rotation, etc., may not be properly compensated for. To compensate for this shortcoming, in the video codec standards recently being standardized, an affine motion model using 4 or 6 parameters is applied to a prediction between screens. In the case of the affine inter prediction based on the 4-parameter model, a motion vector MV0 at an upper left point and a motion vector MV1 at an upper right point of a current block 3400 may be used. In the case of the affine inter prediction based on the 6-parameter model, the motion vector MV0 at the upper left point, the motion vector MV1 at the upper right point, and a motion vector MV2 at a lower left point of the current block 3400 may be used. The motion vector MV0 at the upper left point may be determined by using motion vectors of neighboring blocks A, B, and C that are adjacent to the upper left point of the current block 3400. The motion vector MV1 at the upper right point may be determined by using motion vectors of neighboring blocks D and E that are adjacent to the upper right point of the current block 3400. The motion vector MV2 at the lower left point may be determined by using motion vectors of neighboring blocks F and G that are adjacent to the lower left point of the current block 3400.

Figure 35:
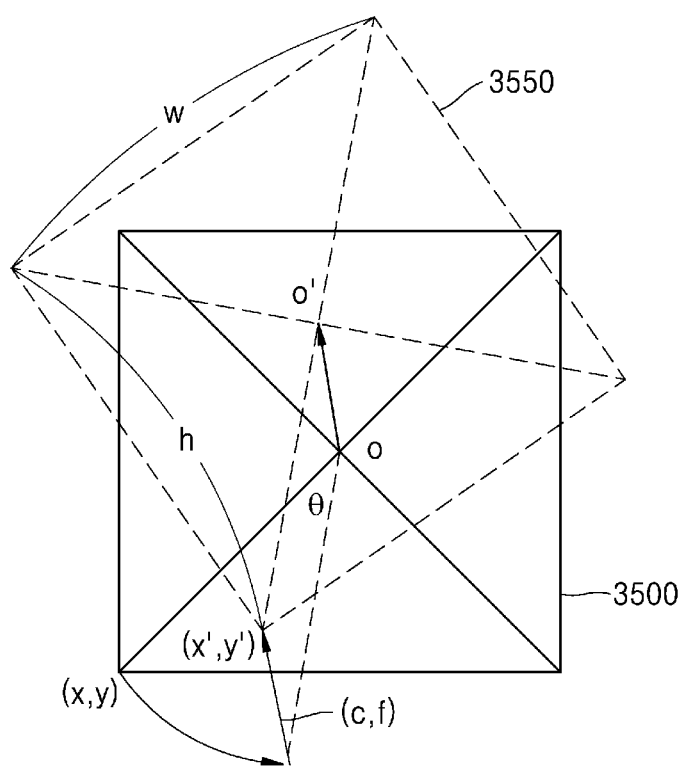
FIG. 35 is a diagram of a prediction block rotated and translated from a current block, when a video decoding apparatus performs the affine inter prediction based on the 4-parameter model.

FIG. 35 is a diagram of a prediction block rotated and translated from a current block, when the video decoding apparatus 1700 performs the affine inter prediction based on the 4-parameter model.

When a current block 3500 having a width w and a height h rotates by θ with respect to a central point of the current block 3500, and x and y coordinates of the central point of a current block 3500 are translated by (c, f), a block 3550 having the same size as the current block 3500 may be generated. The prediction block 3550 may be reconstructed from the current block 3500 through the affine inter prediction based on the 4-parameter model.

Figure 36:
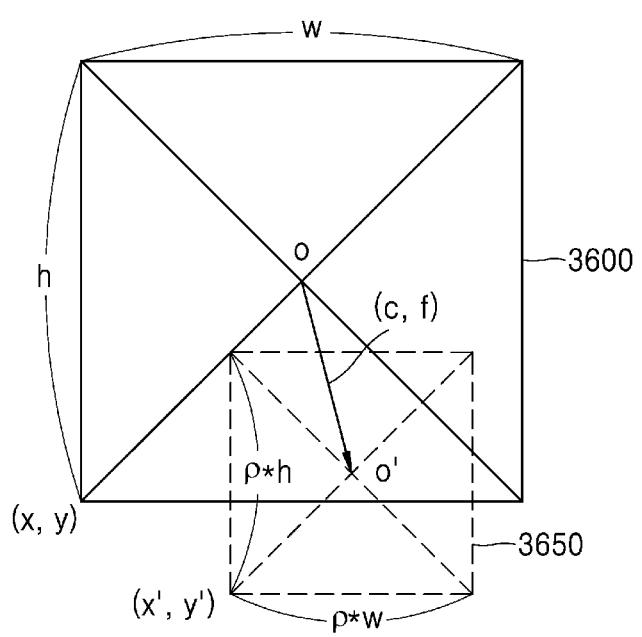
FIG. 36 is a diagram of a prediction block zoomed and translated from a current block, when a video decoding apparatus performs the affine inter prediction based on the 4-parameter model.

FIG. 36 is a diagram of a prediction block zoomed and translated from a current block, when the video decoding apparatus 1700 performs the affine inter prediction based on the 4-parameter model.

When a size of a current block 3600 having a width w and a height h is zoomed by ρ, and x and y coordinates of a central point of the current block 3600 are translated by (c, f), a block 3650 having a width ρ*w and a height ρ*h may be generated. A prediction block 3650 may be reconstructed from the current block 3600 through the affine inter prediction based on the 4-parameter model.

Figure 37:
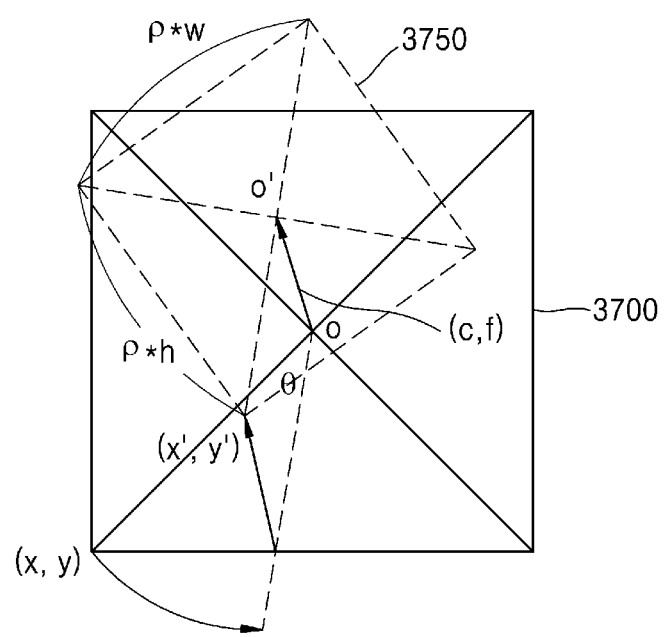
FIG. 37 is a diagram of a prediction block rotated, zoomed, and translated from a current block, when a video decoding apparatus performs the affine inter prediction based on the 4-parameter model.

FIG. 37 is a diagram of a prediction block rotated, zoomed, and translated from a current block, when the video decoding apparatus 1700 performs the affine inter prediction based on the 4-parameter model.

When a current block 3700 having a width w and a height h is rotated by θ with respect to a central point of the current block 3700, a size of the current block 3700 is zoomed by ρ, and x and y coordinates of a central point of the current block 3700 are translated by (c, f), a block 3750 having a width ρ*w and a height ρ*h may be generated. The prediction block 3750 may be reconstructed from the current block 3700 through the affine inter prediction based on the 4-parameter model.

In addition to the affine inter prediction based on the 4-parameter model illustrated in FIGS. 35 through 37, according to the affine inter prediction based on the 6-parameter model, a block sheared, rotated, zoomed, and translated from a current block may be predicted. For the affine inter prediction based on the 4-parameter or 6-parameter model, a control point motion vector with respect to a current block may be signaled through a bitstream.

Figure 38:
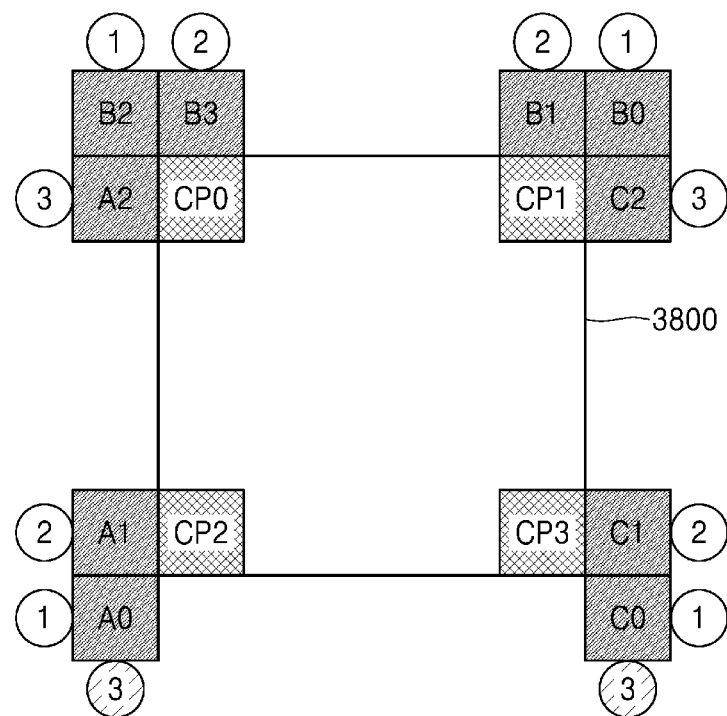
FIG. 38 is a diagram of a method of configuring an affine merge candidate list, when a video decoding apparatus performs inter prediction in an affine merge mode.

FIG. 38 is a diagram of a method of configuring an affine merge candidate list, when the video decoding apparatus 1700 performs inter prediction in an affine merge mode.

In the case where both of a width and a height of a block are equal to or greater than 8 pixels, an affine merge mode or an affine skip mode may be applied in a block level. By signaling an affine flag through a coding unit syntax, it may be indicated whether or not the affine merge mode is used. A merge candidate index having a maximum value of 4 may be signaled in the affine merge mode, and a motion information candidate indicated by the merge candidate index in the affine merge candidate list may be used as a prediction motion vector for a current block 3800.

When a 4-parameter or 6-parameter model-based candidate is used, the affine merge candidate list of the current block may be configured by using motion information of neighboring blocks. In particular, when a coding order is LR_01, that is, a right block of the current block 3800 is already decoded, motion vectors of neighboring blocks may be included in the affine merge candidate list of the current block in this stated order of neighboring blocks C1, B3, B2, C0, and B0. When the coding order is not LR_01, that is, when a left block of the current block 3800 is already decoded, the motion vectors of the neighboring blocks may be included in the affine merge candidate list of the current block in this stated order of neighboring blocks A1, B1, B0, A0, and B2.

In order that the motion vectors of the neighboring blocks are included in the affine merge candidate list, the corresponding motion vectors have to be available. The merge candidate index indicates 0 through 4, and thus, the affine merge candidate list may include 5 candidates at most. When the number of pieces of motion information included in the affine merge candidate list in the order described above is less than 5, because motion information of the neighboring blocks C1, B3, B2, C0, and B0 is not available, a zero candidate may be included in the affine merge candidate list.

In addition to the affine inter prediction based on the 4- and 6-parameter models described above, a control point-based affine inter prediction may be performed. According to the control point-based affine inter prediction, a control point motion vector of the current block 3800 may be derived based on control point motion information of a neighboring block. Thus, a candidate based on a control point may be included in the affine merge candidate list.

In the case of the control point candidate based on the 6-parameter model, control point sets (CP0, CP1, CP2), (CP0, CP1, CP3), (CP0, CP2, CP3), and (CP1, CP2, CP3) may be included in the affine merge candidate list in this stated order. In the case of the control point candidate based on the 4-parameter model, control point sets (CP0, CP1) and (CP0, CP2) may be included in the affine merge candidate list in this stated order.

Control point motion information of each of the control points CP0, CP1, CP2, and CP3 may be derived by using control point motion information of neighboring blocks adjacent thereto. The availability of the motion information of the adjacent neighboring blocks may have to be identified for each control point. In the case of the control point CP0, after the availability of the motion information of the neighboring blocks is identified, in this stated order of the neighboring blocks B2, B3, and A2, the motion information of the control point CP0 may be obtained by using the motion information of the neighboring block, the availability of which is identified first. Similarly, for the control point CP1, the motion information may be used in this stated order of the neighboring blocks B0, B1, and C2. For the control point CP2, the motion information may be used in this stated order of the neighboring blocks A0 and A1 and a temporal candidate at a lower left end. For the control point CP3, the availability of the motion information may be identified and then used in this stated order of the neighboring blocks C0 and C1 and a temporal candidate at a lower right end.

A method of deriving the control point motion information of the control points CP0, CP1, CP2, and CP3 by using the control point motion information of the neighboring blocks is described in detail, hereinafter, with reference to FIG. 39.

Figure 39:
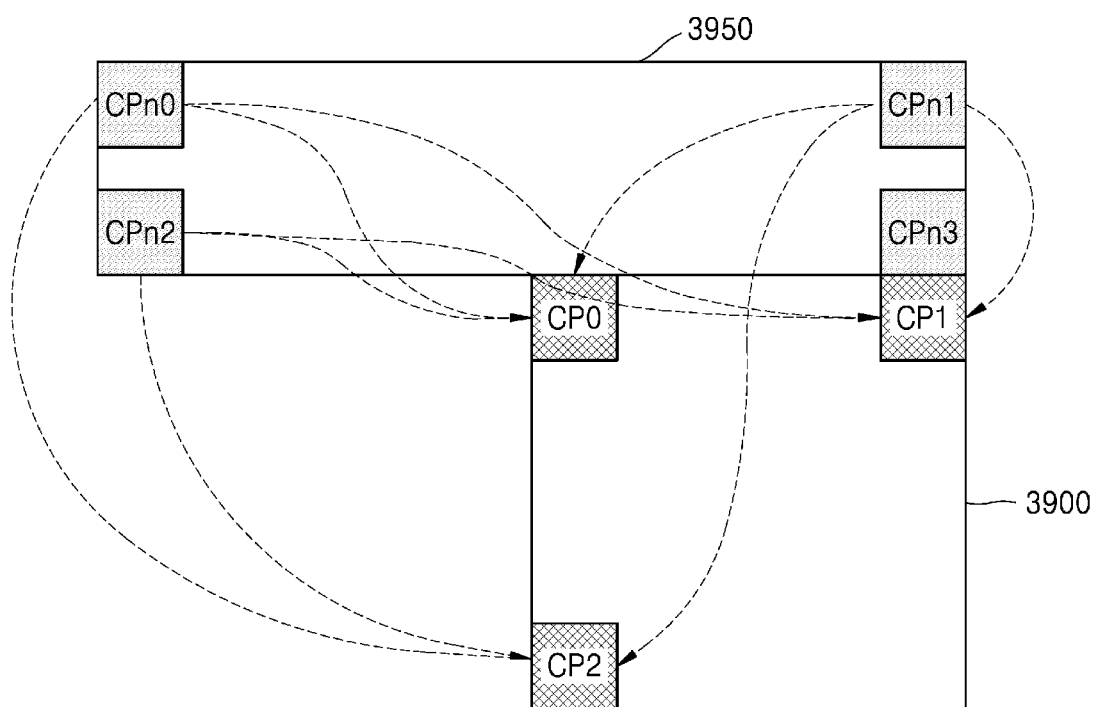
FIG. 39 is a diagram of a method, performed by a video decoding apparatus, of determining control point motion information of a current block by using control point motion information of a neighboring block.

FIG. 39 is a diagram of a method, performed by the video decoding apparatus 1700, of determining control point motion information of a current block by using control point motion information of a neighboring block.

The motion information of the control points CP0, CP1, and CP2 of a current block 3900 may be derived by using motion information of control points CPn0, CPn1, CPn2, and CPn3 of a neighboring block 3950 reconstructed in an affine prediction mode.

In detail, to derive the motion information of the control point CP0 of the current block 3900, the motion information of the control points CPn0, CPn1, and CPn2 of the neighboring block 3950 may be used. Similarly, to derive the motion information of the control point CP1 of the current block 3900, the motion information of the control points CPn0, CPn1, and CPn2 of the neighboring block 3950 may be used, and to derive the motion information of the control point CP2 of the current block 3900, the motion information of the control points CPn0, CPn1, and CPn2 of the neighboring block 3950 may be used.

Exceptionally, when a boundary line between the current block 3900 and the neighboring block 3950 is a boundary line of a largest coding unit, the motion information of the control points CP0, CP1, and CP2 of the current block 3900 may be derived by using the motion information of the control points CPn2 and CPn3 except for the motion information of the control points CPn0 and CPn1 of the neighboring block 3950. That is, to derive the motion information of the control point CP0 of the current block 3900, the motion information of the control points CPn2 and CPn3 of the neighboring block 3950 may be used, to derive the motion information of the control point CP1, the motion information of the control points CPn2 and CPn3 of the neighboring block 3950 may be used, and to derive the motion information of the control point CP2, the motion information of the control points CPn2 and CPn3 of the neighboring block 3950 may be used.

Figure 40:
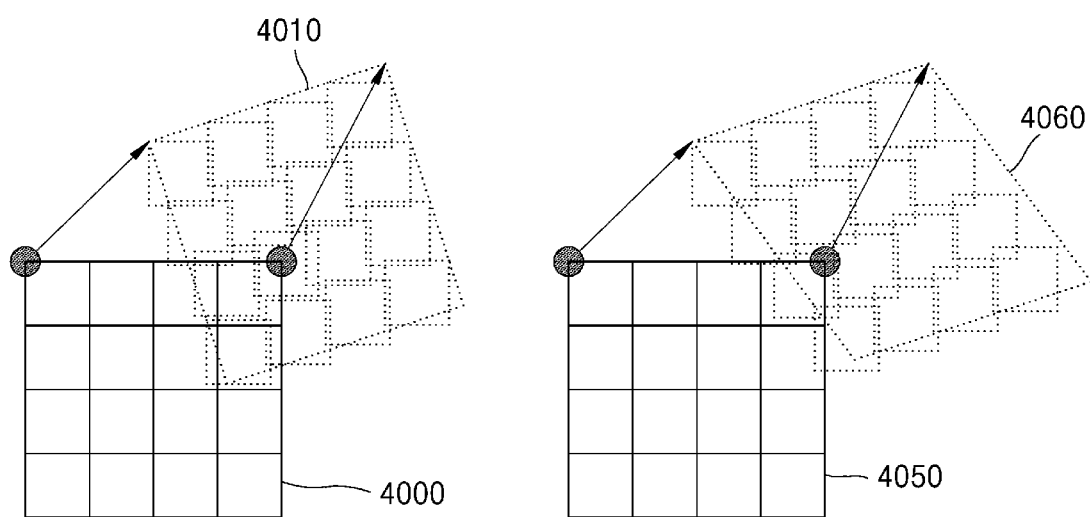
FIG. 40 is a diagram of a method of performing motion compensation in units of control point motion vectors and sub-blocks, when a video decoding apparatus performs affine inter prediction based on a 4-parameter model or a 6-parameter model.

FIG. 40 is a diagram of a method of performing motion compensation in units of control point motion vectors and sub-blocks, when the video decoding apparatus 1700 performs affine inter prediction based on a 4-parameter model or a 6-parameter model.

As a method of encoding and decoding a control point motion vector (CPMV), an affine mode may be divided into an advanced motion vector prediction (AMVP) mode and a merge mode. The CPMV may be a vector indicating affine motion models at an upper left end and an upper right end of a current block, as indicated by an arrow of FIG. 40. By taking into account the amount of calculations, motion compensation may not be performed in units of pixels of blocks 4000 and 4050, but may be performed in units of sub-blocks of the blocks 4000 and 4050. That is, with respect to the sub-blocks, it may correspond to general motion compensation. However, with respect to the blocks 4000 and 4050, affine motion compensation may be performed to generate each of prediction blocks 4010 and 4060.

Hereinafter, a method of determining a reference area for determining a prediction block of sub-blocks when the video decoding apparatus 1700 and a video encoding apparatus 1900 according to an embodiment perform affine inter prediction of a current block is provided with reference to FIGS. 17 through 33.

FIG. 17 is a diagram of a block diagram of a video decoding apparatus according to an embodiment.

The video decoding apparatus 1700 according to an embodiment may include an affine model inter predictor 1710, an inter prediction sample determiner 1720, and a reconstructor 1730. The video decoding apparatus 1700 may obtain a bitstream generated as a result of encoding an image, identify a location of blocks split from a picture based on information included in the bitstream, and decode blocks, such as a largest coding unit, a coding unit, etc.

The video decoding apparatus 1700 may include one or more data storages in which input and output data of the affine model inter predictor 1710, the inter prediction sample determiner 1720, and the reconstructor 1730 is stored. The video decoding apparatus 1700 may include a memory controller for controlling data input and output of the data storages.

The video decoding apparatus 1700 may perform an image decoding operation including prediction by connectively operating with an internal video decoding processor or an external video decoding processor so as to reconstruct an image via image decoding. The internal video decoding processor of the video decoding apparatus 1700 according to an embodiment may perform a basic image decoding operation in a manner that not only a separate processor but also an image decoding processing module included in a central processing apparatus or a graphic processing apparatus perform the basic image decoding operation.

The video decoding apparatus 1700 may be included in the image decoding apparatus 100. For example, the affine model inter predictor 1710, the inter-prediction sample determiner 1720, and the reconstructor 1730 may correspond to the decoder 120 of the image decoding apparatus 100. The video decoding apparatus 1700 may correspond to the decoder 1650 of the image encoding and decoding system described with reference to FIG. 16. For example, the affine model inter predictor 1710, the inter-prediction sample determiner 1720, and the reconstructor 1730 may correspond to the inter predictor 1670 of the decoder 1650.

The video decoding apparatus 1700 receives a bitstream generated as a result of image encoding. The bitstream may include information on a current picture. The picture may include one or more largest coding units. The video decoding apparatus 1700 may determine a location of a current block in the picture based on the information obtained from the bitstream. The current block that is a block generated by being split from the picture according to a tree structure may correspond to, for example, a largest coding unit or a coding unit. The video decoding apparatus 1700 may determine whether the current block is to be further split into sub-blocks of a lower depth, and may determine a tree structure of the current block. Compared to a current depth of the current block, the lower depth may be determined by increasing a depth by the number of times splitting is performed from the current block to the sub-blocks. Blocks located in tree leaves from among blocks constituting the tree structure included in the current picture are no longer split. Accordingly, the video decoding apparatus 1700 may perform inverse quantization, inverse transform, and prediction on one or more blocks that are no longer split to decode the blocks.

The video decoding apparatus 1700 may generate prediction samples of the current block by performing prediction on the current block. The video decoding apparatus 1700 may generate residual samples of the current block by performing inverse transformation on the current block. The reconstructor 1730 may generate reconstructed samples of the current block by using the prediction samples of the current block and the residual samples of the current block. The video decoding apparatus 1700 may reconstruct the current picture by reconstructing samples for each block.

For example, when a prediction mode of the current block is an intra mode, the video decoding apparatus 1700 may determine a reference sample from among samples of a spatial neighboring block located in an intra prediction direction by using intra prediction information of the current block, and may determine prediction samples corresponding to the current block by using the reference sample.

For example, when a prediction mode of the current block is an inter mode, the video decoding apparatus 1700 may reconstruct the current block by using a motion vector of the current block. The video decoding apparatus 1700 may determine a reference block in a reference picture by using the motion vector of the current block, and may determine prediction samples corresponding to the current block from reference samples included in the reference block. The video decoding apparatus 1700 may reconstruct transform coefficients by using a transform coefficient level obtained from a bitstream, and may reconstruct residual samples by performing inverse quantization and inverse transformation on the transform coefficients. The video decoding apparatus 1700 may determine reconstructed samples of the current block by combining the prediction samples corresponding to the current block and the residual samples.

When the current block is predicted in a skip mode, the video decoding apparatus 1700 does not need to parse transform coefficients of the current block from a bitstream. The video decoding apparatus 1700 may determine reconstructed samples of the current block by using prediction samples of the current block.

In particular, when affine model-based inter prediction is performed on the current block, the affine model inter predictor 1710 may be invoked. The video decoding apparatus 1700 according to an embodiment may obtain a merge mode flag indicating whether an inter prediction mode of the current block is a merge mode from a bitstream, and when the merge mode flag indicates the merge mode, the video decoding apparatus 1700 may obtain, from the bitstream, an affine flag indicating whether motion compensation based on an affine model is performed to generate a prediction sample of the current block. When the affine flag indicates that motion compensation based on the affine model is performed, the video decoding apparatus 1700 according to an embodiment may invoke the affine model inter predictor 1710, and the affine model inter predictor 1710 according to an embodiment may generate an affine merge candidate list including a control point-based affine merge candidate corresponding to control point motion vectors determined by using motion vectors of neighboring blocks included in a block group of representative neighboring blocks according to corners of the current block.

In detail, when inter prediction of a current block is performed in an affine merge mode, before a control point-based affine merge candidate is configured, the affine model inter predictor 1710 according to an embodiment may generate an affine merge candidate list including a model-based affine merge candidate. The model-based affine merge candidate is a merge candidate corresponding to control point motion vectors determined according to an affine motion vector of an available neighboring block from among neighboring blocks at a certain location adjacent to the current block. That is, neighboring blocks that are decoded before the current block may be determined as model-based affine merge candidates. When the motion information of the neighboring block is available, the model-based affine merge candidate corresponding to the neighboring block is also set as available. In contrast, when the motion information of the neighboring block is not available, the model-based affine merge candidate corresponding to the neighboring block is also set as unavailable. However, when the number of available model-based affine merge candidates is less than a certain number, the affine model inter predictor 1710 may determine a control point-based affine merge candidate corresponding to a group of representative neighboring blocks according to corners of the current block, and may add the control point-based affine merge candidate to an affine merge candidate list. The certain number may be a maximum number of affine merge candidates that are allowed to be included in the affine merge candidate list, and may be set to, for example, 5.

Accordingly, a model-based affine merge candidate may be a corresponding merge candidate derived from one neighboring block, and a control point-based affine merge candidate may be a merge candidate derived from a combination of affine models of two or more neighboring blocks. An available model-based affine merge candidate may be included in an affine merge candidate list of a current block, and when the number of valid affine merge candidates of the current block is less than a certain number, control point-based affine merge candidates as many as the insufficient number of affine merge candidates may be added to the affine merge candidate list.

The affine model inter predictor 1710 according to an embodiment may determine an affine motion vector of the current block by using control point motion vectors corresponding to a merge candidate selected from the affine merge candidate list. By using an affine merge index obtained from a bitstream, the affine model inter predictor 1710 may determine a control point motion vector of a merge candidate indicated by the affine merge index from the affine merge candidate list. The affine model inter predictor 1710 may determine an affine motion model parameter of the current block by using the control point motion vector, and may determine an affine motion vector of the current block by using the affine motion model parameter of the current block. The affine model inter predictor 1710 may obtain prediction samples of the current block, by using a reference sample indicated by the affine motion vector of the current block.

When a model-based affine merge candidate is selected from the affine merge candidate list, control point motion vectors corresponding to the model-based affine merge candidate may be determined by using an affine model of one neighboring block, and the affine model inter predictor 1710 according to an embodiment may determine an affine motion vector of the current block by using the control point motion vectors corresponding to the model-based affine merge candidate.

When a control point-based affine merge candidate is selected from the affine merge candidate list, control point motion vectors corresponding to the control point-based affine merge candidate may be determined by using control points of the current block or neighboring blocks included in a corresponding block group, and the affine model inter predictor 1710 according to an embodiment may determine an affine motion vector of the current block by using the control point motion vectors corresponding to the control point-based affine merge candidate.

In detail, when a model-based affine merge candidate is selected from the affine merge candidate list, control point motion vectors corresponding to control points of the current block may be determined by using a vertical change amount, a horizontal change amount, and a motion vector of one neighboring block corresponding to the model-based affine merge candidate. In more detail, a reference index, a prediction direction, and a control point motion vector corresponding to the model-based affine merge candidate may be respectively determined, by using a reference index, a prediction direction (L0-pred, L1-pred, or Bi-pred), and a motion vector of a neighboring block. A reference index, a prediction direction, and an affine motion vector of the current block may be respectively determined by using the reference index, the prediction direction, and the control point motion vector corresponding to the affine merge candidate.

In detail, when a control point-based affine merge candidate is selected from the affine merge candidate list, control point motion vectors may be determined by using motion vectors of neighboring blocks adjacent to control points of the current block, and an affine motion vector of the current block may be determined by using the control point motion vectors according to the selected affine merge candidate. In more detail, a reference index, a prediction direction, and a control point motion vector corresponding to an affine merge candidate may be respectively determined by using a reference index, a prediction direction, and a motion vector of representative neighboring blocks belonging to a block group. A reference index, a prediction direction, and an affine motion vector of the current block may be respectively determined by using the reference index, the prediction direction, and the control point motion vector corresponding to the affine merge candidate.

The video decoding apparatus 1700 according to an embodiment may change a coding order between laterally adjacent coding units according to a split unit coding order (SUCO) method. For example, the video decoding apparatus 1700 may obtain a coding order flag indicating a direction of a coding order from a bitstream. When the coding order flag indicates a left-to-right direction, from among laterally adjacent sub-coding units generated by being split from a current coding unit, a left sub-coding unit may be first decoded, and then a right sub-coding unit may be decoded. When the coding order flag indicates a right-to-left direction, a right sub-coding unit may be first decoded, and then a left sub-coding unit may be decoded.

For example, when a right block of a current block is initially decoded and is available, a representative neighboring block adjacent to a lower right corner of the current block may be determined to be a neighboring block whose available motion information is obtained, from among a neighboring block adjacent to the lower right corner of the current block and a right boundary of the current block and a neighboring block diagonally adjacent to the lower right corner of the current block. Whether available motion information of a block is obtained in an order of a neighboring block C1 and a neighboring block C0 may be checked, and an initially available block may be determined as a BR representative neighboring block.

However, when the right block of the current block is not available, a representative neighboring block adjacent to the lower right corner of the current block is a collocated block located at a point diagonally adjacent to the lower right corner of the current block. The collocated block is a block included in a collocated picture and may be included as a temporal merge candidate in an affine merge candidate list.

In another example, when a right block of a current block is previously decoded and is available, a BR representative neighboring block adjacent to a lower right corner of the current block may be determined to be a block whose motion information is initially available from among a neighboring block C1 adjacent to the lower right corner of the current block and a right boundary of the current block, a neighboring block C0 diagonally adjacent to the lower right corner of the current block, and a collocated block Col located at a point diagonally adjacent to the lower right corner of the current block. Whether available motion information of a block is obtained in an order of the neighboring block C1, the neighboring block C0, and the collocated block Col may be checked, and an initially available block may be determined as a BR representative neighboring block.

The collocated block is a block included in a collocated picture and may be included as a temporal merge candidate in an affine merge candidate list. The collocated block adjacent to the lower right corner of the current block may be a block located at a coordinate corresponding to the lower right corner of the current block in the collocated picture.

The video decoding apparatus 1700 according to an embodiment needs to check availability of motion information of a neighboring block in order to include a valid merge candidate in an affine merge candidate list. This is because a valid merge candidate may be determined from a neighboring block on which motion prediction is performed and that has available motion information. In general, a neighboring block on which motion prediction has been performed before a current block is available for prediction of the current block. In detail, when motion prediction has been performed on a left neighboring block of a current block before the current block, motion information of the left neighboring block is available. When motion prediction has been performed on a right neighboring block of a current block before the current block, motion information of the right neighboring block is available. In contrast, when motion prediction has not been performed on a left neighboring block of a current block, motion information of the left neighboring block is unavailable. When motion prediction has not been performed on a right neighboring block of a current block, motion information of the right neighboring block is unavailable.

Because right neighboring blocks, instead of left neighboring blocks of a neighboring block, may be initially decoded according to a coding order, the video decoding apparatus 1700 according to an embodiment needs to determine an affine merge candidate list by considering the coding order.

When affine model-based inter prediction is performed in a current block, the affine model inter predictor 1710 according to an embodiment may obtain a base motion vector of the current block. The base motion vector according to an embodiment may be a motion vector of the control point CP0 of FIG. 38 described above. In the case of the control point CP0, the availability of motion information of neighboring blocks B2, B3, and A2 may be identified in this stated order, and the motion information of the neighboring block, the availability of which is identified first, may be used to determine the motion information of the control point CP0.

The inter prediction sample determiner 1720 according to an embodiment may determine a central motion vector of the current block by using the base motion vector. The inter prediction sample determiner 1720 may determine a reference range of an area to be referred to, with respect to the current block, based on a size of the current block. Here, when a reference area having the size of the reference range with respect to a point of a reference picture of the current block, the point being indicated by the central motion vector of the current block, deviates from or includes a boundary of the reference picture, the reference area may be changed by being parallelly translated into a current picture.

The inter prediction sample determiner 1720 may determine prediction samples of sub-blocks of the current block in the changed reference area from the reference picture. The sub-block may be a block unit or a sample unit.

The reconstructor 1730 according to an embodiment may determine reconstruction samples of the current block by using the prediction samples of the current block.

Hereinafter, a method of changing the reference area in the reference picture of the current block, when the reference area indicated by the central motion vector of the current block deviates from or includes a boundary of the reference picture, is described in detail with reference to FIG. 18.

Figure 18:
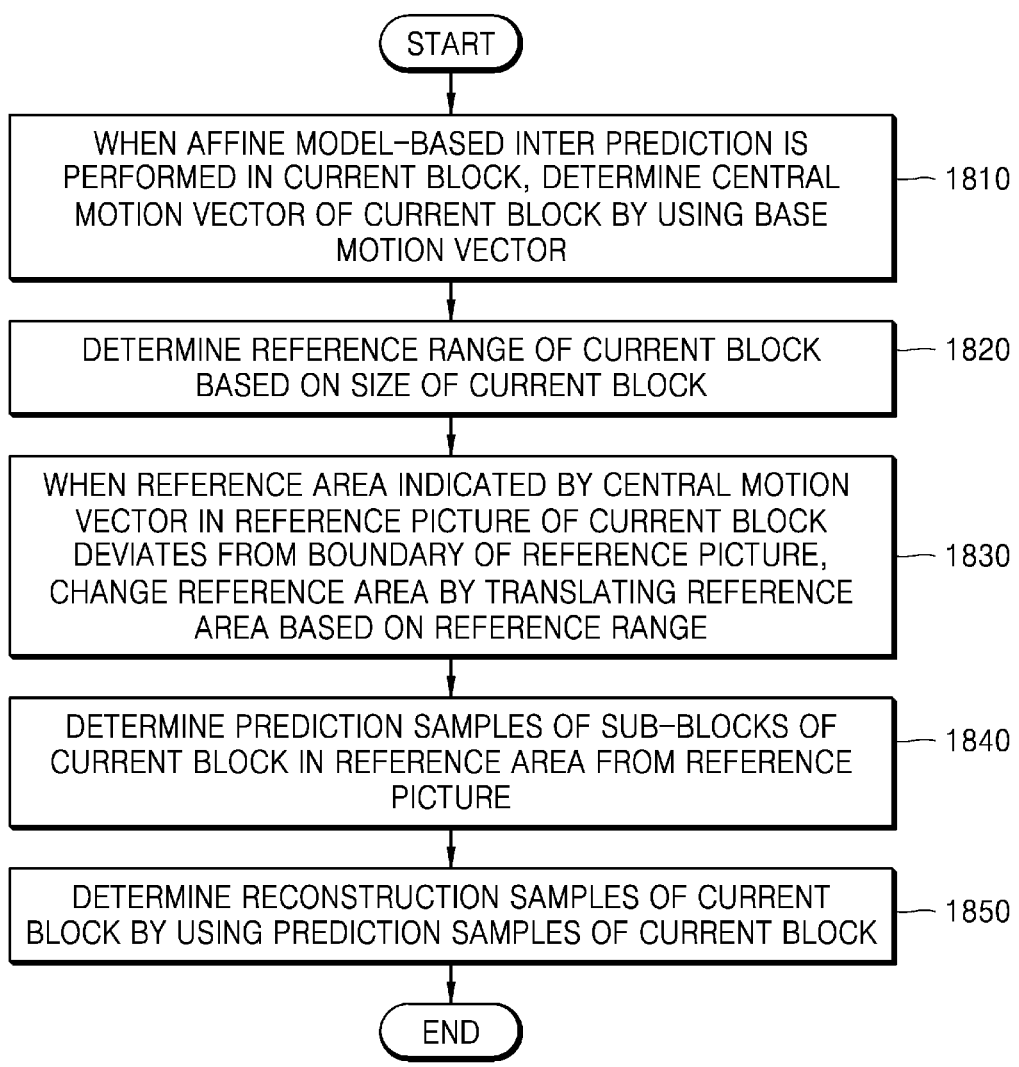
FIG. 18 is a diagram of a flowchart of a video decoding method according to an embodiment.

FIG. 18 is a diagram of a flowchart of a video decoding method according to an embodiment.

In operation 1810, when affine model-based inter prediction is performed in a current block, the affine model inter predictor 1710 may obtain a base motion vector of the current block, and the inter prediction sample determiner 1720 may determine a central motion vector of the current block by using the base motion vector of the current block. The central motion vector of the current block may be determined by performing affine transformation on the base motion vector of the current block. In detail, affine motion model parameters may be determined from control point motion vectors of the current block, and the affine motion model parameters may include the amount of horizontal changes and the amount of vertical changes of an affine motion vector of the current block. When the base motion vector is a motion vector at an upper left edge of the current block, the amount of horizontal changes and the amount of vertical changes of the affine motion vector scaled according to a distance between the upper left edge and the center of the current block may be added to the base motion vector to determine the central motion vector of the current block.

In operation 1820, the inter prediction sample determiner 1720 may determine a reference range of an area to be referred to with respect to the current block, based on a size of the current block.

In operation 1830, when a reference area having the size of the reference range with respect to a point of a reference picture of the current block, the point being indicated by the central motion vector of the current block, deviates from or includes a boundary of the reference picture, the inter prediction sample determiner 1720 may change the reference area by parallelly translating the reference area into a current picture.

Here, the reference picture may be a real picture, a tile, a slice, or a tile group. The reference picture may be an area encompassing an area padded to have a predetermined size inside and outside a picture including reconstruction samples.

In operation 1840, the inter prediction sample determiner 1720 may determine prediction samples of sub-blocks of the current block in the changed reference area from the reference picture.

In operation 1850, the reconstructor 1730 may determine reconstruction samples of the current block by using the prediction samples of the current block.

As a detailed example, in operation 1830, when an x-axis coordinate of a left boundary of the reference area indicated by the central motion vector of the current block is less than an x-axis coordinate of a left boundary of the current picture, the inter prediction sample determiner 1720 may change the x-axis coordinate of the left boundary of the reference area to the x-axis coordinate of the left boundary of the current picture and change an x-axis coordinate of a right boundary of the reference area to a value obtained by adding the reference range to the x-axis coordinate of the left boundary of the current picture. That is, when the reference area according to the central motion vector of the current block includes a left boundary of the reference picture, the inter prediction sample determiner 1720 may change the reference area to be located in the reference picture by parallelly translating the reference area to the right side. Here, a size of the reference area may be intactly maintained as the reference range.

As a detailed example, in operation 1830, when an x-axis coordinate of a right boundary of the reference area indicated by the central motion vector of the current block is greater than an x-axis coordinate of a right boundary of the current picture, the inter prediction sample determiner 1720 may change the x-axis coordinate of the right boundary of the reference area to the x-axis coordinate of the right boundary of the current picture and change an x-axis coordinate of a left boundary of the reference area to a value obtained by subtracting the reference range from the x-axis coordinate of the right boundary of the current picture. That is, when the reference area according to the central motion vector of the current block includes a right boundary of the reference picture, the inter prediction sample determiner 1720 may change the reference area to be located in the reference picture by parallelly translating the reference area to the left side. Here, a size of the reference area may be intactly maintained as the reference range.

As a detailed example, in operation 1830, when a y-axis coordinate of an upper boundary of the reference area indicated by the central motion vector of the current block is less than a y-axis coordinate of an upper boundary of the current picture, the inter prediction sample determiner 1720 may change the y-axis coordinate of the upper boundary of the reference area to the y-axis coordinate of the upper boundary of the current picture and change a y-axis coordinate of a lower boundary of the reference area to a value obtained by adding the reference range to the y-axis coordinate of the upper boundary of the current picture. That is, when the reference area according to the central motion vector of the current block includes an upper boundary of the reference picture, the inter prediction sample determiner 1720 may change the reference area to be located in the reference picture by parallelly translating the reference area to the lower side. Here, a size of the reference area may be intactly maintained as the reference range.

As a detailed example, in operation 1830, when a y-axis coordinate of a lower boundary of the reference area indicated by the central motion vector of the current block is greater than a y-axis coordinate of a lower boundary of the current picture, the inter prediction sample determiner 1720 may change the y-axis coordinate of the lower boundary of the reference area to the y-axis coordinate of the lower boundary of the current picture and change a y-axis coordinate of an upper boundary of the reference area to a value obtained by subtracting the reference range from the y-axis coordinate of the lower boundary of the current picture. That is, when the reference area according to the central motion vector of the current block includes a lower boundary of the reference picture, the inter prediction sample determiner 1720 may change the reference area to be located in the reference picture by parallelly translating the reference area to the upper side. Here, a size of the reference area may be intactly maintained as the reference range.

As a detailed example, in operation 1830, when an x-axis coordinate of a right boundary of the reference area indicated by the central motion vector of the current block is less than an x-axis coordinate of a left boundary of the current picture, the inter prediction sample determiner 1720 may change an x-axis coordinate of a left boundary of the reference area to the x-axis coordinate of the left boundary of the current picture and change the x-axis coordinate of the right boundary of the reference area to a value obtained by adding the reference range to the x-axis coordinate of the left boundary of the current picture. That is, when the reference area according to the central motion vector of the current block entirely deviates from the left boundary of the reference picture and is located outside the reference picture, the inter prediction sample determiner 1720 may change the reference area to be located in the reference picture by parallelly translating the reference area to the right side. Here, a size of the reference area may be intactly maintained as the reference range.

As a detailed example, in operation 1830, when an x-axis coordinate of a left boundary of the reference area indicated by the central motion vector of the current block is greater than an x-axis coordinate of a right boundary of the current picture, the inter prediction sample determiner 1720 may change the x-axis coordinate of the left boundary of the reference area to the x-axis coordinate of the right boundary of the current picture and change an x-axis coordinate of a right boundary of the reference area to a value obtained by subtracting the reference range from the x-axis coordinate of the right boundary of the current picture. That is, when the reference area according to the central motion vector of the current block entirely deviates from the right boundary of the reference picture and is located outside the reference picture, the inter prediction sample determiner 1720 may change the reference area to be located in the reference picture by parallelly translating the reference area to the left side. Here, a size of the reference area may be intactly maintained as the reference range.

As a detailed example, in operation 1830, when a y-axis coordinate of a lower boundary of the reference area indicated by the central motion vector of the current block is less than a y-axis coordinate of an upper boundary of the current picture, the inter prediction sample determiner 1720 may change a y-axis coordinate of an upper boundary of the reference area to the y-axis coordinate of the upper boundary of the current picture and change the y-axis coordinate of the lower boundary of the reference area to a value obtained by adding the reference range to the y-axis coordinate of the upper boundary of the current picture. That is, when the reference area according to the central motion vector of the current block entirely deviates from the upper boundary of the reference picture and is located outside the reference picture, the inter prediction sample determiner 1720 may change the reference area to be located in the reference picture by parallelly translating the reference area to the lower side. Here, a size of the reference area may be intactly maintained as the reference range.

As a detailed example, in operation 1830, when a y-axis coordinate of an upper boundary of the reference area indicated by the central motion vector of the current block is greater than a y-axis coordinate of a lower boundary of the current picture, the inter prediction sample determiner 1720 may change the y-axis coordinate of the upper boundary of the reference area to the y-axis coordinate of the lower boundary of the current picture and change a y-axis coordinate of a lower boundary of the reference area to a value obtained by subtracting the reference range from the y-axis coordinate of the lower boundary of the current picture. That is, when the reference area according to the central motion vector of the current block entirely deviates from the lower boundary of the reference picture and is located outside the reference picture, the inter prediction sample determiner 1720 may change the reference area to be located in the reference picture by parallelly translating the reference area to the upper side. Here, a size of the reference area may be intactly maintained as the reference range.

Figure 19:
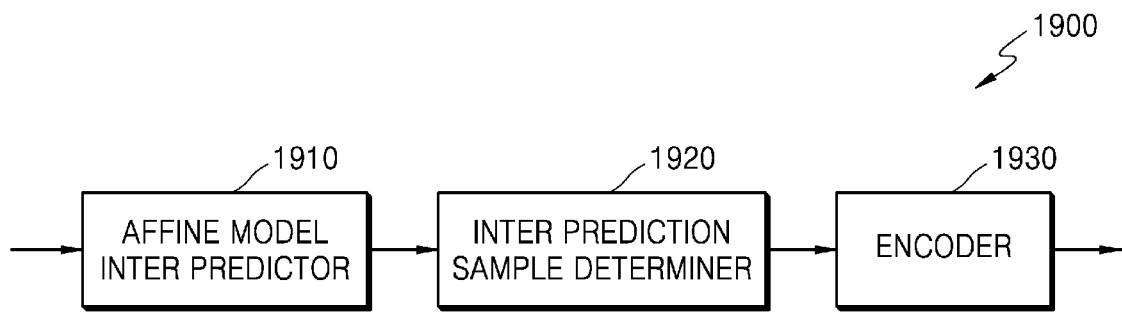
FIG. 19 is a block diagram of a video encoding apparatus according to an embodiment.

FIG. 19 is a block diagram of a video encoding apparatus according to an embodiment.

Referring to FIG. 19, a video encoding apparatus 1900 according to an embodiment may include an affine mode predictor 1910 and an encoder 1920.

The information encoder 1910 according to an embodiment may generate constrained prediction information indicating whether a constrained intra prediction mode is activated, and may perform entropy encoding on the constrained prediction information to output the same as a bitstream.

The video encoding apparatus 1900 according to an embodiment may split a picture into one or more luma coding units, and may encode the coding units.

The video encoding apparatus 1900 according to an embodiment may include a central processor configured to control an affine model inter predictor 1910, an inter-prediction sample determiner 1920, and an encoder 1930. Alternatively, the affine model inter predictor 1910, the inter prediction sample determiner 1920, and the encoder 1930 may separately operate by their own processors, and the processors may systematically operate with each other to operate the video encoding apparatus 1900. Alternatively, the affine mode predictor 1910 and the encoder 1920 may be controlled under the control of an external processor of the video encoding apparatus 1900.

The video encoding apparatus 1900 may include one or more data storages in which input/output data of the affine model inter predictor 1910, the inter-prediction sample determiner 1920, and the encoder 1930 are stored. The video encoding apparatus 1900 may include a memory controller for controlling data input and output of the data storages.

The video encoding apparatus 1900 may perform an image encoding operation including prediction by connectively operating with an internal video encoding processor or an external video encoding processor so as to encode an image. The internal video encoding processor of the video encoding apparatus 1900 according to an embodiment may perform a basic image encoding operation in a manner that not only a separate processor but also an image encoding processing module included in a central processing apparatus or a graphic processing apparatus perform the basic image encoding operation.

The video encoding apparatus 1900 may correspond to the encoder 1600 of the image encoding and decoding system described with reference to FIG. 16. For example, the encoder 1920 may correspond to the entropy encoder 1630 of the encoder 1600. The affine model inter predictor 1910 and the inter-prediction sample determiner 1920 may correspond to the inter predictor 1605 of the encoder 1600.

The video encoding apparatus 1900 according to an embodiment may split a picture into a plurality of largest coding units and may split and encode each largest coding unit into various sized and various-shaped blocks.

For example, when a prediction mode of a current block is an intra mode, the video encoding apparatus 1900 may determine a reference sample from among samples of a spatial neighboring block located in an intra prediction direction of the current block, and may determine prediction samples corresponding to the current block by using the reference sample.

For example, when a current block is predicted in a skip mode, the video encoding apparatus 1900 may determine a motion vector for predicting the current block. The video encoding apparatus 1900 may determine a reference block of the current block in a reference picture, and may determine a motion vector indicating the reference block from the current block. In the skip mode, it is not necessary to encode a residual block.

For example, when a prediction mode of a current block is an inter mode, the video encoding apparatus 1900 may determine a motion vector for predicting the current block. The video encoding apparatus 1900 may determine a reference block of the current block in a reference picture, and may determine a motion vector indicating the reference block from the current block. The video encoding apparatus 1900 may determine a residual sample of the current block from reference samples included in the reference block, and may perform transformation and quantization on the residual sample based on a transform unit, to generate a quantized transform coefficient.

The current block that is a block generated by being split according to a tree structure from an image may correspond to, for example, a largest coding unit, a coding unit, or a transform unit. The video encoding apparatus 1900 may encode blocks included in a picture according to a coding order.

In particular, when affine model-based inter prediction is performed on the current block, the affine model inter predictor 1910 may be invoked. The affine model inter predictor 1910 may generate an affine merge candidate list including a control point-based affine merge candidate corresponding to control point motion vectors determined by using motion vectors of neighboring blocks included in a block group of representative neighboring blocks according to corners of the current block.

In detail, when inter prediction of the current block is performed in an affine merge mode, before a control point-based affine merge candidate is configured, the affine model inter predictor 1910 according to an embodiment may generate an affine merge candidate list including a model-based affine merge candidate. When motion prediction is performed on a neighboring block before the current block and motion information of the neighboring block is available, a model-based affine merge candidate corresponding to the neighboring block may be included in the affine merge candidate list. When the motion information of the neighboring block is available, the model-based affine merge candidate corresponding to the neighboring block is also set as available. In contrast, when the motion information of the neighboring block is not available, the model-based affine merge candidate corresponding to the neighboring block is also set as unavailable. However, when the number of available model-based affine merge candidates is less than a certain number, the affine model inter predictor 1910 may determine a control point-based affine merge candidate corresponding to a group of representative neighboring blocks according to corners of the current block, and may add the control point-based affine merge candidate to the affine merge candidate list. The certain number may be a maximum number of affine merge candidates that are allowed to be included in the affine merge candidate list, and may be set to, for example, 5.

Accordingly, an available model-based affine merge candidate may be included in an affine merge candidate list of a current block, and when the number of valid affine merge candidates of the current block is less than a certain number, control point-based affine merge candidates as many as the insufficient number of affine merge candidates may be added to the affine merge candidate list.

The affine model inter predictor 1910 according to an embodiment may select a merge candidate with a smallest error to express an affine motion vector of a current block from among merge candidates included in an affine merge candidate list. The affine model inter predictor 1910 may determine an affine motion vector of the current block by using control point motion vectors corresponding to a merge candidate selected from the affine merge candidate list. The affine model inter predictor 1910 may determine an affine motion model parameter of the current block by using a control point motion vector, and may determine an affine motion vector of the current block by using the affine motion model parameter of the current block. Prediction samples of the current block may be determined, by using a reference sample indicated by the affine motion vector of the current block.

When a model-based affine merge candidate is selected in the affine merge candidate list, control point motion vectors corresponding to the model-based affine merge candidate may be determined by using an affine model of one neighboring block. An affine motion vector of the current block may be determined by using the control point motion vectors corresponding to the model-based affine merge candidate.

When a control point-based affine merge candidate is selected in the affine merge candidate list, control point motion vectors corresponding to the control point-based affine merge candidate may be determined by using control points of the current block or neighboring blocks included in a corresponding block group. An affine motion vector of the current block may be determined by using the control point motion vectors corresponding to the control point-based affine merge candidate. In detail, when a model-based affine merge candidate is selected from the affine merge candidate list, control point motion vectors corresponding to control points of the current block may be determined by using a vertical change amount, a horizontal change amount, and a motion vector of one neighboring block corresponding to the model-based affine merge candidate. In more detail, a reference index, a prediction direction, and a control point motion vector corresponding to the model-based affine merge candidate may be respectively determined, by using a reference index, a prediction direction, and a motion vector of a neighboring block. A reference index, a prediction direction, and an affine motion vector of the current block may be respectively determined by using the reference index, the prediction direction, and the control point motion vector corresponding to the affine merge candidate.

In detail, when a control point-based affine merge candidate is selected from the affine merge candidate list, motion vectors of neighboring blocks adjacent to control points of the current block may be determined as control point motion vectors, and an affine motion vector of the current block may be determined by using the control point motion vectors according to an affine model of the current block. In more detail, a reference index, a prediction direction, and a control point motion vector corresponding to an affine merge candidate may be respectively determined by using a reference index, a prediction direction, and a motion vector of representative neighboring blocks belonging to a block group. A reference index, a prediction direction, and an affine motion vector of the current block may be respectively determined by using the reference index, the prediction direction, and the control point motion vector corresponding to the affine merge candidate.

The video encoding apparatus 1900 according to an embodiment may change a coding order between laterally adjacent coding units according to a SUCO method. The encoder 1930 may encode a coding order flag indicating a direction of a coding order. When a left sub-coding unit is first encoded and then a right sub-coding unit is encoded from among laterally adjacent sub-coding units generated by being split from a current coding unit, the coding order flag may be encoded to indicate a left-to-right direction. When a right sub-coding unit is first encoded and then a left sub-coding unit is encoded, the coding order flag may be encoded to indicate a right-to-left direction.

For example, when a right block of a current block is initially encoded and is available, a representative neighboring block adjacent to a lower right corner of the current block may be a block whose available motion information is obtained from among a neighboring block adjacent to the lower right corner of the current block and a right boundary of the current block and a neighboring block diagonally adjacent to the lower right corner of the current block. Whether available motion information is obtained in an order of a neighboring block C1 and a neighboring block C0 may be checked, and a block whose available motion information is initially obtained may be determined as a BR representative neighboring block. However, when the right block of the current block is not available, a representative neighboring block adjacent to the lower right corner of the current block is a collocated block located at a point diagonally adjacent to the lower right corner of the current block. The collocated block is a block included in a collocated picture and may be included as a temporal merge candidate in an affine merge candidate list.

In another example, when a right block of a current block is initially decoded and is available, a BR representative neighboring block adjacent to a lower right corner of the current block may be a block whose available motion information is obtained from among a neighboring block C1 adjacent to the lower right corner of the current block and a right boundary of the current block, a neighboring block C0 diagonally adjacent to the lower right corner of the current block, and a collocated block Col located at a point diagonally adjacent to the lower right corner of the current block. Whether available motion information is obtained in an order of the neighboring block C1, the neighboring block C0, and the collocated block Col may be checked, and a block whose available motion information is initially obtained may be determined as a BR representative neighboring block.

The collocated block is a block included in a collocated picture and may be included as a temporal merge candidate in an affine merge candidate list. The collocated block adjacent to the lower right corner of the current block may be a block located at a coordinate corresponding to the lower right corner of the current block in the collocated picture.

The video encoding apparatus 1900 according to an embodiment needs to check availability of motion information of a neighboring block in order to include a valid merge candidate in an affine merge candidate list. This is because a valid merge candidate may be determined from a neighboring block on which motion prediction is performed and whose available motion information is obtained. In general, a neighboring block on which motion prediction has been performed before a current block is available for prediction of the current block. In detail, when motion prediction has been performed on a left neighboring block of a current block before the current block, motion information of the left neighboring block is available. When motion prediction has been performed on a right neighboring block of a current block before the current block, motion information of the right neighboring block is available. In contrast, when motion prediction has not been performed on a left neighboring block of a current block, motion information of the left neighboring block is unavailable. When motion prediction has not been performed on a right neighboring block of a current block, motion information of the right neighboring block is unavailable.

Because right neighboring blocks, instead of left neighboring blocks of a neighboring block, may be initially encoded according to a coding order, the video encoding apparatus 1900 according to an embodiment needs to determine an affine merge candidate list by considering the coding order.

The encoder 1930 according to an embodiment may encode a merge mode flag indicating whether an inter prediction mode of a current block is a merge mode, and may encode an affine flag indicating whether motion compensation based on an affine model is performed to generate a prediction sample of the current block. The encoder 1920 according to an embodiment may encode an affine merge index indicating one from an affine merge candidate list.

When affine model-based inter prediction is performed in a current block, the affine model inter predictor 1910 according to an embodiment may determine a base motion vector of the current block and may determine a central motion vector of the current block by using the base motion vector of the current block.

The inter prediction sample determiner 1920 according to an embodiment may determine a reference range of an area to be referred to, with respect to the current block, based on a size of the current block. When a reference area having the size of the reference range with respect to a point of a reference picture of the current block, the point being indicated by the central motion vector of the current block, deviates from or includes a boundary of the reference picture, the inter prediction sample determiner 1920 may change the reference area by parallelly translating the reference area into a current picture.

The inter prediction sample determiner 1920 according to an embodiment may determine prediction samples of sub-blocks of the current block in the changed reference area from the reference picture. The sub-block may be a block unit or a sample unit.

The encoder 1930 according to an embodiment may encode residual samples of the current block by using the prediction samples of the current block.

Hereinafter, a method of changing the reference area in the reference picture of the current block, when the reference area indicated by the central motion vector of the current block deviates from or includes a boundary of the reference picture, is described in detail with reference to FIG. 20.

Figure 20:
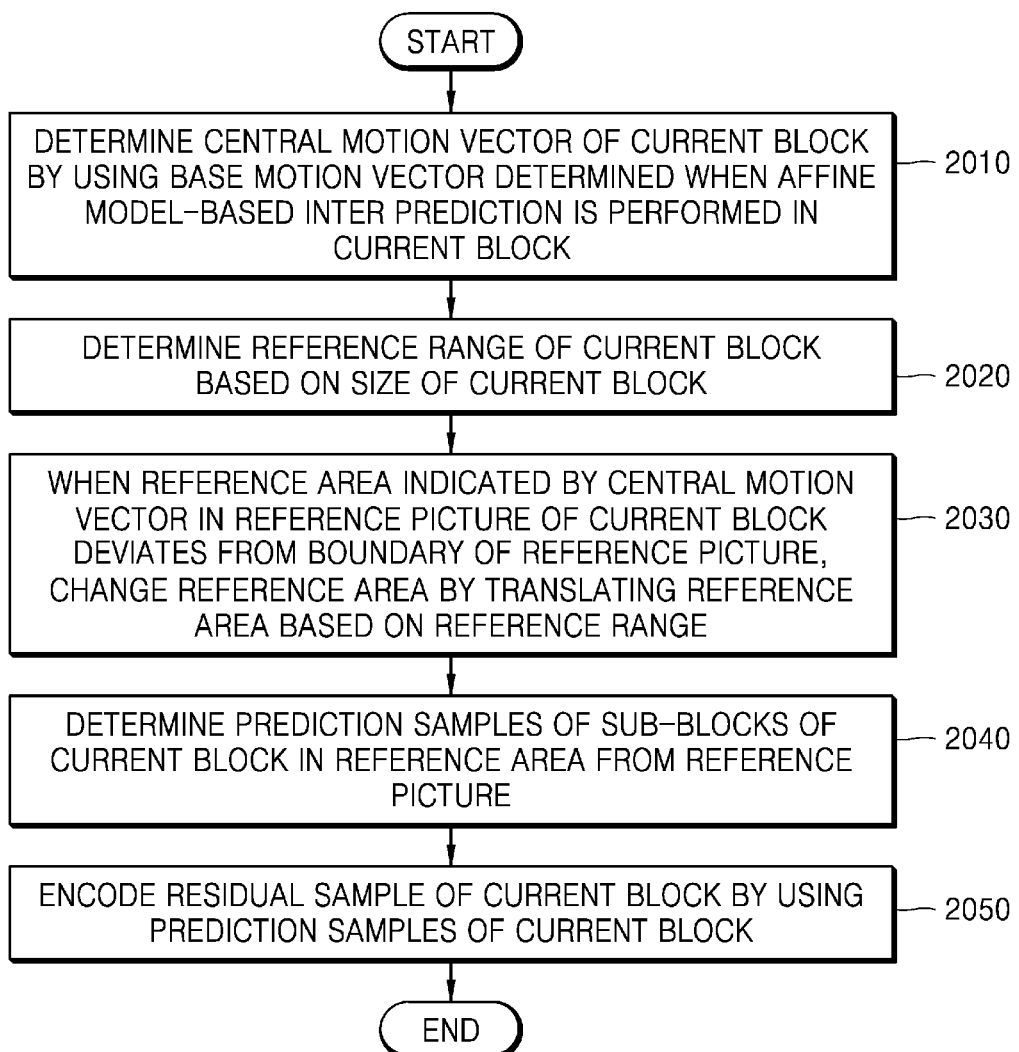
FIG. 20 is a diagram of a flowchart of a video encoding method according to an embodiment.

FIG. 20 is a diagram of a flowchart of a video encoding method according to an embodiment.

In operation 2010, when affine model-based inter prediction is performed in a current block, the affine model inter predictor 1910 may determine a central motion vector of the current block by using a base motion vector of the current block.

In operation 2020, the inter prediction sample determiner 1920 may determine a reference range of an area to be referred to, with respect to the current block, based on a size of the current block.

In operation 2030, when a reference area having the size of the reference range with respect to a point of a reference picture of the current block, the point being indicated by the central motion vector of the current block, deviates from or includes a boundary of the reference picture, the inter prediction sample determiner 1920 may change the reference area by parallelly translating the reference area into a current picture.

In operation 2040, the inter prediction sample determiner 1920 may determine prediction samples of sub-blocks of the current block in the changed reference area from the reference picture.

In operation 2050, the encoder 1930 may encode residual samples of the current block by using the prediction samples of the current block.

As a detailed example, in operation 2030, when an x-axis coordinate of a left boundary of the reference area indicated by the central motion vector of the current block is less than an x-axis coordinate of a left boundary of the current picture, the inter prediction sample determiner 1920 may change the x-axis coordinate of the left boundary of the reference area to the x-axis coordinate of the left boundary of the current picture and change an x-axis coordinate of a right boundary of the reference area to a value obtained by adding the reference range to the x-axis coordinate of the left boundary of the current picture. That is, when the reference area according to the central motion vector of the current block includes a left boundary of the reference picture, the inter prediction sample determiner 1920 may change the reference area to be located in the reference picture by parallelly translating the reference area to the right side. Here, a size of the reference area may be intactly maintained as the reference range.

As a detailed example, in operation 2030, when an x-axis coordinate of a right boundary of the reference area indicated by the central motion vector of the current block is greater than an x-axis coordinate of a right boundary of the current picture, the inter prediction sample determiner 1920 may change the x-axis coordinate of the right boundary of the reference area to the x-axis coordinate of the right boundary of the current picture and change an x-axis coordinate of a left boundary of the reference area to a value obtained by subtracting the reference range from the x-axis coordinate of the right boundary of the current picture. That is, when the reference area according to the central motion vector of the current block includes a right boundary of the reference picture, the inter prediction sample determiner 1920 may change the reference area to be located in the reference picture by parallelly translating the reference area to the left side. Here, a size of the reference area may be intactly maintained as the reference range.

As a detailed example, in operation 2030, when a y-axis coordinate of an upper boundary of the reference area indicated by the central motion vector of the current block is less than a y-axis coordinate of an upper boundary of the current picture, the inter prediction sample determiner 1920 may change the y-axis coordinate of the upper boundary of the reference area to the y-axis coordinate of the upper boundary of the current picture and change a y-axis coordinate of a lower boundary of the reference area to a value obtained by adding the reference range to the y-axis coordinate of the upper boundary of the current picture. That is, when the reference area according to the central motion vector of the current block includes an upper boundary of the reference picture, the inter prediction sample determiner 1920 may change the reference area to be located in the reference picture by parallelly translating the reference area to the lower side. Here, a size of the reference area may be intactly maintained as the reference range.

As a detailed example, in operation 2030, when a y-axis coordinate of a lower boundary of the reference area indicated by the central motion vector of the current block is greater than a y-axis coordinate of a lower boundary of the current picture, the inter prediction sample determiner 1920 may change the y-axis coordinate of the lower boundary of the reference area to the y-axis coordinate of the lower boundary of the current picture and change a y-axis coordinate of an upper boundary of the reference area to a value obtained by subtracting the reference range from the y-axis coordinate of the lower boundary of the current picture. That is, when the reference area according to the central motion vector of the current block includes a lower boundary of the reference picture, the inter prediction sample determiner 1920 may change the reference area to be located in the reference picture by parallelly translating the reference area to the upper side. Here, a size of the reference area may be intactly maintained as the reference range.

As a detailed example, in operation 2030, when an x-axis coordinate of a right boundary of the reference area indicated by the central motion vector of the current block is less than an x-axis coordinate of a left boundary of the current picture, the inter prediction sample determiner 1920 may change an x-axis coordinate of a left boundary of the reference area to the x-axis coordinate of the left boundary of the current picture and change the x-axis coordinate of the right boundary of the reference area to a value obtained by adding the reference range to the x-axis coordinate of the left boundary of the current picture. That is, when the reference area according to the central motion vector of the current block entirely deviates from the left boundary of the reference picture and is located outside the reference picture, the inter prediction sample determiner 1920 may change the reference area to be located in the reference picture by parallelly translating the reference area to the right side. Here, a size of the reference area may be intactly maintained as the reference range.

As a detailed example, in operation 2030, when an x-axis coordinate of a left boundary of the reference area indicated by the central motion vector of the current block is greater than an x-axis coordinate of a right boundary of the current picture, the inter prediction sample determiner 1920 may change the x-axis coordinate of the left boundary of the reference area to the x-axis coordinate of the right boundary of the current picture and change an x-axis coordinate of a right boundary of the reference area to a value obtained by subtracting the reference range from the x-axis coordinate of the right boundary of the current picture. That is, when the reference area according to the central motion vector of the current block entirely deviates from the right boundary of the reference picture and is located outside the reference picture, the inter prediction sample determiner 1920 may change the reference area to be located in the reference picture by parallelly translating the reference area to the left side. Here, a size of the reference area may be intactly maintained as the reference range.

As a detailed example, in operation 2030, when a y-axis coordinate of a lower boundary of the reference area indicated by the central motion vector of the current block is less than a y-axis coordinate of an upper boundary of the current picture, the inter prediction sample determiner 1720 may change a y-axis coordinate of an upper boundary of the reference area to the y-axis coordinate of the upper boundary of the current picture and change the y-axis coordinate of the lower boundary of the reference area to a value obtained by adding the reference range to the y-axis coordinate of the upper boundary of the current picture. That is, when the reference area according to the central motion vector of the current block entirely deviates from the upper boundary of the reference picture and is located outside the reference picture, the inter prediction sample determiner 1920 may change the reference area to be located in the reference picture by parallelly translating the reference area to the lower side. Here, a size of the reference area may be intactly maintained as the reference range.

As a detailed example, in operation 2030, when a y-axis coordinate of an upper boundary of the reference area indicated by the central motion vector of the current block is greater than a y-axis coordinate of a lower boundary of the current picture, the inter prediction sample determiner 1920 may change the y-axis coordinate of the upper boundary of the reference area to the y-axis coordinate of the lower boundary of the current picture and change a y-axis coordinate of a lower boundary of the reference area to a value obtained by subtracting the reference range from the y-axis coordinate of the lower boundary of the current picture. That is, when the reference area according to the central motion vector of the current block entirely deviates from the lower boundary of the reference picture and is located outside the reference picture, the inter prediction sample determiner 1920 may change the reference area to be located in the reference picture by parallelly translating the reference area to the upper side. Here, a size of the reference area may be intactly maintained as the reference range.

As described above, the video decoding apparatus 1700 and the video encoding apparatus 1900 according to an embodiment may determine a motion vector of a current block through affine model-based inter prediction, and when a reference area indicated by the motion vector of the current block includes or deviates from a boundary of a reference picture, may change the reference area to be located in the reference picture, to efficiently determine a prediction sample through inter prediction without increasing a bandwidth of a memory.

Hereinafter, a method of changing the reference area according to a location of the reference area that is determined according to the motion vector of the current block through the affine model-based inter prediction, is described in detail with reference to FIGS. 21 through 33.

Figure 21:
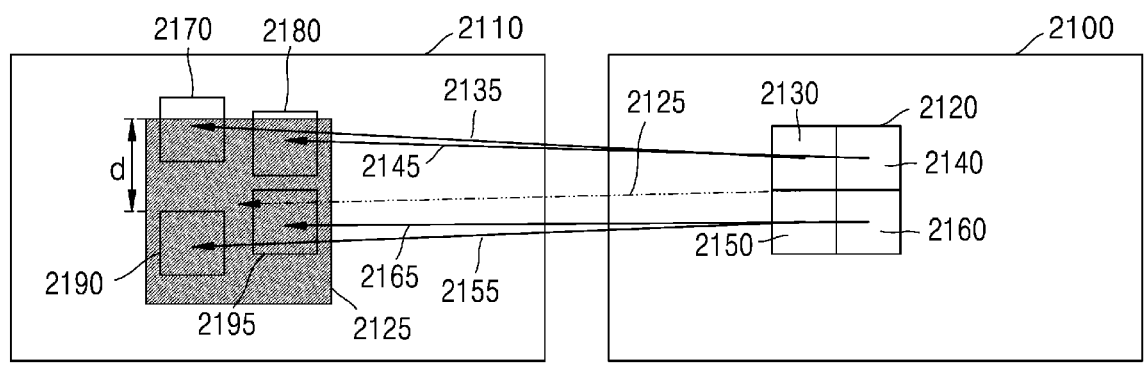
FIG. 21 is a diagram of a reference area in which a prediction block of sub-blocks may be determined, with respect to a point indicated by a motion vector of a current block in affine model-based inter prediction.

FIG. 21 is a diagram of a reference area in which a prediction block of sub-blocks may be determined, with respect to a point indicated by a motion vector of a current block in affine model-based inter prediction.

The affine model-based inter prediction (hereinafter, referred to as "affine inter prediction") may be performed in a current block 2120 of a current picture 2100 to determine a central motion vector 2125. In a reference picture 2110 of the current block 2120, a reference area with respect to a point indicated by the central motion vector 2125 may be determined. For example, the reference area 2125 having a width W and a height H with respect to the point indicated by the central motion vector 2125 may be determined. Here, each of the width W and the height H corresponds to 2*d according to the drawing and may be referred to as a reference range. The reference range may be determined based on a size of the current block. For example, when the size of the current block is 8, the width and the height of the reference range may be determined to be 128*2, when the size of the current block is 16, the width and the height of the reference range may be determined to be 256*2, when the size of the current block is 32, the width and the height of the reference range may be determined to be 544*2, when the size of the current block is 64, the width and the height of the reference range may be determined to be 1120*2, and when the size of the current block is 128, the width and the height of the reference range may be determined to be 2272*2. Here, the width and the height of the reference range may be expanded in a 1/32 pixel unit, and thus, in the reference area having the width×the height of 128*2×128*2, 256*2×256*2, 544*2×544*2, 1120*2×1120*2, and 2272*2×2272*2, a prediction point may be defined in the 1/32 pixel unit. Thus, precise motion prediction may be possible. An interpolation filter may be used to obtain a sample value of a point of the reference area in the 1/32 pixel unit. Prediction sample values in the 1/32 pixel unit may be obtained through interpolation filtering using sample values in an integer pixel unit in the reference area. The interpolation filtering according to an embodiment may be performed by using a bi-linear interpolation filter.

A prediction block may be determined in the reference area 2125 for each of sub-blocks 2130, 2140, 2150, and 2160 of the current block 2120. For example, the video encoding apparatus 1900 may determine prediction blocks 2170, 2180, 2190, and 2195 by searching for the most similar blocks in the reference area 2125 for the sub-blocks 2130, 2140, 2150, and 2160, respectively. The video decoding apparatus 1700 may obtain motion vectors for the sub-blocks 2130, 2140, 2150, and 2160, respectively, and may determine the prediction blocks 2170, 2180, 2190, and 2195 indicated by the motion vectors of the sub-blocks 2130, 2140, 2150, and 2160, respectively, in the reference area 2125.

The embodiment of FIG. 21 is described based on the configuration that motion compensation of sub-blocks may be performed in a sub-block unit. However, a prediction sample may be determined for each sample of the sub-block in the reference area 2125.

FIG. 22 is a diagram of a case in which a reference area according to a motion vector of a current block in affine model-based inter prediction deviates from or includes a boundary of a reference picture.

There may be a case where a reference area 2235 covering a reference range from a point indicated by a central motion vector 2230 of a current block 2220 includes a boundary of a reference picture 2210 so that a portion of the reference area 2235 deviates from a boundary of the reference picture 2210. Alternatively, there may be a case where a reference area 2245 indicated by a central motion vector 2240 of the current block 2220 entirely deviates from the boundary of the reference picture 2210 so that the entire reference area 2235 may be located outside the reference picture 2210.

In this case, according to various embodiments, the video decoding apparatus 1700 and the video encoding apparatus 1900 may efficiently set the reference area required for motion compensation and, even when the motion vector indicates the outside of the reference picture, may refer to not only the outside of the reference picture, but also the inside of the reference picture, and thus, the coding efficiency may be increased. Also, when data outside the reference picture 2210 is used to determine the prediction sample according to affine inter prediction, a memory bandwidth may have to be increased, and thus, it may be difficult to efficiently design hardware. In response to this, the video decoding apparatus 1700 and the video encoding apparatus 1900 may determine the prediction sample according to affine inter prediction without increasing the memory bandwidth, and thus, a hardware structure may be efficiently designed. Various embodiments in which the video decoding apparatus 1700 and the video encoding apparatus 1900 may determine a reference area of sub-blocks according to affine inter prediction are described with reference to FIGS. 22 through 33.

Figure 23:
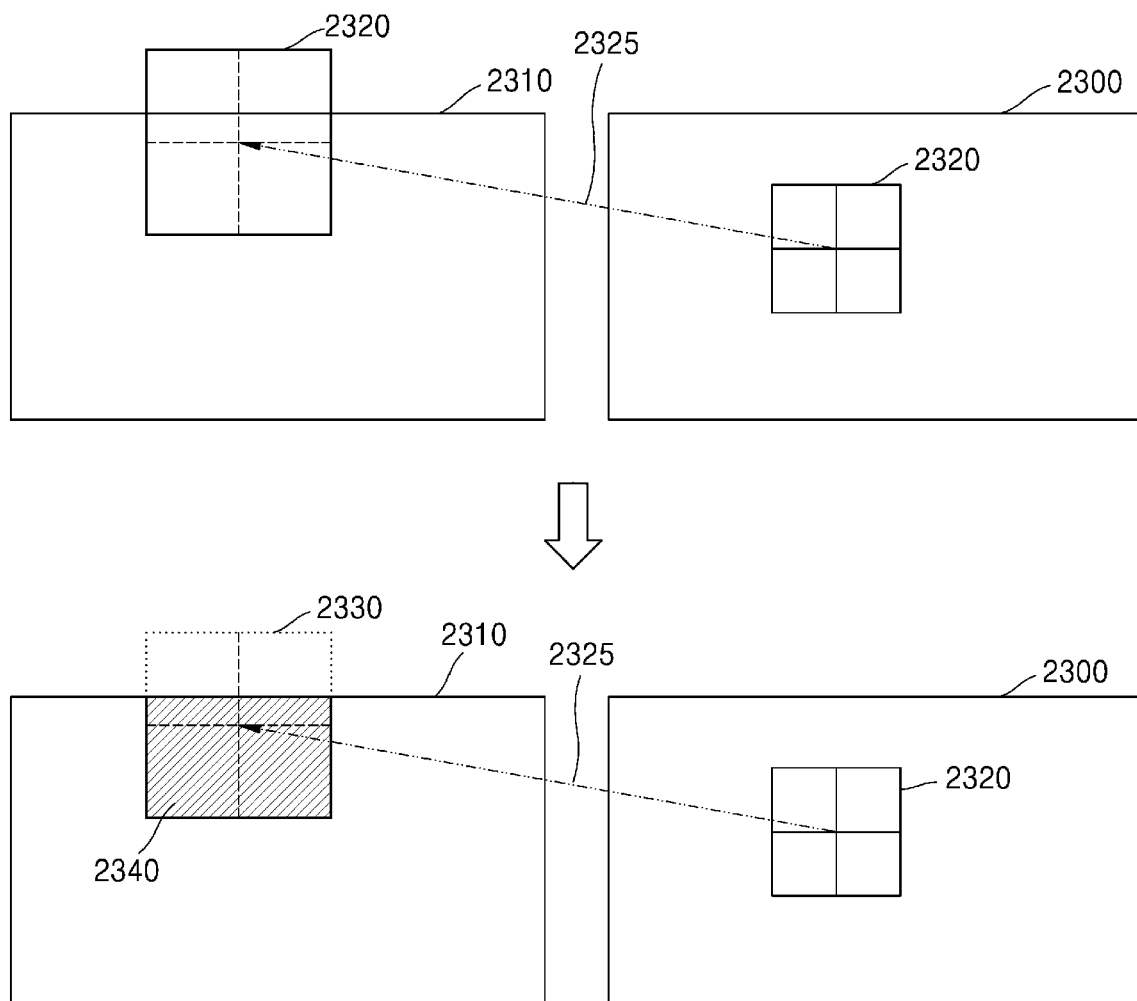
FIGS. 23, 24 and 25 are diagrams of a method, performed by a video decoding apparatus, of clipping a reference area, when the reference area according to a motion vector of a current block in affine model-based inter prediction includes a boundary of a reference picture, according to an embodiment.
Figure 24:
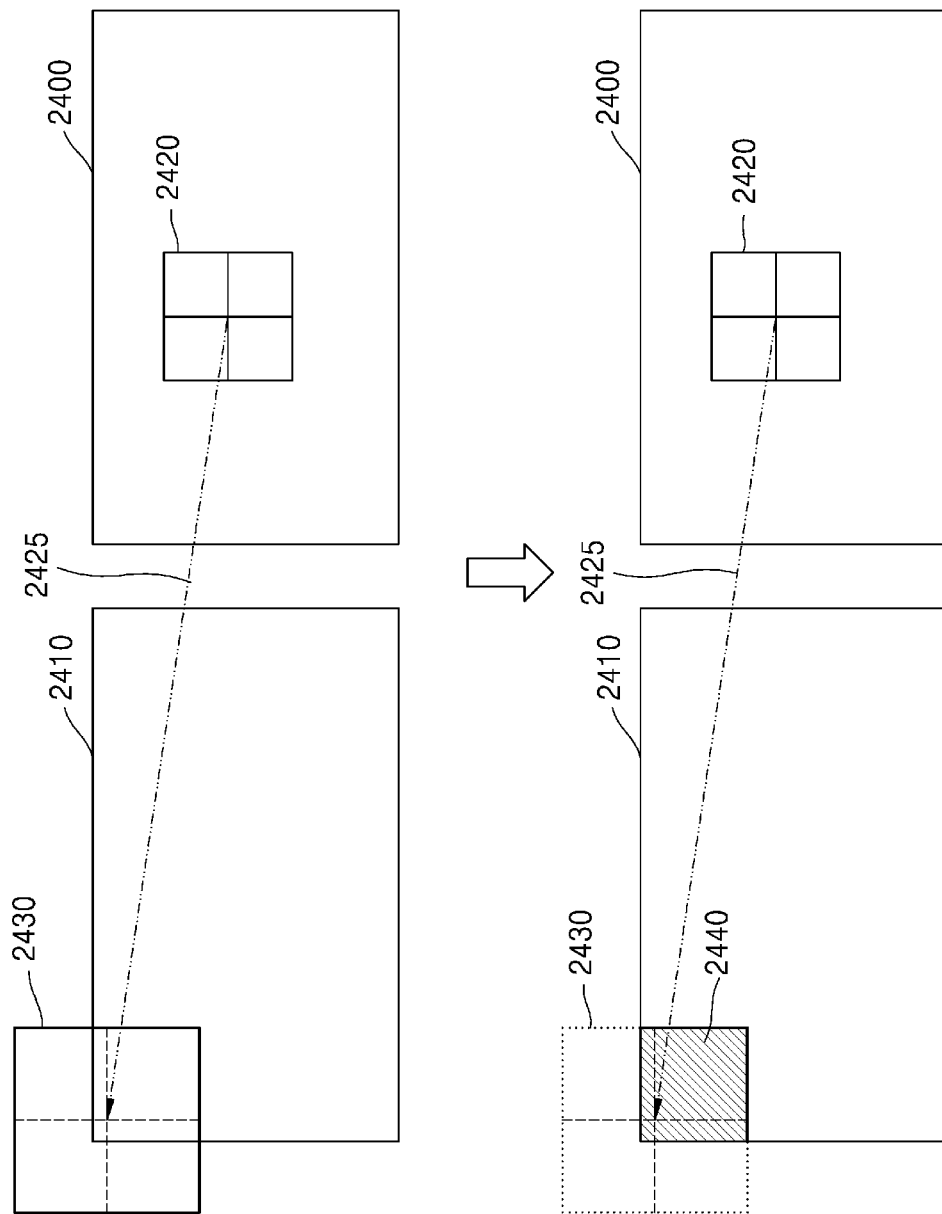
Figure 25:
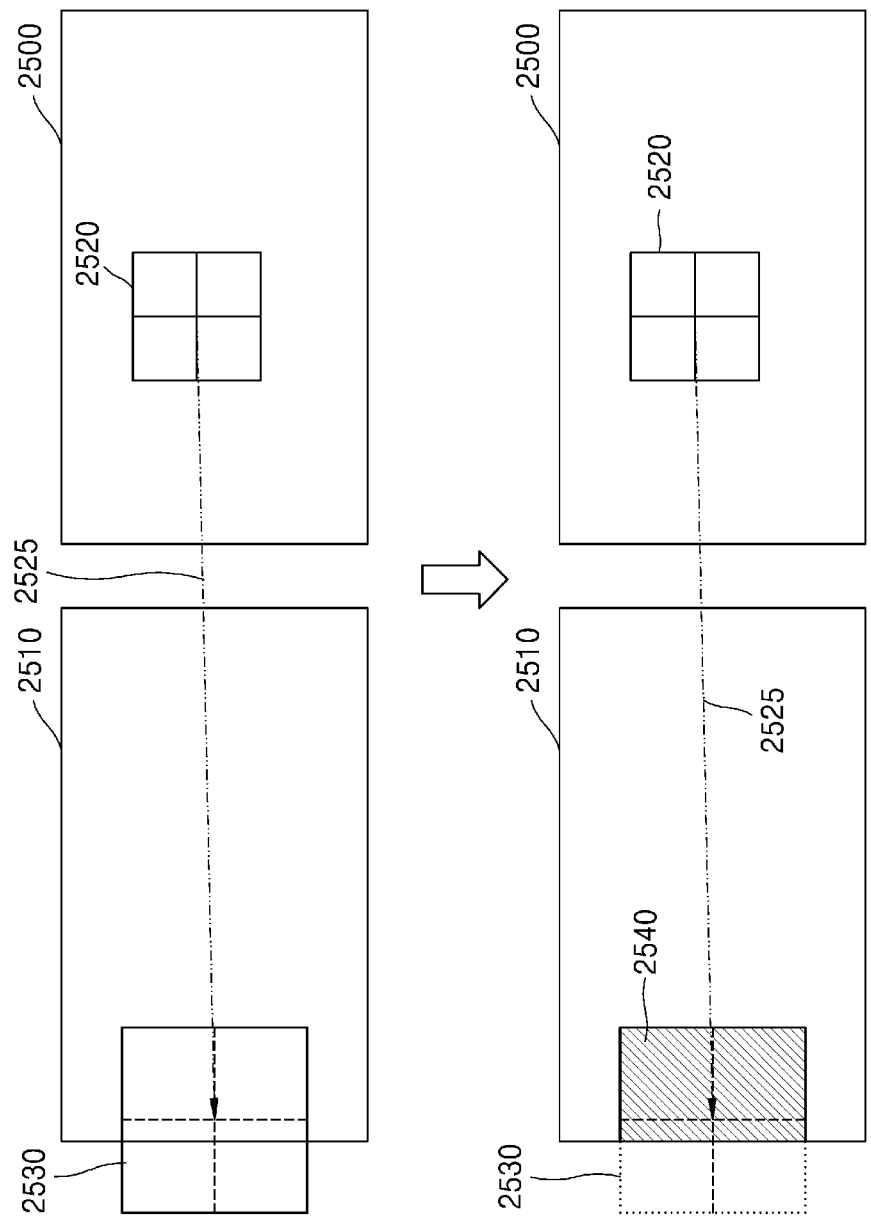

FIGS. 23, 24 and 25 are diagrams of a method, performed by a video decoding apparatus 1700, of clipping a reference area, when the reference area according to a motion vector of a current block in affine model-based inter prediction includes a boundary of a reference picture, according to an embodiment.

With reference to FIG. 23, when an original reference area 2330 indicated by a central motion vector 2325 of a current block 2320 of a current picture 2300 includes an upper boundary of a reference picture 2310, the video decoding apparatus 1700 according to an embodiment may determine a final reference area 2340 to include only an area inside the reference picture 2310 and exclude an area deviating from the upper boundary of the reference picture 2310 from the original reference area 2330. To this end, when a y coordinate of an upper boundary of the original reference area 2330 is less than a y coordinate (an original point) of the upper boundary of the reference picture 2310, the video decoding apparatus 1700 according to an embodiment may clip the y coordinate of the reference area such that a y coordinate of an upper boundary of the final reference area 2340 becomes equal to the y coordinate (the original point) of the upper boundary of the reference picture 2310.

A similar operation may be performed by the video encoding apparatus 1900 according to an embodiment. With reference to FIG. 23, when a y coordinate of an upper boundary of the original reference area 2330 indicated by the motion vector 2325 of the current block 2320 is less than a y coordinate (an original point) of the upper boundary of the reference picture 2310, the video encoding apparatus 1900 according to an embodiment may clip the y coordinate of the upper boundary of the reference area such that a y coordinate of an upper boundary of the final reference area 2340 becomes equal to the y coordinate (the original point) of the upper boundary of the reference picture 2310.

With reference to FIG. 24, when an original reference area 2430 indicated by a central motion vector 2425 of a current block 2420 of a current picture 2400 includes an upper boundary and a left boundary of a reference picture 2410 (includes an upper left edge of the reference picture 2410), the video decoding apparatus 1700 according to an embodiment may determine a final reference area 2440 to exclude an area deviating from the upper boundary and the left boundary of the reference picture 2410 and to include only an area inside the reference picture 2410 from the original reference area 2430. To this end, when a y coordinate of an upper boundary of the original reference area 2430 is less than a y coordinate (an original point) of the upper boundary of the reference picture 2410, and an x coordinate of a left boundary of the original reference area 2430 is less than an x coordinate (an original point) of the left boundary of the reference picture 2410, the video decoding apparatus 1700 according to an embodiment may clip the y coordinate of the upper boundary and the x coordinate of the left boundary of the reference area such that a y coordinate of an upper boundary of the final reference area 2440 becomes the same as the y coordinate (the original point) of the upper boundary of the reference picture 2410, and an x coordinate of a left boundary of the final reference area 2440 becomes the same as the x coordinate (the original point) of the left boundary of the reference picture 2410.

A similar operation may be performed by the video encoding apparatus 1900 according to an embodiment. With reference to FIG. 24, when a y coordinate of an upper boundary of the original reference area 2430 indicated by the motion vector 2425 of the current block 2420 is less than a y coordinate (an original point) of the upper boundary of the reference picture 2410, and an x coordinate of a left boundary of the original reference area 2430 is less than an x coordinate (an original point) of the left boundary of the reference picture 2410, the video encoding apparatus 1900 according to an embodiment may clip the y coordinate of the upper boundary and the x coordinate of the left boundary of the reference area such that a y coordinate of an upper boundary of the final reference area 2440 becomes the same as the y coordinate (the original point) of the upper boundary of the reference picture 2410, and an x coordinate of a left boundary of the final reference area 2440 becomes the same as the x coordinate (the original point) of the left boundary of the reference picture 2410.

With reference to FIG. 25, when an original reference area 2530 indicated by a central motion vector 2525 of a current block 2520 of a current picture 2500 includes a left boundary of a reference picture 2510, the video decoding apparatus 1700 according to an embodiment may determine a final reference area 2540 to exclude an area deviating from the left boundary of the reference picture 2510 and to include only an area inside the reference picture 2510 from the original reference area 2530. To this end, when an x coordinate of a left boundary of the original reference area 2430 is less than an x coordinate (an original point) of the left boundary of the reference picture 2510, the video decoding apparatus 1700 according to an embodiment may clip the x coordinate of the left boundary of the reference area such that an x coordinate of a left boundary of the final reference area 2540 becomes the same as the x coordinate (the original point) of the left boundary of the reference picture 2510.

A similar operation may be performed by the video encoding apparatus 1900 according to an embodiment. With reference to FIG. 25, when an x coordinate of a left boundary of the original reference area 2530 indicated by the motion vector 2525 of the current block 2520 is less than an x coordinate (an original point) of the left boundary of the reference picture 2510, the video encoding apparatus 1900 according to an embodiment may clip the x coordinate of the left boundary of the reference area such that an x coordinate of a left boundary of the final reference area 2540 becomes the same as the x coordinate (the original point) of the left boundary of the reference picture 2510.

Although not shown in the drawing, when an original reference area indicated by a central motion vector of a current block of a current picture includes a right boundary of a reference picture, the video decoding apparatus 1700 according to an embodiment may determine a final reference area to exclude an area deviating from the right boundary of the reference picture and include only an area inside the reference picture from the original reference area. To this end, when an x coordinate of a right boundary of the original reference area is greater than an x coordinate (a width of the reference picture) of the right boundary of the reference picture, the video decoding apparatus 1700 according to an embodiment may clip the x coordinate of the right boundary of the reference area such that an x coordinate of a right boundary of the final reference area becomes the same as the x coordinate (the width of the reference picture) of the right boundary of the reference picture.

Similarly, when an x coordinate of a right boundary of the original reference area indicated by the motion vector of the current block is greater than an x coordinate (a width of the reference picture) of the right boundary of the reference picture, the video encoding apparatus 1900 according to an embodiment may clip the x coordinate of the right boundary of the reference area such that an x coordinate of a right boundary of the final reference area becomes the same as the x coordinate (the width of the reference picture) of the right boundary of the reference picture.

Although not shown in the drawing, when an original reference area indicated by a central motion vector of a current block of a current picture includes a lower boundary of a reference picture, the video decoding apparatus 1700 according to an embodiment may determine a final reference area to exclude an area deviating from the lower boundary of the reference picture and include only an area inside the reference picture from the original reference area. To this end, when a y coordinate of a lower boundary of the original reference area is greater than a y coordinate (a height of the reference picture) of the lower boundary of the reference picture, the video decoding apparatus 1700 according to an embodiment may clip the y coordinate of the lower boundary of the reference area such that a y coordinate of a lower boundary of the final reference area becomes the same as the y coordinate (the height of the reference picture) of the lower boundary of the reference picture.

Similarly, when a y coordinate of a lower boundary of the original reference area indicated by the motion vector of the current block is greater than a y coordinate (a height of the reference picture) of the lower boundary of the reference picture, the video encoding apparatus 1900 according to an embodiment may clip the y coordinate of the lower boundary of the reference area such that a y coordinate of a lower boundary of the final reference area becomes the same as the y coordinate (the height of the reference picture) of the lower boundary of the reference picture.

Figure 26:
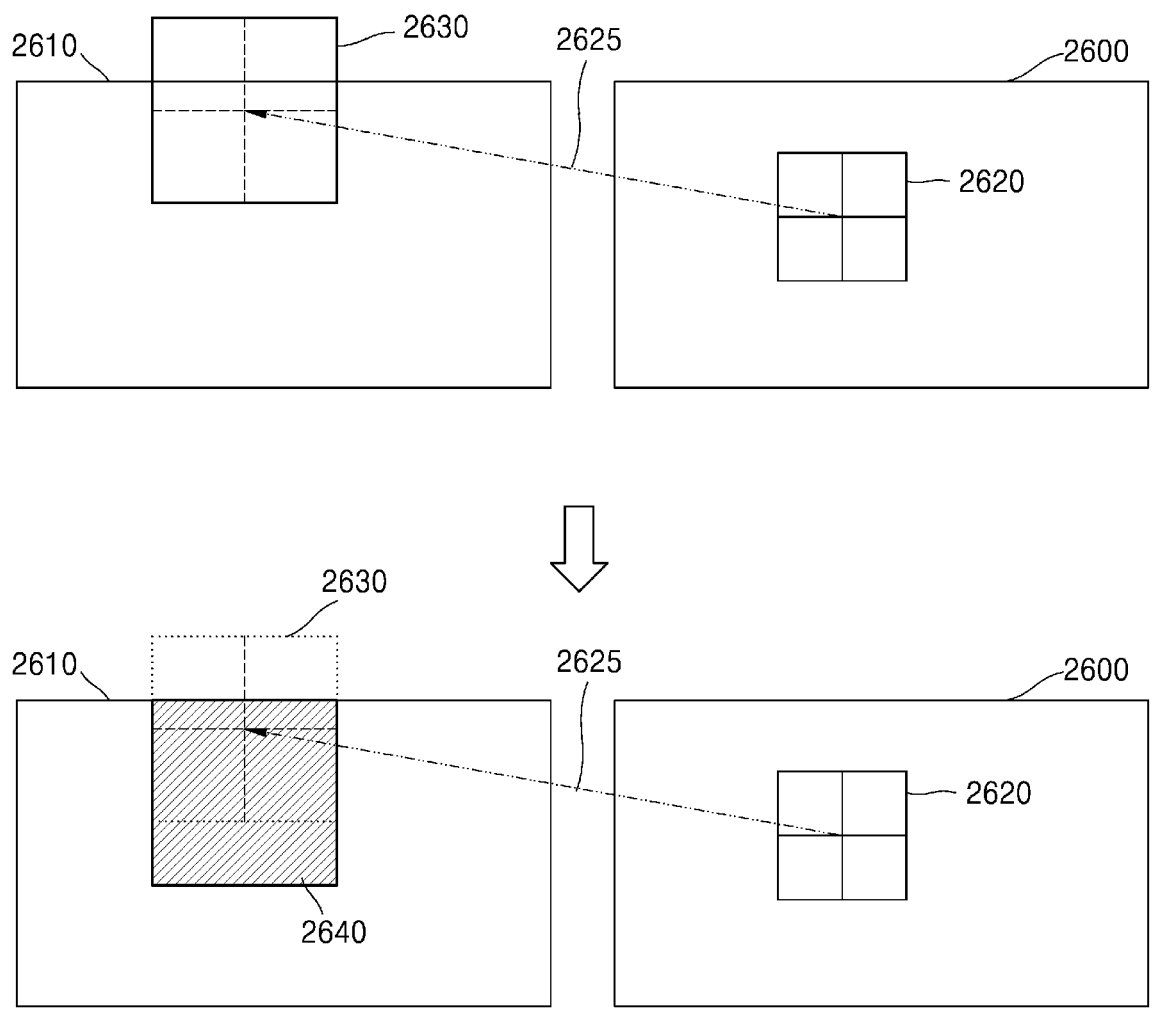
FIGS. 26, 27 and 28 are diagrams of a method, performed by a video decoding apparatus, of parallelly translating a reference area into a reference picture, when the reference area according to a motion vector of a current block in affine model-based inter prediction includes a boundary of a reference picture, according to another embodiment.
Figure 27:
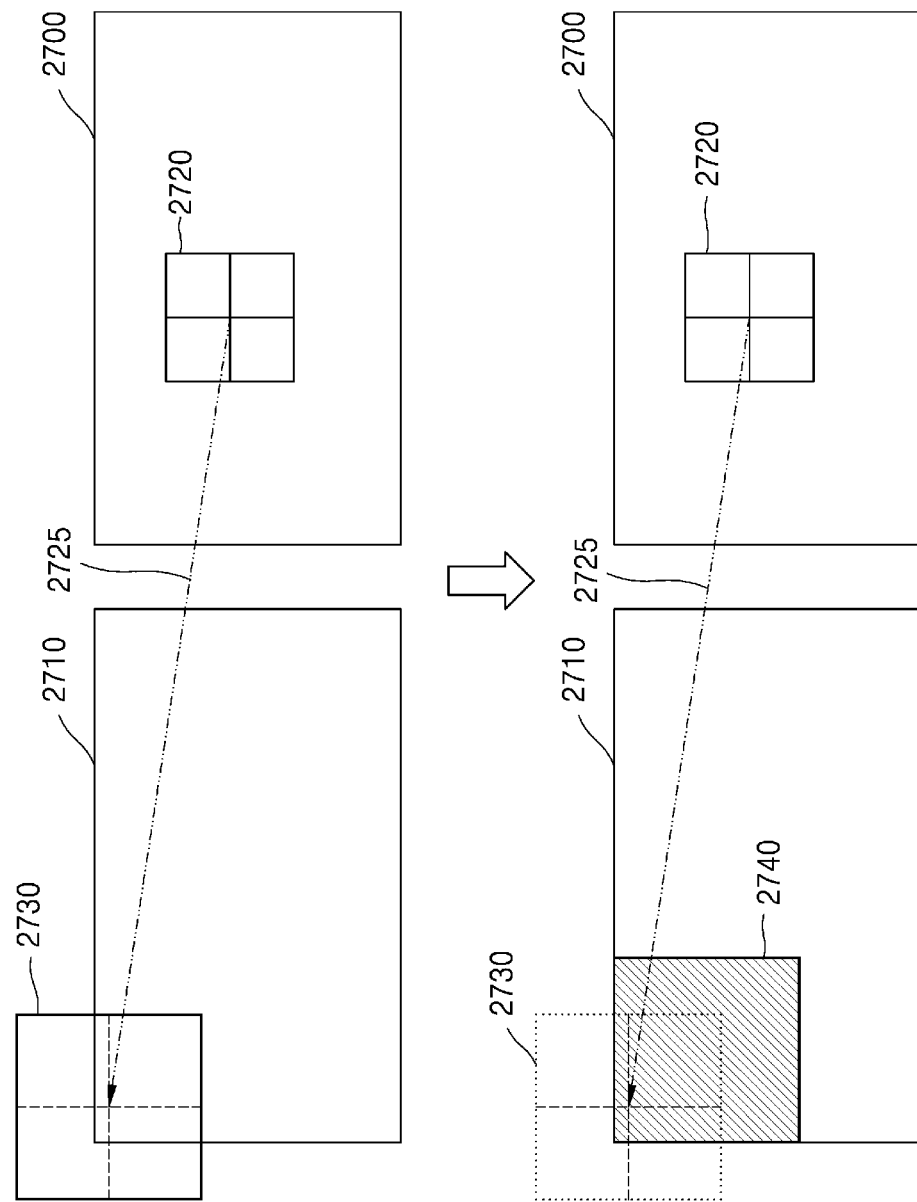
Figure 28:
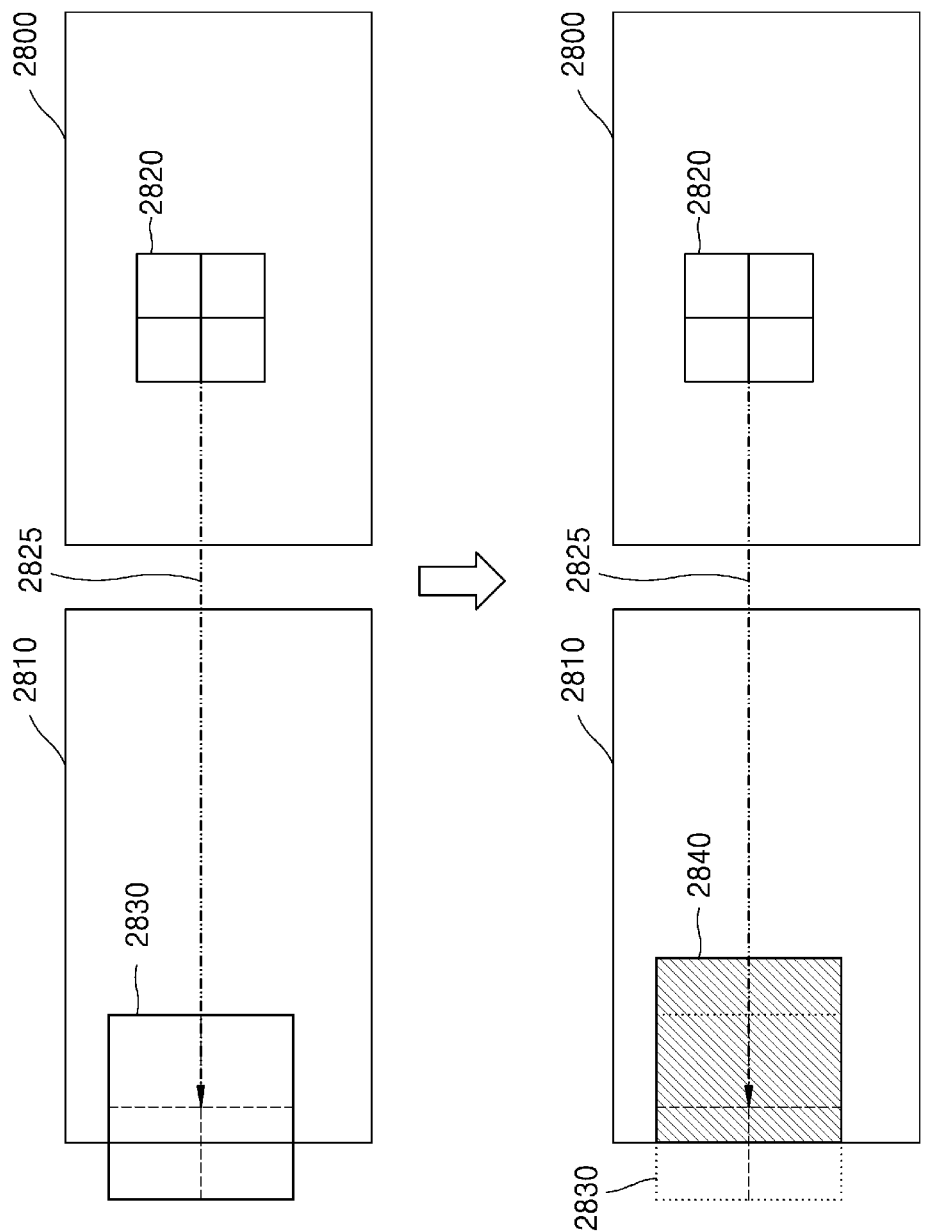

FIGS. 26, 27 and 28 are diagrams of a method, performed by a video decoding apparatus 1700, of parallelly translating a reference area into a reference picture, when the reference area according to a motion vector of a current block in affine model-based inter prediction includes a boundary of a reference picture, according to another embodiment.

With reference to FIG. 26, when an original reference area 2630 indicated by a central motion vector 2625 of a current block 2620 of a current picture 2600 includes an upper boundary of a reference picture 2610, the video decoding apparatus 1700 according to an embodiment may determine a final reference area 2640 by vertically parallelly translating an upper boundary of the original reference area 2630 to the upper boundary of the reference picture 2610 and vertically parallelly translating a lower boundary of the original reference area 2630 according to a distance and a direction in which the upper boundary of the original reference area 2630 is parallelly translated. Based on this operation, all samples of the final reference area 2640 may be included in the reference picture 2610, and a size of the final reference area 2640 may be the same as a size of the original reference area 2630. To this end, when a y coordinate of the upper boundary of the original reference area 2630 is less than a y coordinate (an original point) of the upper boundary of the reference picture 2610, the video decoding apparatus 1700 according to an embodiment may change a y coordinate of an upper boundary of the final reference area 2640 to be the same as the y coordinate (the original point) of the upper boundary of the reference picture 2610 and change a y coordinate of a lower boundary of the final reference area 2640 to a value obtained by adding a height of the reference area (a reference range) to the y coordinate (the original point) of the upper boundary of the reference picture 2610.

A similar operation may be performed by the video encoding apparatus 1900 according to an embodiment. With reference to FIG. 26, when a y coordinate of the upper boundary of the original reference area 2630 indicated by the motion vector 2625 of the current block 2620 is less than a y coordinate (an original point) of the upper boundary of the reference picture 2610, the video encoding apparatus 1900 according to an embodiment may change a y coordinate of an upper boundary of the final reference area 2640 to be the same as the y coordinate (the original point) of the upper boundary of the reference picture 2610 and change a y coordinate of a lower boundary of the final reference area 2640 to a value obtained by adding a height of the reference area (a reference range) to the y coordinate (the original point) of the upper boundary of the reference picture 2610.

With reference to FIG. 27, when an original reference area 2730 indicated by a central motion vector 2725 of a current block 2720 of a current picture 2700 includes an upper boundary and a left boundary of a reference picture 2710 (includes an upper left edge of the reference picture 2710), the video decoding apparatus 1700 according to an embodiment may determine a final reference area 2740 by vertically parallelly translating an upper boundary of the original reference area 2730 to the upper boundary of the reference picture 2710, vertically parallelly translating a lower boundary of the original reference area 2730 according to a distance and a direction in which the upper boundary of the original reference area 2730 is parallelly translated, horizontally parallelly translating a left boundary of the original reference area 2730 to the left boundary of the reference picture 2710, and horizontally parallelly translating a right boundary of the original reference area 2730 according to a distance and a direction in which the left boundary of the original reference area 2730 is parallelly translated Based on this operation, all samples of the final reference area 2740 may be included in the reference picture 2710, and a size of the final reference area 2740 may be the same as a size of the original reference area 2730. To this end, when a y coordinate of the upper boundary of the original reference area 2730 is less than a y coordinate (an original point) of the upper boundary of the reference picture 2710, and an x coordinate of the left boundary of the original reference area 2730 is less than an x coordinate (an original point) of the left boundary of the reference picture 2710, the video decoding apparatus 1700 according to an embodiment may change a y coordinate of an upper boundary of the final reference area 2740 to be the same as the y coordinate (the original point) of the upper boundary of the reference picture 2710 and change a y coordinate of a lower boundary of the final reference area 2740 to a value obtained by adding a height of the reference area (a reference range) to the y coordinate (the original point) of the upper boundary of the reference picture 2710 and may change an x coordinate of a left boundary of the final reference area 2740 to be the same as the x coordinate (the original point) of the left boundary of the reference picture 2710 and change an x coordinate of a right boundary of the final reference area 2740 to a value obtained by adding a width of the reference area (a reference range) to the x coordinate (the original point) of the left boundary of the reference picture 2710.

A similar operation may be performed by the video encoding apparatus 1900 according to an embodiment. With reference to FIG. 27, when a y coordinate of the upper boundary of the original reference area 2730 indicated by the motion vector 2725 of the current block 2720 is less than a y coordinate (an original point) of the upper boundary of the reference picture 2710, and an x coordinate of the left boundary of the original reference area 2730 is less than an x coordinate (an original point) of the left boundary of the reference picture 2710, the video encoding apparatus 1900 according to an embodiment may change a y coordinate of an upper boundary of the final reference area 2740 to be the same as the y coordinate (the original point) of the upper boundary of the reference picture 2710 and change a y coordinate of a lower boundary of the final reference area 2740 to a value obtained by adding a height of the reference area (a reference range) to the y coordinate (the original point) of the upper boundary of the reference picture 2710 and may change an x coordinate of a left boundary of the final reference area 2740 to be the same as the x coordinate (the original point) of the left boundary of the reference picture 2710 and change an x coordinate of a right boundary of the final reference area 2740 to a value obtained by adding a width of the reference area (a reference range) to the x coordinate (the original point) of the left boundary of the reference picture 2710.

With reference to FIG. 28, when an original reference area 2830 indicated by a central motion vector 2825 of a current block 2820 of a current picture 2800 includes a left boundary of a reference picture 2810, the video decoding apparatus 1700 according to an embodiment may determine a final reference area 2840 by horizontally parallelly translating a left boundary of the original reference area 2830 to the left boundary of the reference picture 2810 and horizontally parallelly translating a right boundary of the original reference area 2830 according to a distance and a direction in which the left boundary of the original reference area 2830 is parallelly translated. Based on this operation, all samples of the final reference area 2840 may be included in the reference picture 2810, and a size of the final reference area 2840 may be the same as a size of the original reference area 2830. To this end, when an x coordinate of the left boundary of the original reference area 2830 is less than an x coordinate (an original point) of the left boundary of the reference picture 2810, the video decoding apparatus 1700 according to an embodiment may change an x coordinate of a left boundary of the final reference area 2840 to be the same as the x coordinate (the original point) of the left boundary of the reference picture 2810 and change an x coordinate of a right boundary of the final reference area 2840 to a value obtained by adding a width of the reference area (a reference range) to the x coordinate (the original point) of the left boundary of the reference picture 2810.

A similar operation may be performed by the video encoding apparatus 1900 according to an embodiment. With reference to FIG. 28, when an x coordinate of the left boundary of the original reference area 2830 indicated by the motion vector 2825 of the current block 2820 is less than an x coordinate (an original point) of the left boundary of the reference picture 2810, the video encoding apparatus 1900 according to an embodiment may change an x coordinate of a left boundary of the final reference area 2840 to be the same as the x coordinate (the original point) of the left boundary of the reference picture 2810 and change an x coordinate of a right boundary of the final reference area 2840 to a value obtained by adding a width of the reference area (a reference range) to the x coordinate (the original point) of the left boundary of the reference picture 2810.

Although not shown in the drawing, when an original reference area indicated by a central motion vector of a current block of a current picture includes a lower boundary of a reference picture, the video decoding apparatus 1700 according to an embodiment may determine a final reference area by vertically parallelly translating a lower boundary of the original reference area to the lower boundary of the reference picture and vertically parallelly translating an upper boundary of the original reference area according to a distance and a direction in which the lower boundary of the original reference area is parallelly translated. Based on this operation, all samples of the final reference area may be included in the reference picture. To this end, when a y coordinate of the lower boundary of the original reference area is greater than a y coordinate of the lower boundary of the reference picture (a height of the reference picture), the video decoding apparatus 1700 according to an embodiment may change a y coordinate of a lower boundary of the final reference area to be the same as the y coordinate of the lower boundary of the reference picture (the height of the reference picture) and change a y coordinate of an upper boundary of the final reference area to a value obtained by subtracting a height of the reference area (a reference range) from the y coordinate of the lower boundary of the reference picture (the height of the reference picture).

Similarly, when a y coordinate of the lower boundary of the original reference area indicated by a motion vector of the current block 2620 is greater than a y coordinate of the lower boundary of the reference picture (a height of the reference picture), the video encoding apparatus 1900 according to an embodiment may change a y coordinate of a lower boundary of the final reference area to be the same as the y coordinate of the lower boundary of the reference picture (the height of the reference picture) and change a y coordinate of an upper boundary of the final reference area to a value obtained by subtracting a height of the reference area (a reference range) from the y coordinate of the lower boundary of the reference picture (the height of the reference picture).

Although not shown in the drawing, when an original reference area indicated by a central motion vector of a current block of a current picture includes a right boundary of a reference picture, the video decoding apparatus 1700 according to an embodiment may determine a final reference area by horizontally parallelly translating a right boundary of the original reference area to the right boundary of the reference picture and horizontally parallelly translating a left boundary of the original reference area according to a distance and a direction in which the right boundary of the original reference area is parallelly translated. Based on this operation, all samples of the final reference area may be included in the reference picture. To this end, when an x coordinate of the right boundary of the original reference area is greater than an x coordinate of the right boundary of the reference picture (a width of the reference picture), the video decoding apparatus 1700 according to an embodiment may change an x coordinate of a right boundary of the final reference area to be the same as the x coordinate of the right boundary of the reference picture (the width of the reference picture) and change an x coordinate of a left boundary of the final reference area to a value obtained by subtracting a width of the reference area (a reference range) from the x coordinate of the right boundary of the reference picture (the width of the reference picture).

Similarly, when an x coordinate of the right boundary of the original reference area indicated by a motion vector of a current block is greater than an x coordinate of the right boundary of the reference picture (a width of the reference picture), the video encoding apparatus 1900 according to an embodiment may change an x coordinate of a right boundary of the final reference area to be the same as the x coordinate of the right boundary of the reference picture (the width of the reference picture) and change an x coordinate of a left boundary of the final reference area to a value obtained by subtracting a width of the reference area (a reference range) from the x coordinate of the right boundary of the reference picture (the width of the reference picture).

Although not shown in the drawing, when an original reference area indicated by a central motion vector of a current block of a current picture 2700 includes a lower boundary and a right boundary of a reference picture (includes a lower right edge of the reference picture), the video decoding apparatus 1700 according to an embodiment may determine a final reference area by vertically parallelly translating a lower boundary of the original reference area to the lower boundary of the reference picture and vertically parallelly translating an upper boundary of the original reference area according to a distance and a direction in which the lower boundary of the original reference area is parallelly translated and horizontally parallelly translating a right boundary of the original reference area to the right boundary of the reference picture and horizontally parallelly translating a left boundary of the original reference area according to a distance and a direction in which the right boundary of the original reference area is parallelly translated. Based on this operation, all samples of the final reference area may be included in the reference picture, and a size of the final reference area may be the same as a size of the original reference area. To this end, when a y coordinate of the lower boundary of the original reference area is greater than a y coordinate of the lower boundary of the reference picture (a height of the reference picture), and an x coordinate of the right boundary of the original reference area is greater than an x coordinate of the right boundary of the reference picture (a width of the reference picture), the video decoding apparatus 1700 according to an embodiment may change a y coordinate of a lower boundary of the final reference area to be the same as the y coordinate of the lower boundary of the reference picture (the height of the reference picture) and change a y coordinate of an upper boundary of the final reference area to a value obtained by subtracting a height of the reference area (a reference range) from the y coordinate of the lower boundary of the reference picture (the height of the reference picture) and may change an x coordinate of a right boundary of the final reference area to be the same as the x coordinate of the right boundary of the reference picture (the width of the reference picture) and change an x coordinate of a left boundary of the final reference area to a value obtained by subtracting a width of the reference area (a reference range) from the x coordinate of the right boundary of the reference picture (the width of the reference picture).

Similarly, when a y coordinate of the lower boundary of the original reference area indicated by a motion vector of a current block is greater than a y coordinate of the lower boundary of the reference picture (a height of the reference picture), and an x coordinate of the right boundary of the original reference area is greater than an x coordinate of the right boundary of the reference picture (a width of the reference picture), the video encoding apparatus 1900 according to an embodiment may change a y coordinate of a lower boundary of the final reference area to be the same as the y coordinate of the lower boundary of the reference picture (the height of the reference picture) and change a y coordinate of an upper boundary of the final reference area to a value obtained by subtracting a height of the reference area (a reference range) from the y coordinate of the lower boundary of the reference picture 2710 (the height of the reference picture and may change an x coordinate of a right boundary of the final reference area 2740 to be the same as the x coordinate of the right boundary of the reference picture 2710 (the width of the reference picture) and change an x coordinate of a left boundary of the final reference area 2740 to a value obtained by subtracting a width of the reference area (a reference range) from the x coordinate of the right boundary of the reference picture 2710 (the width of the reference picture?).

Figure 30:
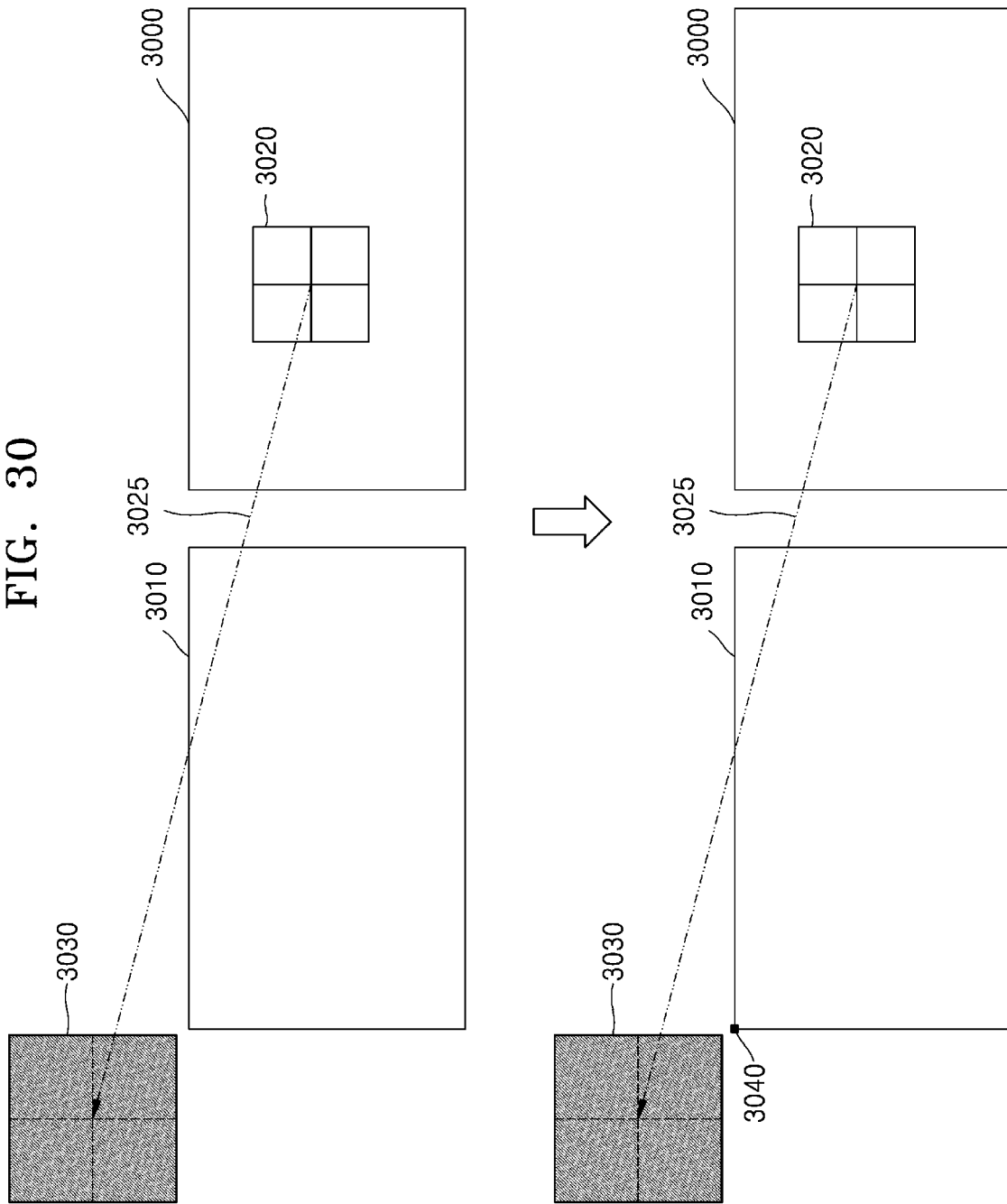

FIGS. 29 and 30 are diagrams of a method, performed by the video decoding apparatus 1700, of translating a reference area onto a boundary or a point of a reference picture, when the reference area according to a motion vector of a current block in affine model-based inter prediction deviates from the reference picture, according to an embodiment.

With reference to FIG. 29, when an original reference area 2930 indicated by a central motion vector 2925 of a current block 2920 of a current picture 2900 deviates from an upper boundary of a reference picture 2910, the video decoding apparatus 1700 according to an embodiment may determine a final reference area 2940 by vertically parallelly translating both of an upper boundary and a lower boundary of the original reference area 2930 to the upper boundary of the reference picture 2910. Based on this operation, while all samples of the final reference area 2940 may be included in the reference picture 2910, the final reference area 2940 may be a straight line on an upper boundary line of the reference picture 2910 and may have the same width as the original reference area 2910. To this end, when a y coordinate of the upper boundary of the original reference area 2930 is less than a y coordinate (an original point) of the upper boundary of the reference picture 2910, and a y coordinate of the lower boundary of the original reference area 2930 is less than the y coordinate (the original point) of the upper boundary of the reference picture 2910, the video decoding apparatus 1700 according to an embodiment may change a y coordinate of an upper boundary and a y coordinate of a lower boundary of the final reference area 2940 to be the same as the y coordinate (the original point) of the upper boundary of the reference picture 2910. That is, by clipping the y coordinate of the upper boundary and the y coordinate of the lower boundary of the original reference area 2930 to the original point, the final reference area 2940 may be determined to be located on the upper boundary line of the reference picture 2910.

A similar operation may be performed by the video encoding apparatus 1900 according to an embodiment. With reference to FIG. 29, when a y coordinate of the upper boundary of the original reference area 2930 indicated by the motion vector 2925 of the current block 2920 is less than a y coordinate (an original point) of the upper boundary of the reference picture 2910, and a y coordinate of the lower boundary of the original reference area 2930 is less than the y coordinate (the original point) of the upper boundary of the reference picture 2910, the video encoding apparatus 1900 according to an embodiment may change a y coordinate of an upper boundary and a y coordinate of a lower boundary of the final reference area 2940 to be the same as the y coordinate (the original point) of the upper boundary of the reference picture 2910.

With reference to FIG. 30, when an original reference area 3030 indicated by a central motion vector 3025 of a current block 3020 of a current picture 3000 deviates from an upper boundary and a left boundary of a reference picture 3010 (deviates from an upper left edge of the reference picture 3010), the video decoding apparatus 1700 according to an embodiment may determine a final reference area 3040 by vertically parallelly translating both of an upper boundary and a lower boundary of the original reference area 3030 to the upper boundary of the reference picture 3010 and horizontally parallelly translating both of a left boundary and a right boundary of the original reference area 3030 to the left boundary of the reference picture 3010. Based on this operation, while all samples of the final reference area 3040 may be included in the reference picture 3010, the final reference area 3040 may be a point on the upper left edge of the reference picture 3010. To this end, when a y coordinate of the upper boundary of the original reference area 3030 is less than a y coordinate (an original point) of the upper boundary of the reference picture 3010, a y coordinate of the lower boundary of the original reference area 3030 is less than the y coordinate (the original point) of the upper boundary of the reference picture 3010, an x coordinate of the left boundary of the original reference area 3030 is less than an x coordinate (an original point) of the left boundary of the reference picture 3010, and an x coordinate of the right boundary of the original reference area 3030 is less than the x coordinate (the original point) of the left boundary of the reference picture 3010, the video decoding apparatus 1700 according to an embodiment may change a y coordinate of an upper boundary and a y coordinate of a lower boundary of the final reference area 3040 to be the same as the y coordinate (the original point) of the upper boundary of the reference picture 3010 and may change an x coordinate of a left boundary and an x coordinate of a right boundary of the final reference area 3040 to be the same as the x coordinate (the original point) of the left boundary of the reference picture 3010. That is, by clipping the y coordinate of the upper boundary and the y coordinate of the lower boundary of the original reference area 3030 to the original point and clipping the x coordinate of the left boundary and the x coordinate of the right boundary of the original reference area 3030 to the original point, the final reference area 3040 may be determined to be located on a point of the upper left edge of the reference picture 3010.

A similar operation may be performed by the video encoding apparatus 1900 according to an embodiment. With reference to FIG. 30, when a y coordinate of the upper boundary of the original reference area 3030 indicated by the motion vector 3025 of the current block 3020 is less than a y coordinate (an original point) of the upper boundary of the reference picture 3010, a y coordinate of the lower boundary of the original reference area 3030 is less than the y coordinate (the original point) of the upper boundary of the reference picture 3010, an x coordinate of the left boundary of the original reference area 3030 is less than an x coordinate (an original point) of the left boundary of the reference picture 3010, and an x coordinate of the right boundary of the original reference area 3030 is less than the x coordinate (the original point) of the left boundary of the reference picture 3010, the video encoding apparatus 1900 according to an embodiment may change a y coordinate of an upper boundary and a y coordinate of a lower boundary of the final reference area 3040 to be the same as the y coordinate (the original point) of the upper boundary of the reference picture 3010 and may change an x coordinate of a left boundary and an x coordinate of a right boundary of the final reference area 3040 to be the same as the x coordinate (the original point) of the left boundary of the reference picture 3010.

Although not shown in the drawing, when an original reference area indicated by a central motion vector of a current block of a current picture deviates from a left boundary of a reference picture, the video decoding apparatus 1700 according to an embodiment may determine a final reference area 2940 by horizontally parallelly translating both of a left boundary and a right boundary of the original reference area to the left boundary of the reference picture. Based on this operation, while all samples of the final reference area may be included in the reference picture, the final reference area may be a straight line on a left boundary line of the reference picture and may have the same height as the original reference area. To this end, when an x coordinate of the left boundary of the original reference area is less than an x coordinate (an original point) of the left boundary of the reference picture, and an x coordinate of the right boundary of the original reference area is less than the x coordinate (the original point) of the left boundary of the reference picture, the video decoding apparatus 1700 according to an embodiment may change an x coordinate of a left boundary and an x coordinate of a right boundary of the final reference area to be the same as the x coordinate (the original point) of the left boundary of the reference picture. That is, by clipping the x coordinate of the left boundary and the x coordinate of the right boundary of the original reference area to the original point, the final reference area may be determined to be located on the left boundary line of the reference picture.

Similarly, when an x coordinate of the left boundary of the original reference area indicated by a motion vector of a current block is less than an x coordinate (an original point) of the left boundary of the reference picture, and an x coordinate of the right boundary of the original reference area is less than the x coordinate (the original point) of the left boundary of the reference picture, the video encoding apparatus 1900 according to an embodiment may change an x coordinate of a left boundary and an x coordinate of a right boundary of the final reference area to be the same as the x coordinate (the original point) of the left boundary of the reference picture.

Similarly to the example of FIG. 29, when an original reference area indicated by a central motion vector of a current block of a current picture deviates from a lower boundary of a reference picture, that is, when both of a y coordinate of an upper boundary and a y coordinate of a lower boundary of the original reference area are greater than a y coordinate of the lower boundary of the reference picture (a height of the reference picture), the video decoding apparatus 1700 according to an embodiment may determine a final reference area to be on a lower boundary line of the reference picture by clipping the y coordinate of the upper boundary and the y coordinate of the lower boundary of the original reference area to the height of the reference picture.

Similarly to the example of FIG. 30, when an original reference area indicated by a central motion vector of a current block of a current picture deviates from a lower right edge of a reference picture, that is, when both of a y coordinate of an upper boundary and a y coordinate of a lower boundary of the original reference area are greater than a y coordinate of a lower boundary of the reference picture (a height of the reference picture), and both of an x coordinate of a left boundary and an x coordinate of a right boundary of the original reference area are greater than an x coordinate of a right boundary of the reference picture (a width of the reference picture), the video decoding apparatus 1700 according to an embodiment may determine a final reference area to be on a point of the lower right edge of the reference picture by clipping the y coordinate of the upper boundary and the y coordinate of the lower boundary of the original reference area to the height of the reference picture and clipping the x coordinate of the left boundary and the x coordinate of the right boundary of the original reference area to the width of the reference picture.

Similarly to the example described above, when an original reference area indicated by a central motion vector of a current block of a current picture deviates from a right boundary of a reference picture, that is, when both of an x coordinate of left boundary and an x coordinate of a right boundary of the original reference area are greater than an x coordinate of the right boundary of the reference picture (a width of the reference picture), the video decoding apparatus 1700 according to an embodiment may determine a final reference area to be on a right boundary line of the reference picture by clipping the x coordinate of the left boundary and the x coordinate of the right boundary of the original reference area to the width of the reference picture.

Figure 31:
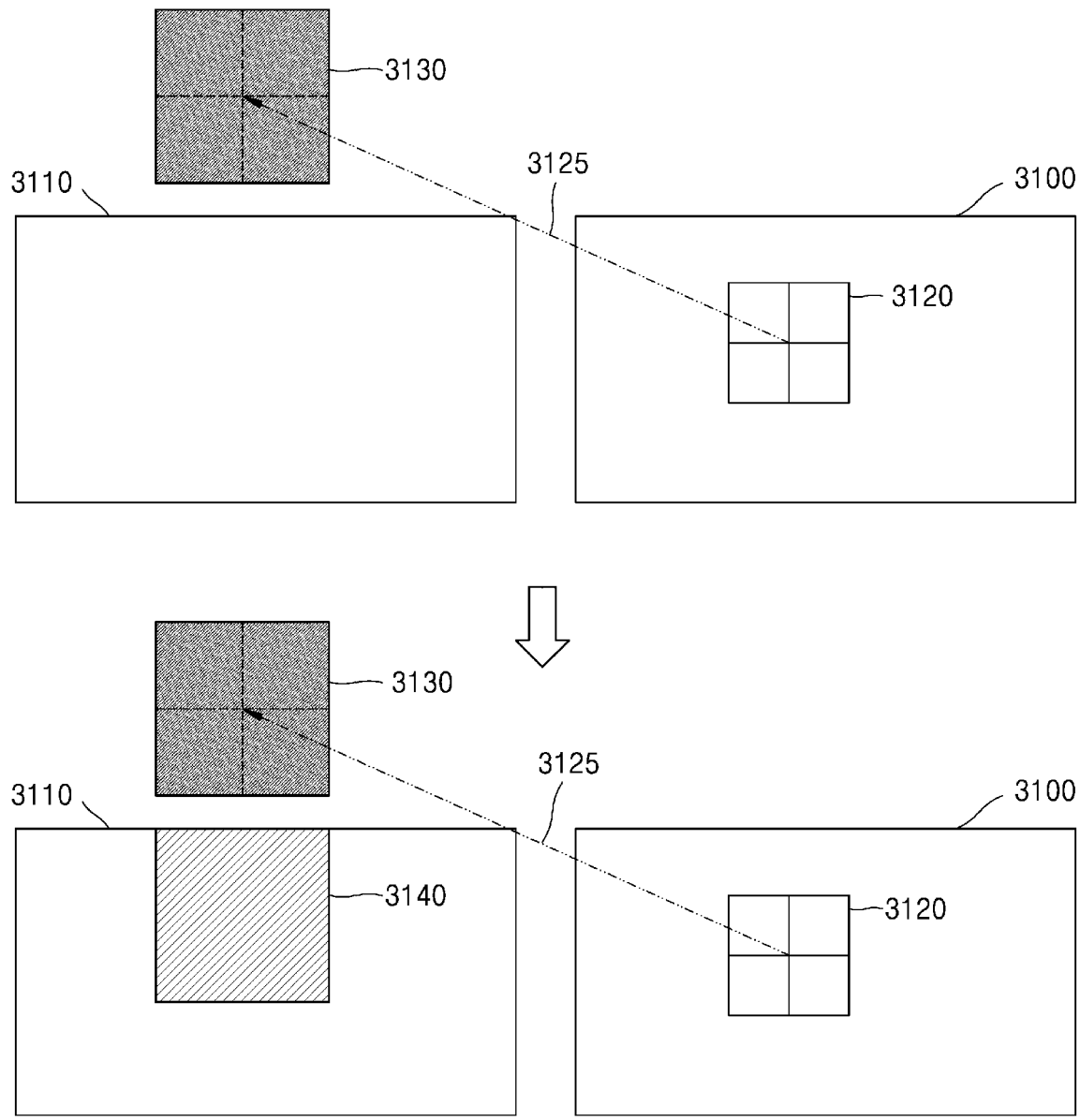
FIGS. 31, 32 and 33 are diagrams of a method, performed by a video decoding apparatus, of translating a reference area into a reference picture, when the reference area according to a motion vector of a current block in affine model-based inter prediction deviates from the reference picture, according to another embodiment.
Figure 32:
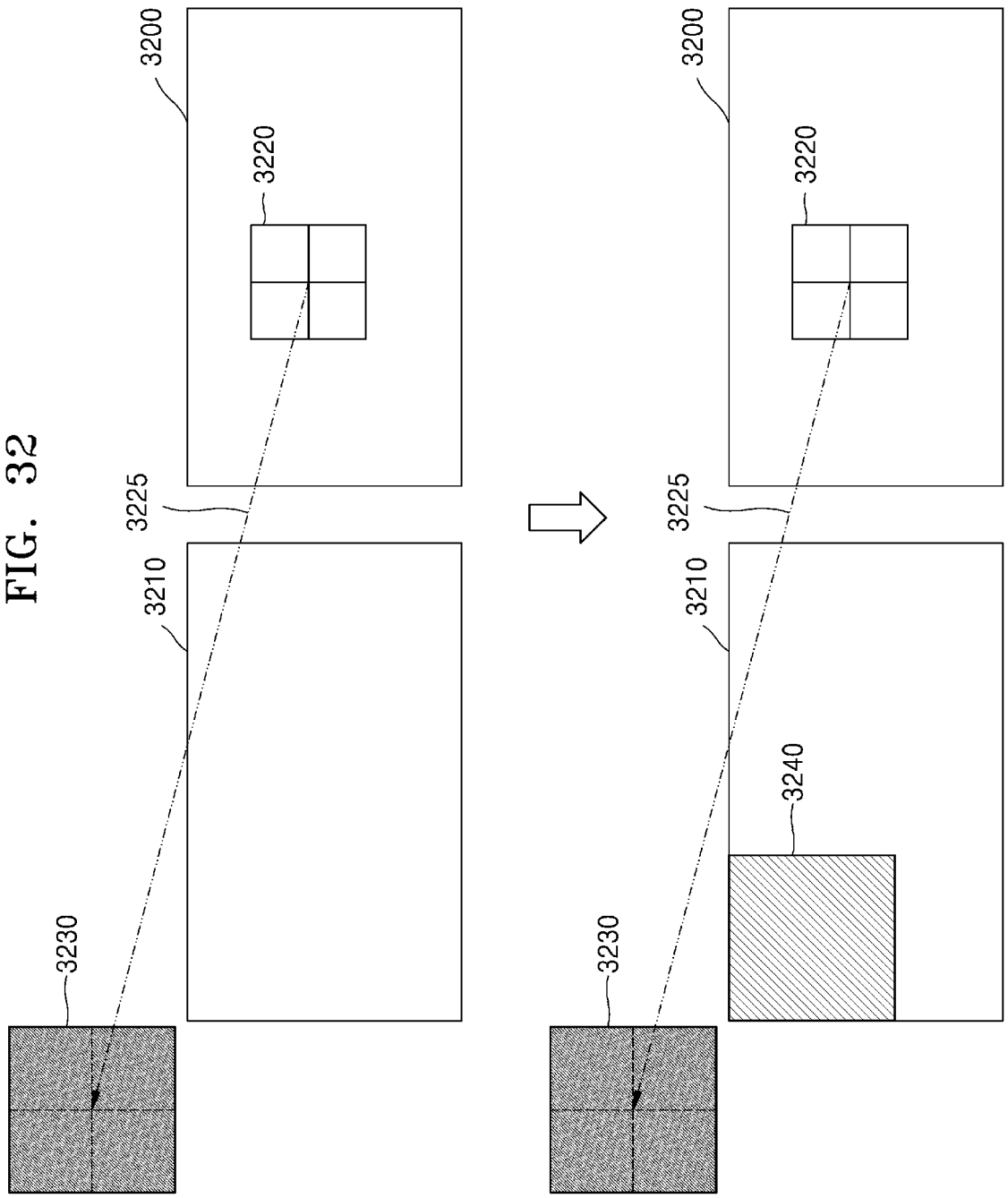
Figure 33:
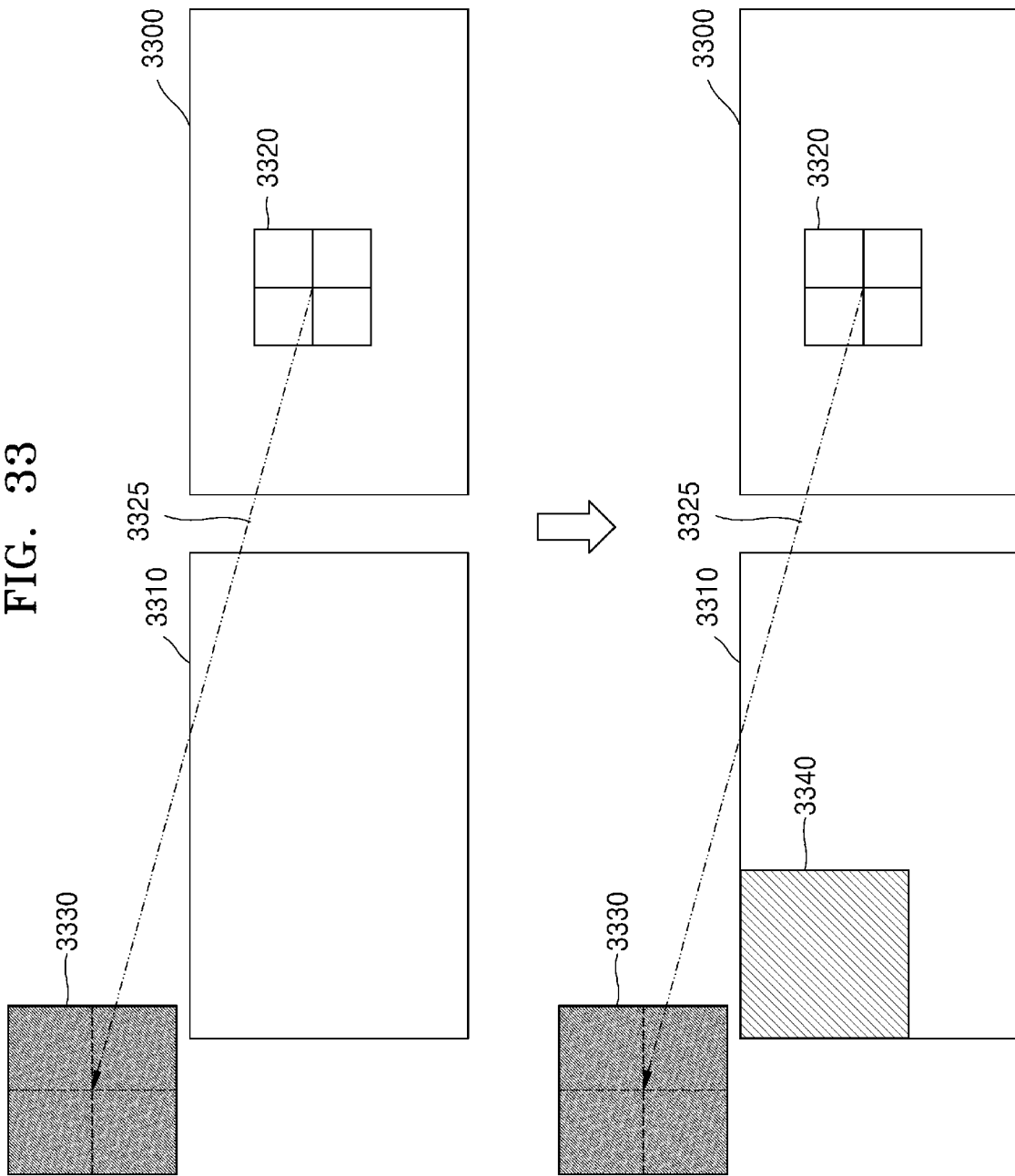

FIGS. 31, 32 and 33 are diagrams of a method, performed by the video decoding apparatus 1700, of translating a reference area into a reference picture, when the reference area according to a motion vector of a current block in affine model-based inter prediction deviates from the reference picture, according to another embodiment.

With reference to FIG. 31, when an original reference area 3130 indicated by a central motion vector 3125 of a current block 3120 of a current picture 3100 deviates from an upper boundary of a reference picture 3110, the video decoding apparatus 1700 according to an embodiment may determine a final reference area 3140 by vertically parallelly translating an upper boundary of the original reference area 3130 to the upper boundary of the reference picture 3110 and vertically parallelly translating a lower boundary of the original reference area 3130 according to a distance and a direction in which the upper boundary of the original reference area 3130 is parallelly translated. Based on this operation, all samples of the final reference area 3140 may be included in the reference picture 3110. To this end, when both of a y coordinate of the upper boundary and a y coordinate of the lower boundary of the original reference area 3130 are less than a y coordinate (an original point) of the upper boundary of the reference picture 3110, the video decoding apparatus 1700 according to an embodiment may change a y coordinate of an upper boundary of the final reference area 3140 to be the same as the y coordinate (the original point) of the upper boundary of the reference picture 3110 and change a y coordinate of a lower boundary of the final reference area 3140 to a value obtained by adding a height of the reference area (a reference range) to the y coordinate (the original point) of the upper boundary of the reference picture 3110.

A similar operation may be performed by the video encoding apparatus 1900 according to an embodiment. With reference to FIG. 31, when both of a y coordinate of the upper boundary and a y coordinate of the lower boundary of the original reference area 3130 indicated by the motion vector 3125 of the current block 3120 are less than a y coordinate (an original point) of the upper boundary of the reference picture 3110, the video encoding apparatus 1900 according to an embodiment may change a y coordinate of an upper boundary of the final reference area 3140 to be the same as the y coordinate (the original point) of the upper boundary of the reference picture 3110 and change a y coordinate of a lower boundary of the final reference area 3140 to a value obtained by adding a height of the reference area (a reference range) to the y coordinate (the original point) of the upper boundary of the reference picture 3110.

With reference to FIG. 32, when an original reference area 3230 indicated by a central motion vector 3225 of a current block 3220 of a current picture 3200 deviates from an upper boundary and a left boundary of a reference picture 3210 (deviates from an upper left edge of the reference picture 3210), the video decoding apparatus 1700 according to an embodiment may determine a final reference area 3240 by vertically parallelly translating an upper boundary of the original reference area 3230 to the upper boundary of the reference picture 3210 and vertically parallelly translating a lower boundary of the original reference area 3230 according to a distance and a direction in which the upper boundary of the original reference area 3230 is parallelly translated and horizontally parallelly translating a left boundary of the original reference area 3230 to the left boundary of the reference picture 3210 and horizontally parallelly translating a right boundary of the original reference area 3230 according to a distance and a direction in which the left boundary of the original reference area 3230 is parallelly translated. Based on this operation, all samples of the final reference area 3240 may be included in the reference picture 3210, and a size of the original reference area 3230 and a size of the final reference area 3240 may be the same. To this end, when both of a y coordinate of the upper boundary and a y coordinate of the lower boundary of the original reference area 3230 are less than a y coordinate (an original point) of the upper boundary of the reference picture 3210, and both of an x coordinate of the left boundary and an x coordinate of the right boundary of the original reference area 3230 are less than an x coordinate (an original point) of the left boundary of the reference picture 3210, the video decoding apparatus 1700 according to an embodiment may change a y coordinate of an upper boundary of the final reference area 3240 to be the same as the y coordinate (the original point) of the upper boundary of the reference picture 3210, change a y coordinate of a lower boundary of the final reference area 3240 to a value obtained by adding a height of the reference area (a reference range) to the y coordinate (the original point) of the upper boundary of the reference picture 3210, change an x coordinate of a left boundary of the final reference area 3240 to be the same as the x coordinate (the original point) of the left boundary of the reference picture 3210, and change an x coordinate of a right boundary of the final reference area 3240 to a value obtained by adding a width of the reference area (a reference range) to the x coordinate (the original point) of the left boundary of the reference picture 3210.

A similar operation may be performed by the video encoding apparatus 1900 according to an embodiment. With reference to FIG. 32, when both of a y coordinate of the upper boundary and a y coordinate of the lower boundary of the original reference area 3230 indicated by the motion vector 3225 of the current block 3220 are less than a y coordinate (an original point) of the upper boundary of the reference picture 3210, and both of an x coordinate of the left boundary and an x coordinate of the right boundary of the original reference area 3230 are less than an x coordinate (an original point) of the left boundary of the reference picture 3210, the video encoding apparatus 1900 according to an embodiment may change a y coordinate of an upper boundary of the final reference area 3240 to be the same as the y coordinate (the original point) of the upper boundary of the reference picture 3210, change a y coordinate of a lower boundary of the final reference area 3240 to a value obtained by adding a height of the reference area (a reference range) to the y coordinate (the original point) of the upper boundary of the reference picture 3210, change an x coordinate of a left boundary of the final reference area 3240 to be the same as the x coordinate (the original point) of the left boundary of the reference picture 3210, and change an x coordinate of a right boundary of the final reference area 3240 to a value obtained by adding a width of the reference area (a reference range) to the x coordinate (the original point) of the left boundary of the reference picture 3210.

With reference to FIG. 33, when an original reference area 3330 indicated by a central motion vector 3325 of a current block 3320 of a current picture 3300 deviates from an upper boundary of a reference picture 3310 and includes a left boundary of the reference picture 3310, the video decoding apparatus 1700 according to an embodiment may determine a final reference area 3340 by vertically parallelly translating an upper boundary of the original reference area 3330 to the upper boundary of the reference picture 3310, vertically parallelly translating a lower boundary of the original reference area 3330 according to a distance and a direction in which the upper boundary of the original reference area 3330 is parallelly translated, horizontally parallelly translating a left boundary of the original reference area 3330 to the left boundary of the reference picture 3310, and horizontally parallelly translating a right boundary of the original reference area 3330 according to a distance and a direction in which the left boundary of the original reference area 3330 is parallelly translated. Based on this operation, all samples of the final reference area 3340 may be included in the reference picture 3310, and a size of the original reference area 3330 and a size of the final reference area 3340 may be the same. To this end, when both of a y coordinate of the upper boundary and a y coordinate of the lower boundary of the original reference area 3330 are less than a y coordinate (an original point) of the upper boundary of the reference picture 3310, an x coordinate of the left boundary of the original reference area 3330 is less than an x coordinate (an original point) of the left boundary of reference picture 3310, and an x coordinate of the right boundary of the original reference area 3330 is greater than the x coordinate (the original point) of the left boundary of the reference picture 3310, the video decoding apparatus 1700 according to an embodiment may change a y coordinate of an upper boundary of the final reference area 3340 to be the same as the y coordinate (the original point) of the upper boundary of the reference picture 3310, change a y coordinate of a lower boundary of the final reference area 3340 to a value obtained by adding a height of the reference area (a reference range) to the y coordinate (the original point) of the upper boundary of the reference picture 3310, change an x coordinate of a left boundary of the final reference area 3340 to be the same as the x coordinate (the original point) of the left boundary of the reference picture 3310, and change an x coordinate of a right boundary of the final reference area 3340 to a value obtained by adding a width of the reference area (a reference range) to the x coordinate (the original point) of the left boundary of the reference picture 3310.

A similar operation may be performed by the video encoding apparatus 1900 according to an embodiment. With reference to FIG. 33, when both of a y coordinate of the upper boundary and a y coordinate of the lower boundary of the original reference area 3330 indicated by the motion vector 3325 of the current block 3320 are less than a y coordinate (an original point) of the upper boundary of the reference picture 3310, an x coordinate of the left boundary of the original reference area 3330 is less than an x coordinate (an original point) of the left boundary of reference picture 3310, and an x coordinate of the right boundary of the original reference area 3330 is greater than the x coordinate (the original point) of the left boundary of the reference picture 3310, the video encoding apparatus 1900 according to an embodiment may change a y coordinate of an upper boundary of the final reference area 3340 to be the same as the y coordinate (the original point) of the upper boundary of the reference picture 3310, change a y coordinate of a lower boundary of the final reference area 3340 to a value obtained by adding a height of the reference area (a reference range) to the y coordinate (the original point) of the upper boundary of the reference picture 3310, change an x coordinate of a left boundary of the final reference area 3340 to be the same as the x coordinate (the original point) of the left boundary of the reference picture 3310, and change an x coordinate of a right boundary of the final reference area 3340 to a value obtained by adding a width of the reference area (a reference range) to the x coordinate (the original point) of the left boundary of the reference picture 3310.

Although not shown in the drawing, when an original reference area indicated by a central motion vector of a current block of a current picture deviates from a lower boundary of a reference picture, the video decoding apparatus 1700 according to an embodiment may determine a final reference area by vertically parallelly translating a lower boundary of the original reference area to the lower boundary of the reference picture and vertically parallelly translating an upper boundary of an original reference area according to a distance and a direction in which the lower boundary of the original reference area is parallelly translated. Based on this operation, all samples of the final reference area may be included in the reference picture. To this end, when both of a y coordinate of the upper boundary and a y coordinate of the lower boundary of the original reference area are greater than a y coordinate of the lower boundary of the reference picture (a height of the reference picture), the video decoding apparatus 1700 according to an embodiment may change a y coordinate of a lower boundary of the final reference area to be the same as the y coordinate of the lower boundary of the reference picture (the height of the reference picture) and change a y coordinate of an upper boundary of the final reference area to a value obtained by subtracting a height of the reference area (a reference range) from the y coordinate of the lower boundary of the reference picture (the height of the reference picture).

A similar operation may be performed by the video encoding apparatus 1900 according to an embodiment. When both of a y coordinate of the lower boundary and a y coordinate of the upper boundary of the original reference area indicated by a motion vector of a current block are greater than a y coordinate of the lower boundary of the reference picture (a height of the reference picture), the video encoding apparatus 1900 according to an embodiment may change a y coordinate of a lower boundary of the final reference area to be the same as the y coordinate of the lower boundary of the reference picture (the height of the reference picture) and change a y coordinate of an upper boundary of the final reference area to a value obtained by subtracting a height of the reference area (a reference range) from the y coordinate of the lower boundary of the reference picture (the height of the reference picture).

Although not shown in the drawing, when an original reference area indicated by a central motion vector of a current block of a current picture deviates from a left boundary of a reference picture, the video decoding apparatus 1700 according to an embodiment may determine a final reference area by horizontally parallelly translating a left boundary of the original reference area to the left boundary of the reference picture and horizontally parallelly translating a right boundary of the original reference area according to a distance and a direction in which the left boundary of the original reference area is parallelly translated. Based on this operation, all samples of the final reference area may be included in the reference picture, and a size of the original reference area and a size of the final reference area may be the same. To this end, when both of an x coordinate of the left boundary and an x coordinate of the right boundary of the original reference area are less than an x coordinate (an original point) of the left boundary of the reference picture, the video decoding apparatus 1700 according to an embodiment may change an x coordinate of a left boundary of the final reference area to be the same as the x coordinate (the original point) of the left boundary of the reference picture and change an x coordinate of a right boundary of the final reference area to a value obtained by adding a width of the reference area (a reference range) to the x coordinate (the original point) of the left boundary of the reference picture.

A similar operation may be performed by the video encoding apparatus 1900 according to an embodiment. When both of an x coordinate of the left boundary and an x coordinate of the right boundary of the original reference area indicated by the motion vector of the current block are less than an x coordinate (an original point) of the left boundary of the reference picture, the video encoding apparatus 1900 according to an embodiment may change an x coordinate of a left boundary of the final reference area to be the same as the x coordinate (the original point) of the left boundary of the reference picture and change an x coordinate of a right boundary of the final reference area to a value obtained by adding a width of the reference area (a reference range) to the x coordinate (the original point) of the left boundary of the reference picture.

Although not shown in the drawing, when an original reference area indicated by a central motion vector of a current block of a current picture deviates from a right boundary of a reference picture, the video decoding apparatus 1700 according to an embodiment may determine a final reference area by horizontally parallelly translating a right boundary of the original reference area to the right boundary of the reference picture and horizontally parallelly translating a left boundary of the original reference area according to a distance and a direction in which the right boundary of the original reference area is parallelly translated. Based on this operation, all samples of the final reference area may be included in the reference picture, and a size of the original reference area and a size of the final reference area may be the same. To this end, when both of an x coordinate of the left boundary and an x coordinate of the right boundary of the original reference area are greater than an x coordinate of the right boundary of the reference picture (a width of the reference picture), the video decoding apparatus 1700 according to an embodiment may change an x coordinate of a right boundary of the final reference area to be the same as the x coordinate of the right boundary of the reference picture (the width of the reference picture) and change an x coordinate of a left boundary of the final reference area to a value obtained by subtracting a width of the reference area (a reference range) from the x coordinate of the right boundary of the reference picture (the width of the reference picture).

A similar operation may be performed by the video encoding apparatus 1900 according to an embodiment. When both of an x coordinate of the left boundary and an x coordinate of the right boundary of the original reference area indicated by the motion vector of the current block are greater than an x coordinate of the right boundary of the reference picture (a width of the reference picture), the video encoding apparatus 1900 according to an embodiment may change an x coordinate of a right boundary of the final reference area to be the same as the x coordinate of the right boundary of the reference picture (the width of the reference picture) and change an x coordinate of a left boundary of the final reference area to a value obtained by subtracting a width of the reference area (a reference range) from the x coordinate of the right boundary of the reference picture (the width of the reference picture).

Although not shown in the drawing, when an original reference area indicated by a central motion vector of a current block of a current picture deviates from a lower boundary and a right boundary of a reference picture (deviates from a lower right edge of the reference picture), the video decoding apparatus 1700 according to an embodiment may determine a final reference area by vertically parallelly translating a lower boundary of the original reference area to the lower boundary of the reference picture and vertically parallelly translating an upper boundary of the original reference area according to a distance and a direction in which the lower boundary of the original reference area is parallelly translated and horizontally parallelly translating a right boundary of the original reference area to the right boundary of the reference picture and horizontally parallelly translating a left boundary of the original reference area according to a distance and a direction in which the right boundary of the original reference area is parallelly translated. Based on this operation, all samples of the final reference area may be included in the reference picture, and a size of the original reference area and a size of the final reference area may be the same. To this end, when both of a y coordinate of the upper boundary and a y coordinate of the lower boundary of the original reference area are greater than a y coordinate of the lower boundary of the reference picture (a height of the reference picture), and both of an x coordinate of the left boundary and an x coordinate of the right boundary of the original reference area are greater than an x coordinate of the right boundary of the reference picture (a width of the reference picture), the video decoding apparatus 1700 according to an embodiment may change a y coordinate of a lower boundary of the final reference area to be the same as the y coordinate of the lower boundary of the reference picture (the height of the reference picture) and change a y coordinate of an upper boundary of the final reference area to a value obtained by subtracting a height of the reference area (a reference range) from the y coordinate of the lower boundary of the reference picture (the height of the reference picture) and may change an x coordinate of a right boundary of the final reference area to be the same as the x coordinate of the right boundary of the reference picture (the width of the reference picture) and change an x coordinate of a left boundary of the final reference area to a value obtained by subtracting a width of the reference area (a reference range) from the x coordinate of the right boundary of the reference picture (the width of the reference picture).

A similar operation may be performed by the video encoding apparatus 1900 according to an embodiment. When both of a y coordinate of the upper boundary and a y coordinate of the lower boundary of the original reference area indicated by the motion vector of the current block are greater than a y coordinate of the lower boundary of the reference picture (a height of the reference picture), and both of an x coordinate of the left boundary and an x coordinate of the right boundary of the original reference area are greater than an x coordinate of the right boundary of the reference picture (a width of the reference picture), the video encoding apparatus 1900 according to an embodiment may change a y coordinate of a lower boundary of the final reference area to be the same as the y coordinate of the lower boundary of the reference picture (the height of the reference picture) and change a y coordinate of an upper boundary of the final reference area to a value obtained by subtracting a height of the reference area (a reference range) from the y coordinate of the lower boundary of the reference picture (the height of the reference picture) and may change an x coordinate of a right boundary of the final reference area to be the same as the x coordinate of the right boundary of the reference picture (the width of the reference picture) and change an x coordinate of a left boundary of the final reference area to a value obtained by subtracting a width of the reference area (a reference range) from the x coordinate of the right boundary of the reference picture (the width of the reference picture).

In the embodiments described above with reference to FIGS. 23 through 33, the operation of vertically parallelly translating the y coordinate of the upper boundary or the lower boundary of the reference area to the y coordinate of the upper boundary or the lower boundary of the reference picture or the operation of horizontally parallelly translating the x coordinate of the left boundary or the right boundary of the reference area to the x coordinate of the left boundary or the right boundary of the reference picture may be realized via a clipping operation.

In detail, minimum coordinate values of boundaries of a reference picture may be defined as below. pic_ver_min indicates a minimum coordinate value (a y coordinate value of an upper boundary) in a y direction (a vertical direction) of the reference picture, and pic_hor_min indicates a minimum coordinate value (an x coordinate value of a left boundary) in an x direction (a horizontal direction) of the reference picture.

Maximum coordinate values of boundaries of the reference picture may be defined as below. pic_ver_max indicates a maximum coordinate value (a y coordinate value of a lower boundary) in the y direction (the vertical direction) of the reference picture, and pic_hor_max indicates a maximum coordinate value (an x coordinate value of a right boundary) in the x direction (the horizontal direction) of the reference picture.

Minimum coordinate values of boundaries of an original reference area may be defined as below. r_ver_min indicates a minimum coordinate value (a y coordinate value of an upper boundary) in a y direction (a vertical direction) of the reference area, and r_hor_min indicates a minimum coordinate value (an x coordinate value of a left boundary) in an x direction (a horizontal direction) of the reference area.

Maximum coordinate values of boundaries of the original reference picture may be defined as below. r_ver_max indicates a maximum coordinate value (a y coordinate value of a lower boundary) in the y direction (the vertical direction) of the reference area, and r_hor_max indicates a maximum coordinate value (an x coordinate value of a right boundary) in the x direction (the horizontal direction) of the reference area.

Minimum coordinate values of boundaries of a final reference area may be defined as below. ver_min indicates a minimum coordinate value (a y coordinate value of an upper boundary) in a y direction (a vertical direction) of the final reference area, and hor_min indicates a minimum coordinate value (an x coordinate value of a left boundary) in an x direction (a horizontal direction) of the final reference area. Maximum coordinate values of boundaries of the final reference area may be defined as below. ver_max indicates a maximum coordinate value (a y coordinate value of a lower boundary) in the y direction (the vertical direction) of the final reference area, and hor_max indicates a maximum location (an x coordinate value of a right boundary) in the x direction (the horizontal direction) of the final reference area.

The boundaries of the final reference area may not deviate from the reference picture by using the clipping functions as below. min(A,B) is a function to output a smaller value of A and B. max(A,B) is a function to output a greater value of A and B.

(Clipping function 1) hor_max =

$$\min(pic\_hor\_max, \max(r\_hor\_max, pic\_hor\_min));$$

(Clipping function 2) ver_max =

$$\min(pic\_ver\_max, \max(r\_ver\_max, pic\_ver\_min));$$

(Clipping function 3) hor_min =

$$\max(pic\_hor\_min, \min(r\_hor\_min, pic\_hor\_max));$$

(Clipping function 1) ver_min =

$$\max(pic\_ver\_min, \min(r\_ver\_min, pic\_ver\_max));$$

Based on the clipping function 1, the x coordinate value hor_max of the right boundary of the final reference area may be determined to be a greater value max(r_hor_max, pic_hor_min) of the x coordinate value of the right boundary of the original reference area and the x coordinate value of the left boundary of the reference picture. However, when the greater value max(r_hor_max, pic_hor_min) is greater than the x coordinate value pic_hor_max of the right boundary of the reference picture, the x coordinate value hor_max of the right boundary of the final reference area may be determined to be the x coordinate value of the right boundary of the reference picture. Thus, when the x coordinate value r_hor_max of the right boundary of the original reference area is greater than the x coordinate value pic_hor_ max of the right boundary of the reference picture, the x coordinate value hor_max of the right boundary of the final reference area may be clipped to the x coordinate value pic_hor_max of the right boundary of the reference picture.

Likewise, based on the clipping function 2, when the y coordinate value r_ver_max of the lower boundary of the original reference area is greater than the y coordinate value pic_ver_max of the lower boundary of the reference picture, the y coordinate value ver_max of the lower boundary of the final reference area may be clipped to the y coordinate value pic_ver_max of the lower boundary of the reference picture.

Based on the clipping function 3, when the x coordinate value r_hor_min of the left boundary of the original reference area is less than the x coordinate value pic_hor_min of the left boundary of the reference picture, the x coordinate value hor_min of the left boundary of the final reference area may be clipped to the x coordinate value pic_hor_min of the left boundary of the reference picture.

Based on the clipping function 4, when the y coordinate value r_ver_min of the upper boundary of the original reference area is less than the y coordinate value pic_ver_min of the upper boundary of the reference picture, the y coordinate value ver_min of the upper boundary of the final reference area may be clipped to the y coordinate value pic_ver_min of the upper boundary of the reference picture.

When x and y coordinates of a reference location of a point indicated by a motion vector of a sub-block of a current block are mvX[0] and mvY[1], respectively, the coordinates of the reference location may be clipped based on the clipping functions as below. Clip3(A, B, C) is a function to clip C to be in a range of a minimum value A to a minimum value B.

(Clipping function 5) $mvX[0] = Clip3(hor\_min, hor\_max, mvX[0])$ (Clipping function 6) $mvX[1] = Clip3(ver\_min, ver\_max, mvX[1])$ Based on the clipping function 5, the x coordinate mvX[0] of the reference location of the point indicated by the motion vector of the sub-block of the current block may be clipped to be in the range of the x coordinate value of the left boundary to the x coordinate value of the right boundary of the final reference area.

Based on the clipping function 6, the y coordinate mvY[1] of the reference location of the point indicated by the motion vector of the sub-block of the current block may be clipped to be in the range of the y coordinate value of the upper boundary to the y coordinate value of the lower boundary of the final reference area.

Accordingly, based on the clipping functions 5 and 6, the reference location indicated by the motion vector of the sub-block of the current block may be determined to be in the final reference area.

Meanwhile, the embodiments of the present disclosure described above may be written as computer-executable programs that may be stored in a medium.

The medium may continuously store the computer-executable programs, or temporarily store the computer-executable programs or instructions for execution or downloading. Also, the medium may be any one of various recording media or storage media in which a single piece or plurality of pieces of hardware are combined, and the medium is not limited to a medium directly connected to a computer system, but may be distributed on a network. Examples of the medium include magnetic media, such as a hard disk, a floppy disk, and a magnetic tape, optical recording media, such as compact disc read-only memory (CD-ROM) and digital versatile disc (DVD), magneto-optical media such as a floptical disk, and ROM, random access memory (RAM), and a flash memory, which are configured to store program instructions. A device-readable storage medium may include a form of a non-transitory storage medium. Here, the expression of "non-transitory storage medium" may only indicate that the medium is a tangible device, rather than a signal (for example, an electromagnetic wave), and does not distinguish a semi-permanent storage of data in the storage medium and a temporary storage of data in the storage medium. For example, the "non-transitory storage medium" may include a buffer in which data is temporarily stored.

Other examples of the media include recording media and storage media managed by application stores distributing applications or by websites, servers, and the like supplying or distributing other various types of software.

According to an embodiment of the disclosure, methods according to various embodiments of the disclosure may be provided as a computer program product. The computer program product may be purchased as a product between a seller and a purchaser. The computer program product may be distributed in the form of a storage medium (for example, a compact disc read-only memory (CD-ROM)), or directly distributed online (e.g., download or upload) through an application store (e.g., Play Store™) or between two user devices (e.g., smartphones). In the case of online distribution, at least a portion of the computer program product (e.g., a downloadable app) may be at least temporarily stored or generated in a device-readable storage medium, such as a memory of a server of a manufacturer, a server of an application store, or a broadcasting server.

While one or more embodiments of the present disclosure have been described with reference to the figures, it will be understood by those of ordinary skill in the art that various changes in form and details may be made therein without departing from the spirit and scope as defined by the following claims.

The invention claimed is:

1. A video decoding method comprising:
determining a center motion vector of a current block by using a base motion vector of the current block based on affine model-based inter-prediction being performed in the current block;
determining a first reference area with a reference range to be centered on a point indicated by a central motion vector of the current block, the reference range determined corresponding to a size of the current block;
when the first reference area with the reference range deviates from or includes a left boundary of a reference picture, updating a minimum value in a x-axis coordinate of the first reference area to a x-axis coordinate of the left boundary of the reference picture and updating a maximum value in the x-axis coordinate of the first reference area to a value obtained by adding the reference range to the x-axis coordinate of the left boundary of the reference picture, and determining prediction samples of sub-blocks of the current block based on a second reference area with the updated minimum value in the x-axis coordinate and the updated maximum value in the x-axis coordinate in the reference picture;
when the first reference area with the reference range deviates from or including an upper boundary of the reference picture, updating a minimum value in a y-axis coordinate of the first reference area to a y-axis coordinate of the upper boundary of the reference picture and updating a maximum value in the y-axis coordinate of the first reference area to a value obtained by adding the reference range to the y-axis coordinate of the upper boundary of the reference picture, and determining prediction samples of sub-blocks of the current block based on a third reference area with the updated minimum value in the y-axis coordinate and the updated maximum value in the y-axis coordinate in the reference picture; and
determining reconstruction samples of the current block by using the prediction samples of the current block.

2. A video encoding method comprising:
determining a center motion vector of a current block by using a base motion vector of the current block based on affine model-based inter-prediction being performed in the current block;
determining a first reference area with a reference range to be centered on a point indicated by a central motion vector of the current block, the reference range determined corresponding to a size of the current block;
when the first reference area with the reference range deviates from or includes a left boundary of a reference picture, updating a minimum value in a x-axis coordinate of the first reference area to a x-axis coordinate of the left boundary of the reference picture and updating a maximum value in the x-axis coordinate of the first reference area to a value obtained by adding the reference range to the x-axis coordinate of the left boundary of the reference picture, and determining prediction samples of sub-blocks of the current block based on a second reference area with the updated minimum value in the x-axis coordinate and the updated maximum value in the x-axis coordinate in the reference picture;
when the first reference area with the reference range deviates from or including an upper boundary of the reference picture, updating a minimum value in a y-axis coordinate of the first reference area to a y-axis coordinate of the upper boundary of the reference picture and updating a maximum value in the y-axis coordinate of the first reference area to a value obtained by adding the reference range to the y-axis coordinate of the upper boundary of the reference picture, and determining prediction samples of sub-blocks of the current block based on a third reference area with the updated minimum value in the y-axis coordinate and the updated maximum value in the y-axis coordinate in the reference picture; and
encoding residual samples of the current block by using the prediction samples of the current block.

3. A method of storing a bitstream generated by video encoding into a non-transitory computer-readable storage medium, the method comprising:
determining a center motion vector of a current block by using a base motion vector of the current block based on affine model-based inter-prediction being performed in the current block;
determining a first reference area with a reference range to be centered on a point indicated by a central motion vector of the current block, the reference range determined corresponding to a size of the current block;
when the first reference area with the reference range deviates from or includes a left boundary of a reference picture, updating a minimum value in a x-axis coordinate of the first reference area to a x-axis coordinate of the left boundary of the reference picture and updating a maximum value in the x-axis coordinate of the first reference area to a value obtained by adding the reference range to the x-axis coordinate of the left boundary of the reference picture, and determining prediction samples of sub-blocks of the current block based on a second reference area with the updated minimum value in the x-axis coordinate and the updated maximum value in the x-axis coordinate in the reference picture;

when the first reference area with the reference range deviates from or including an upper boundary of the reference picture, updating a minimum value in a y-axis coordinate of the first reference area to a y-axis coordinate of the upper boundary of the reference picture and updating a maximum value in the y-axis coordinate of the first reference area to a value obtained by adding the reference range to the y-axis coordinate of the upper boundary of the reference picture, and determining prediction samples of sub-blocks of the current block based on a third reference area with the updated minimum value in the y-axis coordinate and the updated maximum value in the y-axis coordinate in the reference picture;

encoding residual samples of the current block by using the prediction samples of the current block; and storing, into the non-transitory computer-readable storage medium, the bitstream including the encoding residual samples.

* * * * *